United States Patent [19]
Horiike

[11] Patent Number: 6,092,130
[45] Date of Patent: Jul. 18, 2000

[54] METHOD AND APPARATUS FOR DATA PADDING INPUT DATA AND INPUT SIGNIFICANCE INFORMATION WHICH ARE NOT SYNCHRONIZED

[75] Inventor: Kazuyoshi Horiike, Kyoutoshi, Japan

[73] Assignee: Matsushita Electric Industrial Co., Ltd., Japan

[21] Appl. No.: 09/030,899

[22] Filed: Feb. 26, 1998

[30] Foreign Application Priority Data

Feb. 28, 1997 [JP] Japan .................................. 9-045584
Mar. 26, 1997 [JP] Japan .................................. 9-073087

[51] Int. Cl.$^7$ .............................. H03M 1/00; H04N 7/50
[52] U.S. Cl. ........................ 710/69; 712/114; 375/354; 375/355; 375/367; 710/68; 348/404; 341/67
[58] Field of Search .......................... 712/114; 375/355, 375/367, 354; 341/67; 710/68, 69; 348/404

[56] References Cited

U.S. PATENT DOCUMENTS

| | | | |
|---|---|---|---|
| 5,195,110 | 3/1993 | Gorshe | 375/355 |
| 5,349,611 | 9/1994 | Varian | 375/367 |
| 5,612,979 | 3/1997 | Takano | 375/354 |
| 5,990,956 | 11/1999 | Lee | 348/404 |

FOREIGN PATENT DOCUMENTS

| | | | |
|---|---|---|---|
| 00862273A2 | 9/1998 | European Pat. Off. | H03M 1/00 |
| 7-52403 | 6/1995 | Japan . | |
| 8-37518 | 2/1996 | Japan . | |
| 002320989A | 7/1998 | United Kingdom | G06F 17/14 |

*Primary Examiner*—Thomas C. Lee
*Assistant Examiner*—Katharina Schuster
*Attorney, Agent, or Firm*—Parkhurst & Wendel, L.L.P.

[57] ABSTRACT

The present invention has an object to provide a data padding apparatus capable of appropriate padding processing to input data and input insignificance information which are not synchronized. Receiving input data and input significance information which are not synchronized as inputs, the data padding apparatus performs synchronization by data storage means and significance information storage means included in a storage and padding means, generates original data and synchronized significance information with synchronism between them and outputs them to a padding information holding means where padding information consisting of padding data and padding address information is generated based on the data and information input.

25 Claims, 49 Drawing Sheets

Fig.4 (a)
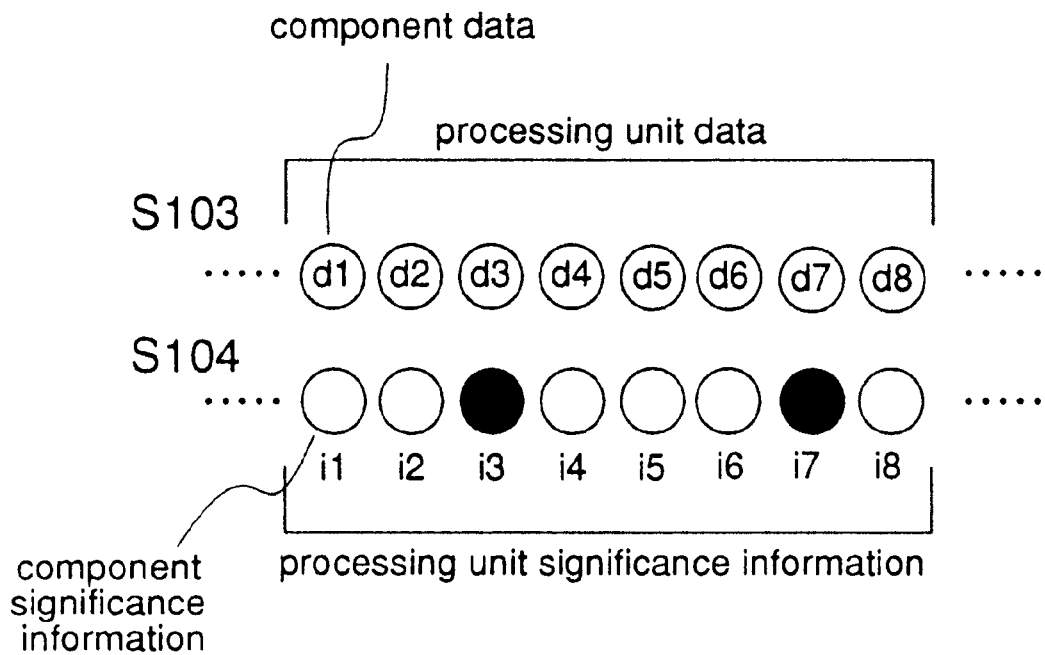
Fig.4 (b)
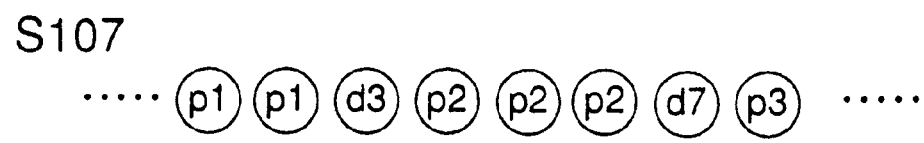
padding data

padding method 1 : padding data is generated based on component data at addresses 12,31,33,and 52
padding method 2 : padding data is generated based on component data at addresses 22,31,33,and 42

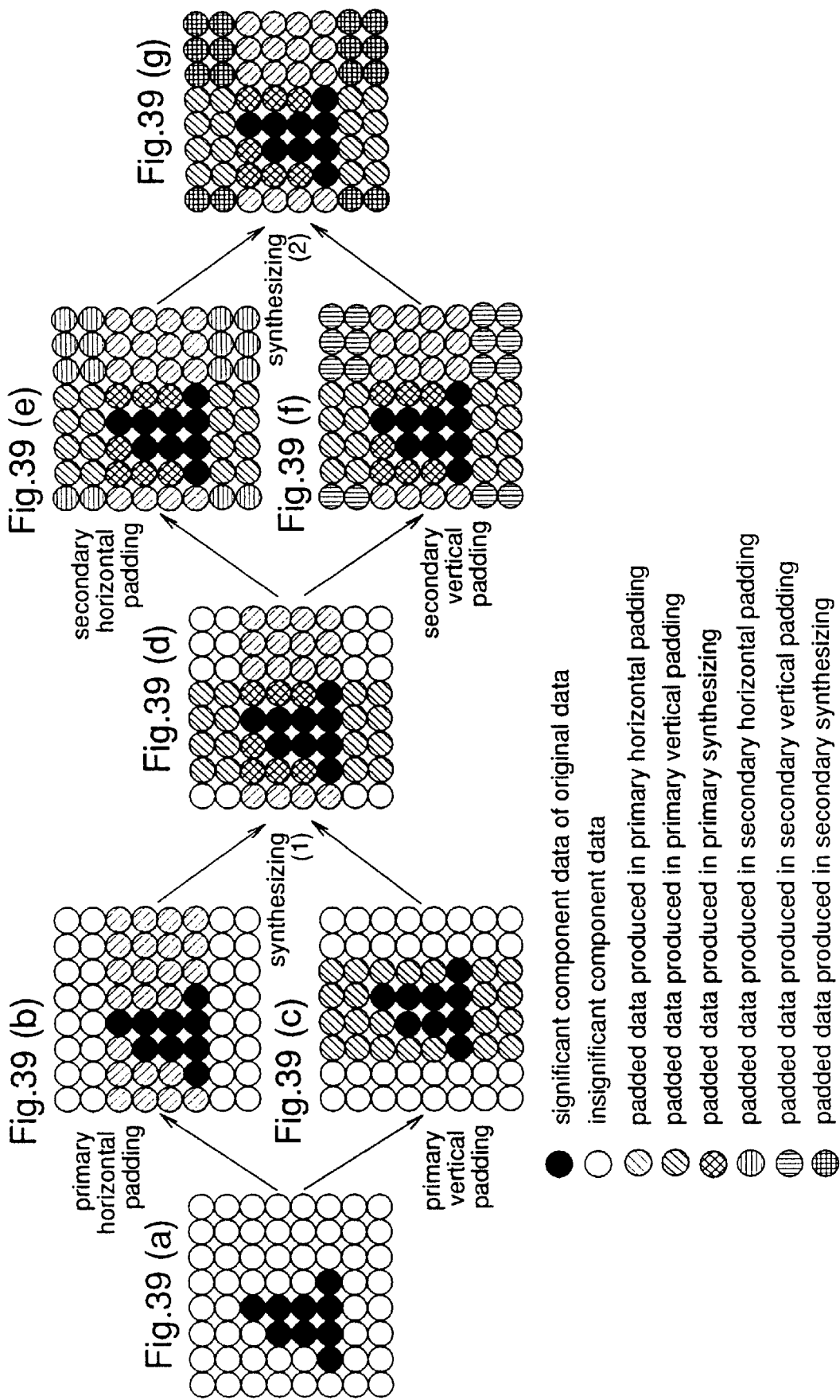

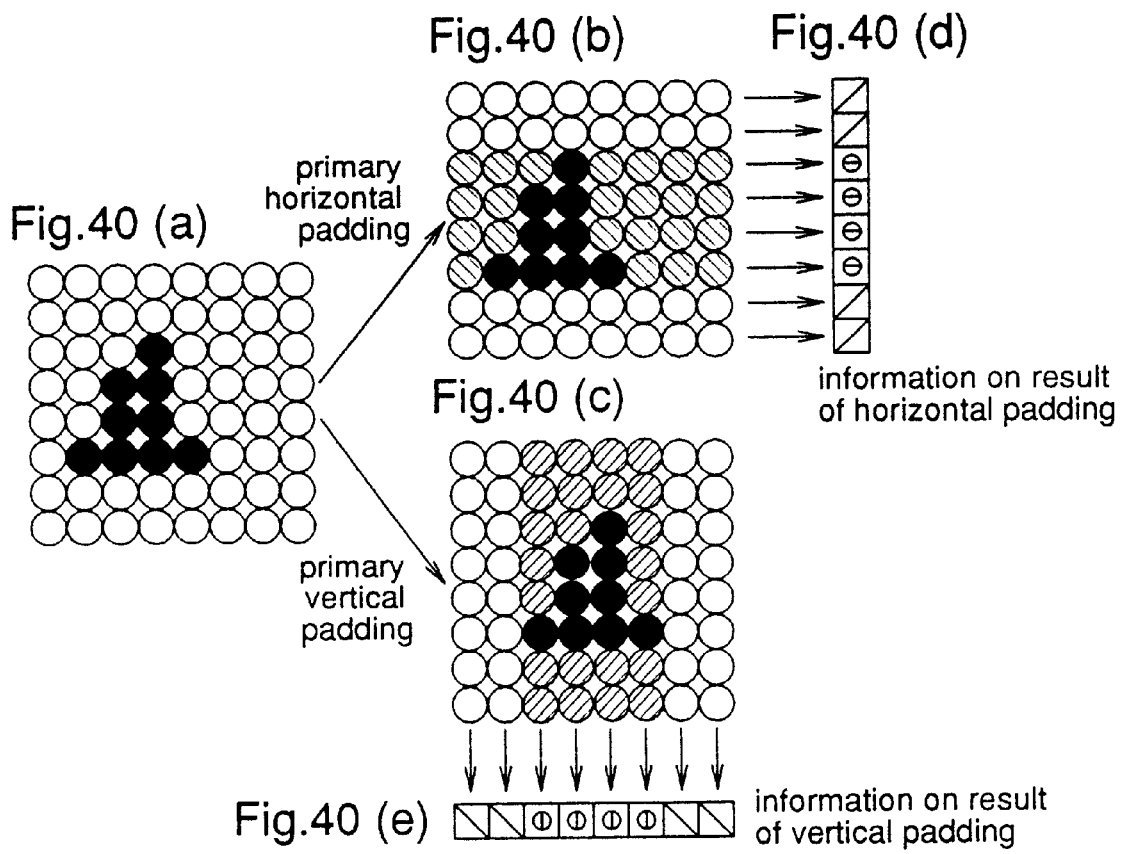

- ● significant component data of original data
- ○ insignificant component data
- ⊘ padded data produced in primary horizontal padding
- ⊘ padded data produced in primary vertical padding

- [⊖] information indicating that horizontal padding has been performed
- [⧄] information indicating that horizontal padding has not been performed
- [⊕] information indicating that vertical padding has been performed
- [⧅] information indicating that vertical padding has not been performed Fig.45 (a)  Fig.45 (b)  Fig.45 (c)
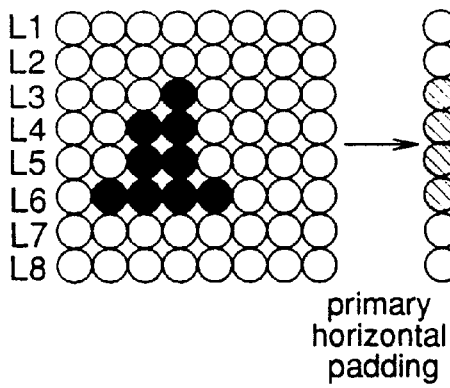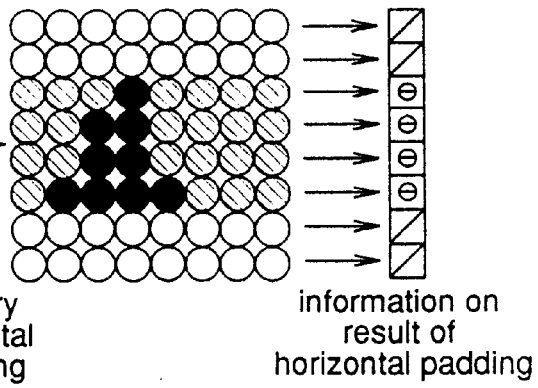
primary horizontal padding
information on result of horizontal padding
- ● significant component data of original data
- ○ insignificant component data
- ⊘ padded data produced in primary horizontal padding
- ⊟ information indicating that horizontal padding has been performed
- ⊘ information indicating that horizontal padding has not been performed
Fig.45 (d)
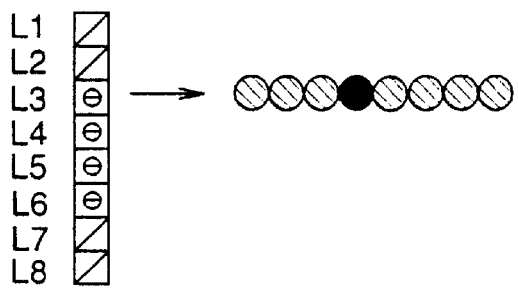
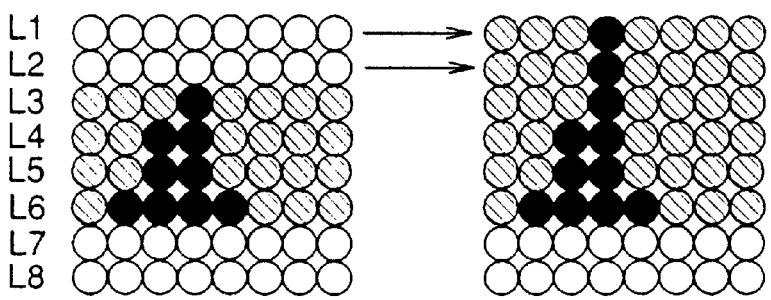

Fig.48 (a)
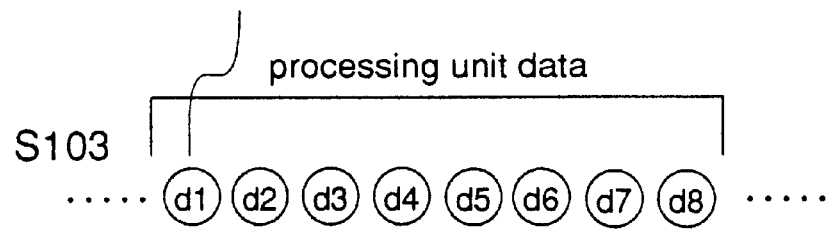
Fig.48 (b)
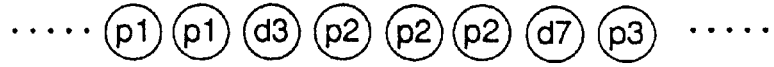
padding data
$$p1 = d3$$
$$p2 = (d3 + d7) / 2$$
$$p3 = d7$$
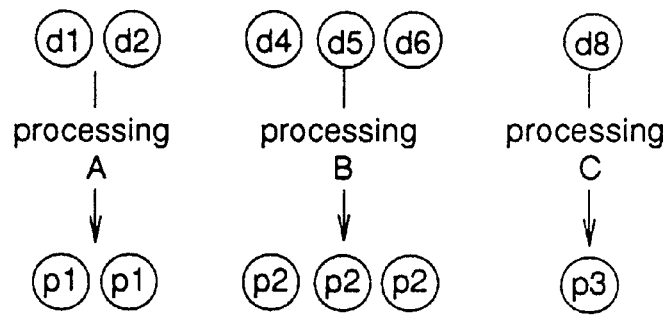
processing A is performed to left-end component data of processing unit data padding data $$p1 = d3$$
$$p2 = (d3 + d7) / 2$$
$$p3 = d7$$

METHOD AND APPARATUS FOR DATA PADDING INPUT DATA AND INPUT SIGNIFICANCE INFORMATION WHICH ARE NOT SYNCHRONIZED

FIELD OF THE INVENTION

The present invention relates to a data padding apparatus, a data padding method and a data padding program recording medium, and particularly, to padding to which an insignificant part of data to be processed is subjected and which are carried out based on a significant part of the data using information indicating the significant and insignificant parts of the data.

BACKGROUND OF THE INVENTION

There are advances in techniques for digitizing or compressing data such as video and audio that are originally analog. The merit of using digitized data is to enable the storage amount of a storage apparatus and a limited transmission band width to be fully utilized along with maintaining the quality of data to be stored or transmitted by handling any kind of data containing video, audio, characters and the like in almost the same way or by using compression techniques in storage or transmission of data, or to enable advanced techniques such as error correcting techniques and ciphering techniques to be easy to use. For this reason, for example, video is handled as discrete digital data and an arrangement of pixels having pixel values indicating a brightness or color signal.

There have been proposed an international standard technique, MPEG (Moving Picture Experts Group), for compression-coding digital data such as video, audio and text to be transmitted. Especially, MPEG4 processes digital data such as video, audio and character object by object instead of, for example, handling the whole image.

When specified objects in an image are handled separately from the whole image, the data, which have been separated into a plurality of objects in decoding compression-coded data, need to be synthesized and information for the superimposition in synthesizing the data is necessary. The information contains, for example, a two-valued signal indicating whether or not a pixel of an image is included in a specified object, or a multi-valued signal indicating to what degree the pixel occludes the background.

The information indicating the significance represents the shape of a specified object. Only the pixels that are decided to be significant according to the information indicating the significance have influence on the picture quality of the image after being synthesized. In other words, the insignificant pixels have nothing to do with the picture quality, so that coding only significant pixels can improve the coding efficiency.

A method called by shape adaptive discrete cosine transform (SADCT) that orthogonally transforms only significant pixels is disclosed in IEEE Transactions on Circuits and Systems for Video Technology vol.5, No.1, February 1995. This method subject only significant pixels to orthogonal transform.

However, since compression by coding is executed according to spatial or temporal correlation in images, if insignificant pixels are also subjected to coding along with significant pixels, the coding efficiency is sometimes reduced. For example, when all significant pixels are black, if insignificant pixels are black, coding the significant pixels along with the insignificant pixels does not make the coding efficiency reduced, while if the insignificant pixels are white, the lowered correlation causes the coding efficiency to be reduced.

With the aforementioned SADCT, when an image to be processed has insignificant pixels in a region surrounded by significant pixels, correlation in the vertical and horizontal directions are lowered, thereby reducing the coding efficiency.

As described above, the pixel value of the insignificant pixel has some influence on the coding efficiency, despite that it has little influence on the picture quality of a regenerated image. Therefore, padding is carried out in which the pixel value of an insignificant pixel is replaced with a value which is obtained based on the pixel values of the neighbor significant pixels. With this padding, adjacent pixels have almost continuous values at the boundary between significant pixels and insignificant pixels and therefore the correlation between each pixel is higher than the significant region before padding, whereby the coding efficiency can be improved.

A prior art data padding apparatus in which the above-described padding is executed using digital data to be processed and significance information corresponding to the digital data is explained as follows. FIG. 49 (ISO/IEC JTC1/SC29/WG11 MPEG96/N1469 46 page) is a block diagram showing the configuration of the prior art data padding apparatus. As shown in the figure, the prior art data padding apparatus has a data replacing means 4901. The data replacing means 4901 generates padding data based on significant part of data using the data and the significance information corresponding to the data, and replaces insignificant part of the data with the padding data.

FIG. 50 is a flowchart showing a processing procedure of the data replacing means 4901 included in the prior art data padding apparatus. FIG. 51 is a diagram for explaining the padding by the prior art data padding apparatus. The operation in the padding by the data padding apparatus is described referring to FIGS. 49 to 51, as follows.

Original data S4901 and input significance information S4902 which are the inputs to the prior art data padding apparatus are shown in FIG. 51*a*). S4901 and S4902 are synchronized to be input to the data padding apparatus as shown in FIG. 49, keeping the correspondence shown in FIG. 51*a*).

In FIG. 51*a*), the numerals d1, d2, . . . each are component data which are discrete digital data. 8 pieces of the component data d1, d2, . . . , d8 constitute a processing unit data. The padding is executed for each processing unit. The numerals i1, i2, . . . are component insignificance information indicating of the significance of each component data, each of which make a one-to-one correspondence with the component data d1, d2, . . . , 8 pieces of component significance information i1, i2, . . . , i8 constitute processing unit significance information. i3 and i7 among the component significance information indicate 'significant' while the others indicate 'insignificant'. Accordingly, among the component data contained in the processing unit data in FIG. 51*a*), the prior art data padding apparatus finds d3 and d7 to be significant and the others to be insignificant from the processing unit significance information.

In a step 5001 in the flow shown in FIG. 50, component data and component significance information corresponding to the component data are input to the prior art data replacing means 4901. In a step 5002, using the component significance information, it is decided whether the component data is significant or not. When it is significant, a step 5003 is executed and the component data is held as padding data generating data. When it is insignificant, a step 5004 follows without executing the step 5003.

In the step 5004, it is decided whether the padding condition is satisfied or not. The data replacing means 4901 generates and holds edge information corresponding to the first component data or the last component data which constitutes the processing unit data. Further in the step 5004, the padding condition is decided to be satisfied when the two padding data generating data are held or when there is the edge information and one padding data generating data is held.

When the padding condition is satisfied, a step 5005 and below are executed while when the condition is not satisfied, the process goes back to the step 5001 where next component data and the corresponding component significance information are input.

When the step 5005 is executed, padding data is generated based on the one or two held padding data generating data. In a next step 5006, the component data to be processed is replaced with the padding data and the corresponding significance information indicates is changed to indicate 'significant'. In a step 5007, data after padding (hereinafter referred to as padded data) and significance information after padding (hereinafter referred to as padded significance information) which have been processed in the step 5006 are output. In FIG. 49, padded data S4903 and padded significance information S4904 become the outputs of the data padding apparatus.

In case of data shown in FIG. 51, the process is as follows. Initially, in the step 5001 in FIG. 50, the component data d1 and the corresponding component information i1 are input to the data replacing means 4901. In decision in the step 5002, the result is to be 'insignificant', the process makes a transition to the step 5004 where the padding condition is decided. Since the component data d1 is the first component data of the processing unit data shown in FIG. 51a), the data replacing means 4901 holds the edge information corresponding to the input d1. So far until this stage, the edge information is held, but no padding data generating data is held, so that the padding condition is not satisfied and thus the process goes back to the step 5001.

The following component data d2 and the corresponding component significance information i2 are input, and the steps 5002 to 5004 are executed similarly to the foregoing, and the process goes back to the step 5001.

The following component data d3 and the corresponding component significance information i3 are input, and in decision in the step 5002, the result is to be 'significant', so that the step 5003 is executed and thus the component data d3 is held as padding data generating data. Thereafter, when decision in the next step 5004 is carried out, since the edge information and one padding data generating data are held, the padding condition is satisfied and thus the step 5005 and below are to be executed.

In the step 5005, the data replacing means 4901, when one padding data generating data alone is held therein, generates the same padding data as the padding data generating data. In this case, the same padding data p1 as d3 is generated. In addition, the data replacing means 4901, when only one padding data generating data is held therein, still holds the data after generating padding data using the padding data generating data. The data replacing means 4901 quits holding the edge information which has been held after generating the padding data. Accordingly, at this time, one padding data generating data alone is held.

In the next step 5006, the insignificant component data d1 and d2 are replaced with the padding data p1 and the component significance information i1 and i2 are changed from those indicating 'insignificant' to those indicating 'significant'. In the step 5007, the padded data arranged in the order 'p1, p1, d3' and the padded significance information indicating 'significant, significant, significant', are output.

The step 5001 is executed again. The component significance information i4 corresponding to the following component data d4 is input, and the steps 5002 to 5004 are executed in a similar way when the component data d2 is input, and the process goes back to the step 5001 again. d5 and i5, and d6 and i6 are similarly processed.

The following component data d7 and the corresponding component significance information i7 are input, and in decision in the step 5002, the result is to be 'significant', so that the step 5003 is executed and thus the component data d7 is held as padding data generating data. Thereafter, when decision in the next step 5004 is carried out, since the previous padding data generating data d3 is held and thus two padding data generating data are held, the padding condition is satisfied and thus the step 5005 and below are to be executed.

In the step 5005, the data replacing means 4901, when two padding data generating data are held, generates padding data by averaging the two padding data generating data. In this case, data p2 for generating padding data is generated, which is (d3+d7)/2. Further, the data replacing means 4901, when two padding data generating data are held, quits holding the most previous of the two padding data generating data after generating padding data using the two padding data generating data. Accordingly in this case, d3 will not be held, but only d7 will be still held.

In the next step 5006, the insignificant component data d4 to d6 are replaced with the padding data p2, and the component significance information i4 to i6 are changed from those indicating 'insignificant' to those indicating 'significant'. In the step 5007, padded data 'p2, p2, p2, d7' and padded significance information 'significant, significant, significant, significant' are output.

The following component data d8 and the corresponding component significance information i8 are input. In decision in the step 5002 the data is decided to be 'insignificant', so that the process makes a transition to the step 5004 where the padding condition is decided. The component data d8 is the last component data of the processing unit data shown in FIG. 51a), so that the data replacing means 4901 holds the edge information. Accordingly, the edge information and one padding data generating data are held and thus the padding condition is satisfied, so that the step 5005 and below are to be executed.

In the step 5005, because of holding only one padding data generating data, the data replacing means 4901 generates the same padding data as the padding data generating data. Thus, the same padding data p3 as d7 is generated. In the next step 5006, the insignificant component data d6 is replaced with the padding data p3 and the component significance information i8 is changed from one indicating 'insignificant' to one indicating 'significant'. In the step 5007, padded data which is the padding data p3 and padded significance information indicating 'significant' are output.

As described above, the processing unit data and the processing unit significance information shown in FIG. 51a) are subjected to the padding. FIG. 51b) is a diagram showing the result of the padding for the data. As shown in the figure, the insignificant component data contained the processing unit data shown in FIG. 51a) are replaced with the padding data generated based on the neighbor significant unit data, and the padded data are obtained.

For data before the padding, the insignificant component data d1, d2, . . . do not always approximate significant component data. For example, in case of video data, the component data d1, d2, . . . each are pixels, and the pixel values of each pixel which represents a brightness signal and a color signal do not always have the approximate values. As opposed to this, in the data after the padding, adjacent component data approximate each other, so that when the compression-coding processing is executed according to the correlation, the coding efficiency can be improved.

As hereinbefore pointed out, the prior art data padding apparatus subjects the input data and significance information to the padding, but as described above, the data padding apparatus works on the premise that the data and the significance information keep the correspondence with each other and are synchronized to be input.

In case that the compression-coded data is expansion-decoded before being used, in padding data, the orders of data and significance information does not always agree with time series or keep the correspondence with each other, depending on a coding method adopted in coding. When these data and significance information are to be processed, since they cannot be directly input to the prior art data padding apparatus to be subjected to the padding, an additional apparatus for synchronization is required so that data is input to the data padding apparatus after being subjected to the synchronization.

Further, for the prior art data padding apparatus, in case of complicated or advanced padding such as a case that data having a multi-dimensional structure is subjected to multi-dimensional padding, because great amount of data are stored and abundant calculation are carried out, a problem arises whereby the necessary amounts of storage media and the scales of circuits increase.

Furthermore, the prior art data padding apparatus repeats the processing procedure of the similar decision and process simply for each component data, so that there is still room for improvement in the coding efficiency.

SUMMARY OF THE INVENTION

It is an object of the present invention to provide a data padding apparatus with high versatility which can appropriately perform data padding to data and significance information which are not synchronized.

It is another object of the present invention to provide a data padding apparatus which can perform complicated or high-level padding by utilizing apparatus resource, without increase in required amount of a recording medium or scale of a circuit.

It is still another object of the present invention to provide a data padding apparatus which implements data padding with high efficiency by utilizing significance information.

It is a further object of the present invention to provide a data padding method in which processing is performed to data and significance information which are not synchronized, a data padding method in which complicated or high-level processing is realized by utilizing apparatus resource, and a data padding method in which efficiency in processing is increased by using significance information.

It is still further object of the present invention to provide a recording medium which stores a data padding program by which a data padding method in which processing is performed to data and significance information which are not synchronized, a data padding method in which complicated or high-level processing is realized by utilizing apparatus resource, and a data padding method in which efficiency in processing is increased by using significance information.

Other objects and advantages of the invention will become apparent from the detailed description that follows. The detailed description and specific embodiments described are provided only for illustration since various additions and modifications within the spirit and scope of the invention will be apparent to those skilled in the art from the detailed description.

According to a first aspect of the present invention, there is provided a data padding apparatus performing padding processing in which, using input data which is input in a line of component data which is discrete digital data and input significance information which is input in a line of component significance information indicating the significance of each component data, insignificant component data included in the input data is replaced with padding data generated based on significant component data included in the input data. This apparatus comprises: a storage and padding means for holding the input data and the input significance information and performing synchronization to the input data and the input significance information to generate and hold original data and synchronized significance information each having the same output order, and performing padding processing to the held original data and the held synchronized significance information to output padded data and padded significance information; and a padding information holding means for generating padding data and padding specifying information that specifies a part of the original data to be subjected to padding processing based on significant part of the original data, using the original data and the synchronized significance information generated by the synchronization, and outputting the padding data and the padding specifying information to the storage and padding means.

According to a second aspect of the present invention, in the data padding apparatus of the first aspect, the padding information holding means generates, as the padding specifying information, padding address information that specifies a region in the storage and padding means where original data is held.

According to a third aspect of the present invention, in the data padding apparatus of the first aspect, the padding information holding means is a holding means for significance information adaptive padding information that determines a padding method using the original data and the synchronized significance information which have been generated by the synchronization, and generates the padding data and the padding specifying information.

According to a fourth aspect of the present invention, in the data padding apparatus of the first aspect, the storage and padding means is a data setting storage and padding means for performing padding processing to each continues region of the original data held and the synchronized significance information held; and wherein the padding information holding means is a holding means for continuous padding information for generating, as the padding specifying information, padding starting address information and padding ending address information that specify a continuous region of the original data held in the storage and padding means.

According to a fifth aspect of the present invention, in the data padding apparatus of the fourth aspect, the holding means for continuous padding information is a holding means for continuous padding information referring to significance information changing point that generates padding data based on a significant part of the original data, detects a significance information changing point in the original data at which a significance thereof changes using the synchronized significance information, and generates the padding specifying information based on the detected significance information changing point.

According to a sixth aspect of the present invention, in the data padding apparatus of the first aspect, the padding information holding means specifies plural regions of processing unit data for each processing unit data consisting of a predetermined number of pieces of component data which constitute the original data, and generates the padding information for each specified region.

According to a seventh aspect of the present invention, the data padding apparatus of the first aspect further comprising a processing object switching means for switching between a set of input data and input significance information and a set of padded data and padded significance information as an input to the storage and padding means.

According to an eighth aspect of the present invention, the data padding apparatus of the first aspect comprises N sets of storage and padding means and padding information holding means (N: natural number). This apparatus further comprises: a division means for dividing to the input data and the input significance information to generate N pieces of division data and N pieces of division significance information, and outputting N sets of division data and division significance information to the N storage and padding means; and a reconstruction means for reconstructing the N pieces of division data after padding and the N pieces of division significance information after padding, which data and information are generated by the N storage and padding means, to generate padded data and padded significance information.

According to a ninth aspect of the present invention, the data padding apparatus of the first aspect comprises N sets of storage and padding means and padding information holding means, said apparatus further comprising a synthesizing means for synthesizing N pieces of padded data and N pieces of padded significance information, the data and information being generated by the N pieces of storage and padding means, to generate synthesized padded data and synthesized padded significance information.

According to a tenth aspect of the present invention, there is provided a data padding apparatus performing padding processing in which, using input data which is input in a line of component data which is discrete digital data and input significance information which is input in a line of component significance information indicating the significance of each component data, insignificant component data included in the input data is replaced with padding data generated based on significant component data, thereby performing primary to Nth (N: natural number) paddings. This apparatus comprises: a storage and padding means for holding the input data and the input significance information as original data and synchronized significance information which have the same output order, and performing padding to the held original data and the held synchronized significance information to output data after primary padding and significance information after primary padding, or performing padding to data after padding in a stage and significance information after padding in a stage to output data after padding in a next stage and significance information after padding in a next stage; and a padding information holding means for generating padding data used in primary padding based on the held original data and the held synchronized significance information, generating padding specifying information which specifies the part of the original data to be padded in primary padding, and then holding the padding data and the padding specifying information as padding location information indicating the content of primary padding, or generating padding data used in a next stage based on the data after padding in a stage, the significance information after padding in a stage, and padding location information indicating the content of the padding in a stage and generating a padding specifying information which specifies the part of the data after padding in a stage to be subjected to padding in a next stage, and then holding the padding data and the padding specification information as padding position information indicating the content of padding in a next stage.

According to a eleventh aspect of the present invention, in the data padding apparatus of the tenth aspect, the padding information holding means specifies plural regions of processing unit data for each processing unit data consisting of a predetermined number of pieces of component data which constitute the original data, and generates padding information for each specified region.

According to a twelfth aspect of the present invention, there is provided a data padding method in which, using input data which is input in a line of component data which is discrete digital data, and input significance information which is input in a line of component significance information which indicates the significance of each component data, insignificant component data included in the input data is replaced with padding data which is generated based on significant component data. This method comprises: a synchronization step for holding the input data and the input significance information, synchronizing the input data and the input significance information to generate original data and synchronized significance information which have the same output order, and holding the original data and the synchronized significance information; a padding calculation step for generating padding data based on the significant parts of the original data and padding specifying information which specifies the parts of the original data to be subjected to padding, using the input data and the input significance information which are generated in the synchronization step; and a padding step for subjecting the held original data and the held synchronized significance information to padding, using the padding data and the padding specifying information.

According to a thirteenth aspect of the present invention, in the padding calculation step of the data padding method of the twelfth aspect 12, padding address information which specifies a region of the held original data is generated.

According to a fourteenth aspect of the present invention, in the data padding method of the twelfth aspect, the padding calculation step is a significance information adaptive padding calculation step for deciding a padding method using the original data and the synchronized significance information which are generated in the synchronization, and according to the decided padding method, generating the padding data and the padding specifying information.

According to a fifteenth aspect of the present invention, the data padding method of the twelfth aspect further comprises an addressing step for generating padding starting address information and padding ending address information which specify a continuous region of the held original data, wherein the padding step is a continuous padding step for executing padding for the continuous region in the held original data and the held synchronized significance information.

According to a sixteenth aspect of the present invention, in the data padding method of the fifteenth aspect, the padding calculation step is a significance information changing point reference padding calculation step for generating padding data based on the significant parts of the original data, detecting with the synchronized significance information a significance information changing point where the significance of the original data changes, and generating the padding specifying information based on the detected significance information changing point.

According to a seventeenth aspect of the present invention, in the padding calculation step of the data padding method of the twelfth aspect, a plurality of regions are specified for each processing unit which consists of a predetermined number of pieces of component data constituting the original data, and the padding data and the padding specifying information are generated for each specified region.

According to an eighteenth aspect of the present invention, the data padding method of the twelfth aspect further comprises a predetermined times completion deciding step for deciding whether padding in the padding step is executed a predetermined times or not.

According to a nineteenth aspect of the present invention, in the synchronization step of the data padding method of the twelfth aspect, the padding calculation step and the padding step are executed in parallel N times (N: natural number). This method further comprises: a division step for dividing the input data and the input significance information to generate N pieces of division data and N pieces of division significance information; and a reconstruction step for reconstructing N pieces of padded division data and N pieces of padded division significance information which are generated by repeating the padding step N times, to generate padded data and padded significance information.

According to a twentieth aspect of the present invention, in the data padding method of the twelfth aspect, the synchronization step, the padding calculation step and the padding step are executed in parallel N times (N: natural number). This method further comprises: a synthesizing step for synthesizing N pieces of padded division data and N pieces of padded division significance information which are generated by repeating the padding step N times, to generate synthesized padded data and synthesized padded significance information.

According to a twenty-first aspect of the present invention, there is provided a data padding method in which, using input data which is input in a line of component data which is discrete digital data and input significance information which is input in a line of component significance information which indicates the significance of each component data, insignificant component data included in the input data is replaced with padding data which is generated based on significant component data, thereby performing primary to N-th (N: natural number) paddings. This method comprises: an input holding step in which the input data and the input significance information are held as original data and synchronized significance information of the same output order; a primary padding step for generating padding data based on significant parts of the original data using the original data and the synchronized significance information, generating padding specifying information which specifies parts of the original data to be padded, performing padding to the held original data and the held synchronized significance information using the padding data and the padding specifying information to generate data after primary padding and significance information after primary padding, and generating and holding padding position information on the padding; and secondary to N-th padding steps for generating padding data and padding specifying information used in a stage using padded data, padded significance information, and the padding position information which have been generated in a padding step in a previous stage, and generating and holding padding position information on the padding in the stage when padding in a next stage is performed.

According to a twenty-second aspect of The present invention, in the primary padding step of the data padding method of the twenty-first aspect, plural regions of processing unit data are specified for each processing unit data comprising a prescribed number of pieces of component data of the original data, and the padding data and the padding specifying information are generated for each specified region According to a twenty-third aspect of the present invention, there is provided a program recording medium for recording a data padding program in which, using input data which is input in a line of component data which is discrete digital data and input significance information which is input in a line of component significance information which indicates significance of each component data, insignificant component data included in the input data is replaced with padding data which is generated based on significant component data. This program comprises: a synchronization step for holding the input data and the input significance information, synchronizing the input data and the input significance information to generate and hold original data and synchronized significance information of the same output order; a padding calculation step for generating padding data based on the significance parts of the original data and padding specifying information which specifies the parts of the original data to be subjected to padding, using the original data and the synchronized significance information which have been generated in the synchronization step; and a padding step for subjecting the held original data and the held synchronized significance information to padding, using the padding data and the padding specifying information.

According to a twenty-fourth aspect of the present invention, there is provided a program recording medium for storing a data padding program in which, using input data which is input in a line of component data which is discrete digital data and input significance information which is input in a line of component significance information which indicates significance of each component data, insignificant component data included in the input data is replaced with padding data which is generated based on significant component data, thereby performing primary to N-th (N: natural number) paddings This program comprises: an input holding step in which the input data and the input significance information are held as original data and synchronized significance information of the same output order; a primary padding step for generating padding data based on significant parts of the original data using the original data and the synchronized significance information, generating padding specifying information which specifies parts of the original data to be padded, performing padding to the held original data and the held synchronized significance information using the padding data and the padding specifying information to generate data after primary padding and significance information after primary padding, and generating and holding padding position information on the padding; and secondary to N-th padding steps for generating padding data and padding specifying information used in a stage using padded data, padded significance information, and the padding position information which have been generated in a padding step in a previous stage, and generating and holding padding position information on the padding in the stage when padding in a next stage is performed.

According to a twenty-fifth aspect of the present invention, the program recording medium of the twenty-fourth aspect stores the data padding program wherein, in the primary padding step, plural areas of processing unit data are specified for each processing unit data comprising a prescribed number of pieces of component data of the original data, and the padding data and the padding specifying information are generated for each specified area.

BRIEF DESCRIPTION OF THE DRAWINGS

FIGS. 4a) and 4b) are diagrams for explaining a padding processing in the first embodiment.

FIGS. 39a) to 39g) are diagrams for explaining padding executed in the data padding apparatus or data padding method according to the fourteenth embodiment.

FIGS. 40a) to 40e) are diagrams for explaining padding position information in the fourteenth embodiment.

FIGS. 45a) to d) are diagrams for explaining padding in the sixteenth embodiment.

FIGS. 48a) and 48b) are diagrams for explaining padding in the seventeenth embodiment.

DETIALED DESCRIPTION OF THE PREFERRED EMBODIMENTS

Embodiment 1

A data padding apparatus according to a first embodiment of the present invention stores data to be padded and significance information that is used for padding, and performs padding after synchronization.

Figure 1:
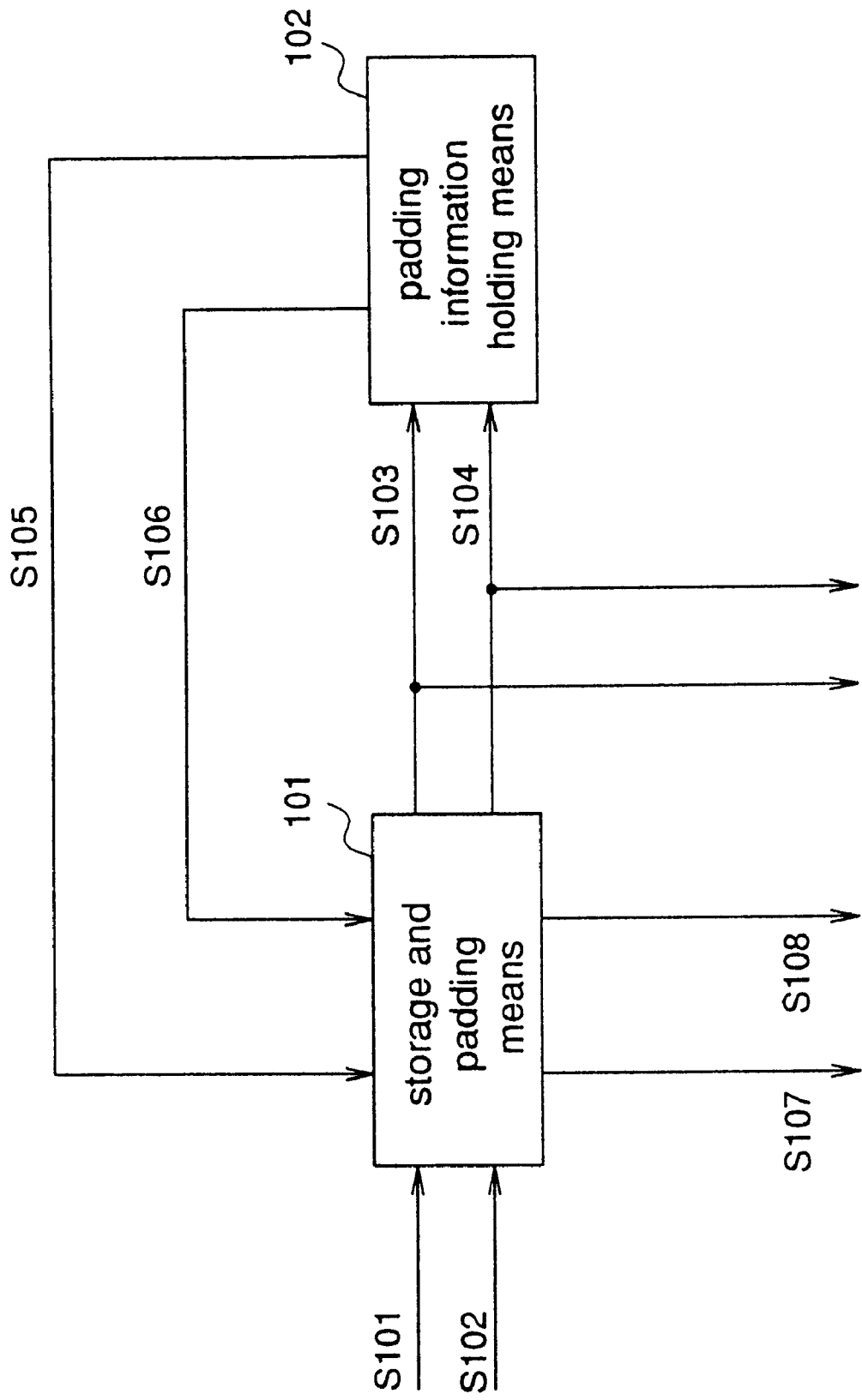
FIG. 1 is a block diagram illustrating the construction of a data padding apparatus according to a first embodiment of the present invention.

FIG. 1 is a block diagram illustrating the construction of the data padding apparatus according to the first embodiment. As shown in the figure, the data padding apparatus according to the first embodiment comprises a storage and padding means 101 and a padding information holding means 102. The storage and padding means 101 includes a data storage means for storing data to be padded and a significance information storage means for storing significance information used for padding. This means performs synchronization to the data and the significance information by means of the data storage means and the significance information storage means, and then, performs padding to the data stored in the data storage means using padding information taken from the padding information holding means 102 which will be described later. The padding information storage means 102, using the data and significance information synchronized, generates padding information that consists of padding data and padding address.

Figure 2:
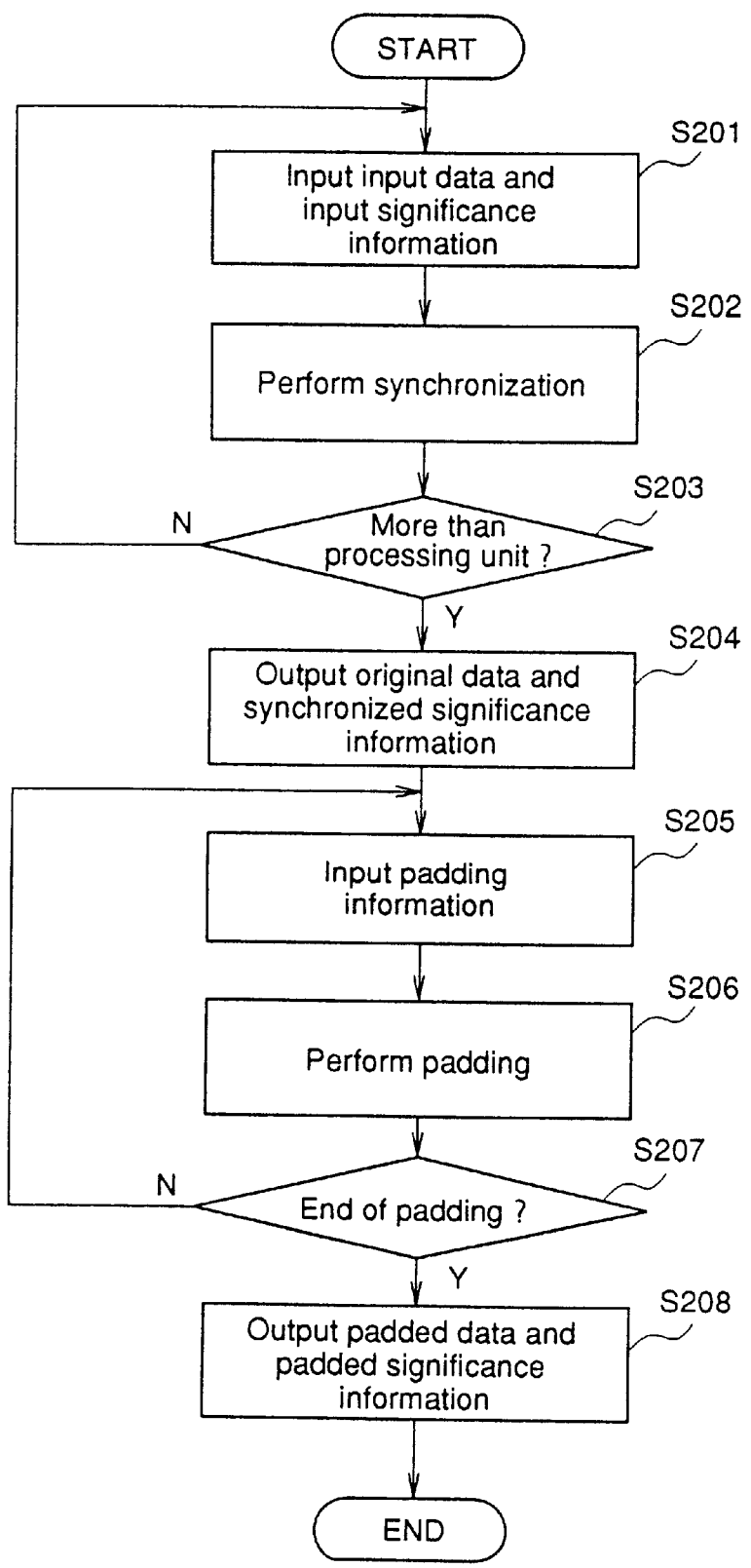
FIG. 2 is a flowchart illustrating the processing procedure performed by a storage and holding means 101 induced in the data padding apparatus of the first embodiment.
Figure 3:
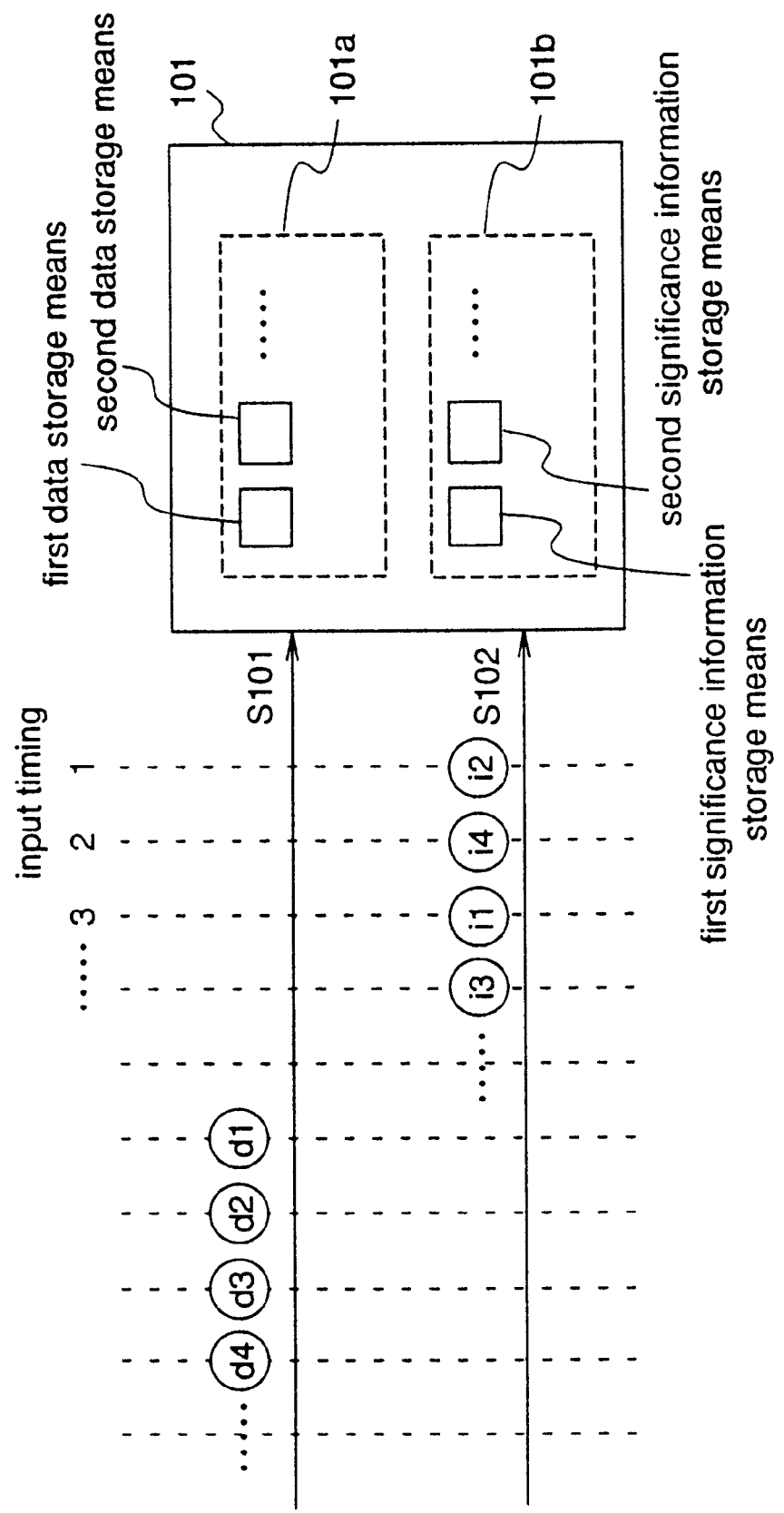
FIG. 3 is a diagram for explaining a synchronization performed by the storage and holding means 101 of the data padding apparatus of the first embodiment.
Figure 5:
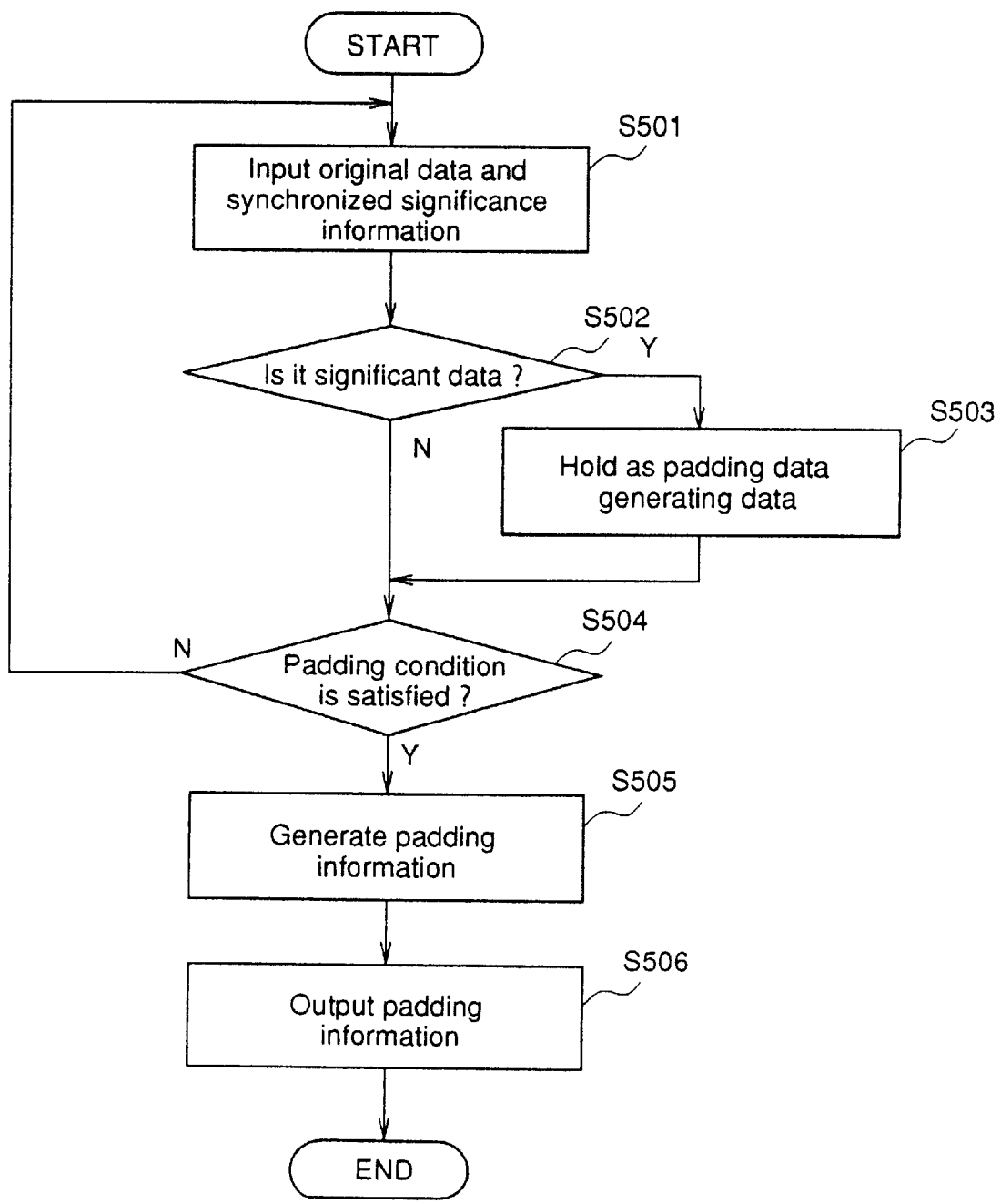
FIG. 5 is a flowchart illustrating the processing procedure performed by a padding information holding means 102 included in the data padding apparatus of the first embodiment.

FIG. 2 is a flowchart showing the processing procedure of the storage and padding means 101, FIG. 3 is a diagram for explaining the synchronization in the storage and padding means 101, FIGS. 4a) and 4b) are diagrams for explaining the padding processing, and FIG. 5 a flowchart showing the processing procedure of the padding information holding means 102. The operation for data processing by the data padding apparatus of the first embodiment will be explained below with reference to FIGS. 1 to 5; Initially, a brief overview thereof is given in "A. Outline", followed by the detailed descriptions of the respective processes in "B. Synchronous Processing", "C. Generation of Padding Information", "D. Padding Processing", and "E. Iteration of Padding Information Generation and Padding Process".

A. Outline

To the data padding apparatus of the first embodiment, input data S101 and input significance information S102 that is the significance information about the input data are input. In the storage and padding means 101, the input data S101 and the input significance information S102 are stored in the data storage means and the significance information storage means included in the storage and padding means 101, respectively, to be held therein. When the input data S101 and the input significance information S102 are stored in the data storage means and the significance information storage means, respectively, the storage and padding means 101 performs synchronization such that the data and the significance information corresponding to the data are stored in synchronization.

Then the storage and padding means 101 sequentially reads the data held in the data storage means and the significance information held in the significance information storage means, which data and information have synchronism between them, according to a given method, and outputs them to the padding information holding means 102 as original data S103 and synchronized significance information S104 which have synchronism between them.

The padding information holding means 102 detects a significant part of the original data S103 using the synchronized significance information S104 and generates padding data based on the significant part. Padding data is the data used for replacing an insignificant part of the data to be padded in padding process. The padding information holding means 102 generates padding address information that indicates an insignificant region of the original data S103 using an address specifying a storage location in the storage means, using the synchronized significance information S104. The padding information holding means 102 outputs padding information that consists of padding data S105 and padding address information S106 to the storage and padding means 101.

The storage and padding means 101 performs padding to the original data held in the included data storage moans using the padding data S105 and the padding address information S106. Initially, the storage and padding means 101 obtains a location for which replacement should be performed in padding processing, from the padding address information indicating the insignificant region of the data. Then, for the area obtained in the data storage means, replacement processing is performed with the padding data S105 to generate the data subjected to padding processing (hereinafter referred to as padded data). As well, the storage and padding means 101 generates the significance information subjected to padding processing which indicates that the area in the included significance information storage means is significant (hereinafter this information is referred to as padded significance information).

The padded data S107 and the padded significance information S108 output from the storage and padding means 101 are used as the outputs of this data padding apparatus.

B. Synchronous Processing

The padding processing in the storage and padding means 101 is performed to the data and significance information which are synchronized, as in the case of the conventional data padding apparatus.

FIG. 4a) is a diagram for explaining the original data S103 and the synchronized significance information S104 which have synchronism between them, the data and information being objects of padding processing. As shown in the figure, the original data S103 consists of component data d1, d2 . . . . A certain number of pieces of the component data constitute one piece of processing unit data, and in units of this processing unit data, padding processing is performed. Here it is assumed that a group of component data d1 to d8 constitutes one piece of processing unit data. The synchronized significance information S104 consists of pieces of component significance information i1, i2 . . . . Component significance information is the binary information in one-to-one correspondence with component data that indicates whether the corresponding component data is significant or not. The pieces of component significance information i1 to i8 shown in the figure are in correspondence with the pieces of component data d1 to d8, indicating that d3 and d7 are significant and the other pieces of component data are insignificant.

Figure 49:
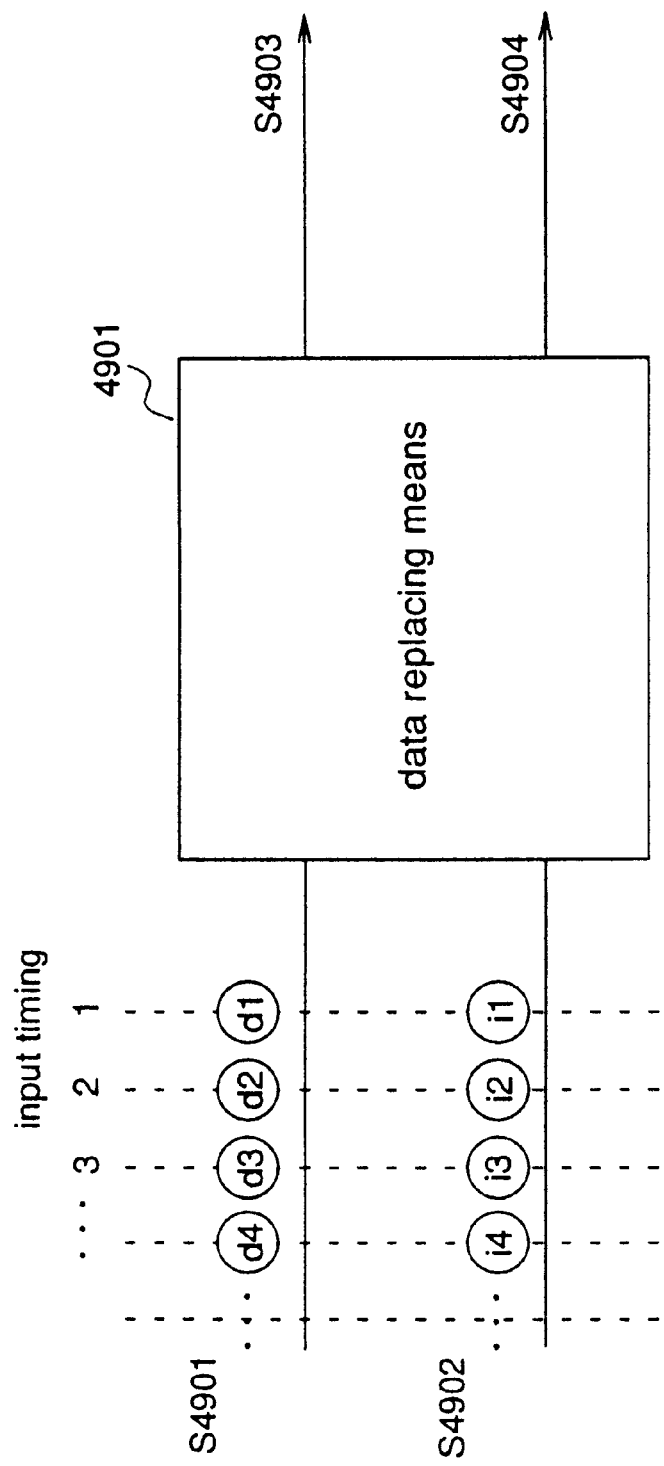
FIG. 49 is a block diagram showing the configuration of a data padding apparatus in a prior art.
Figure 50:
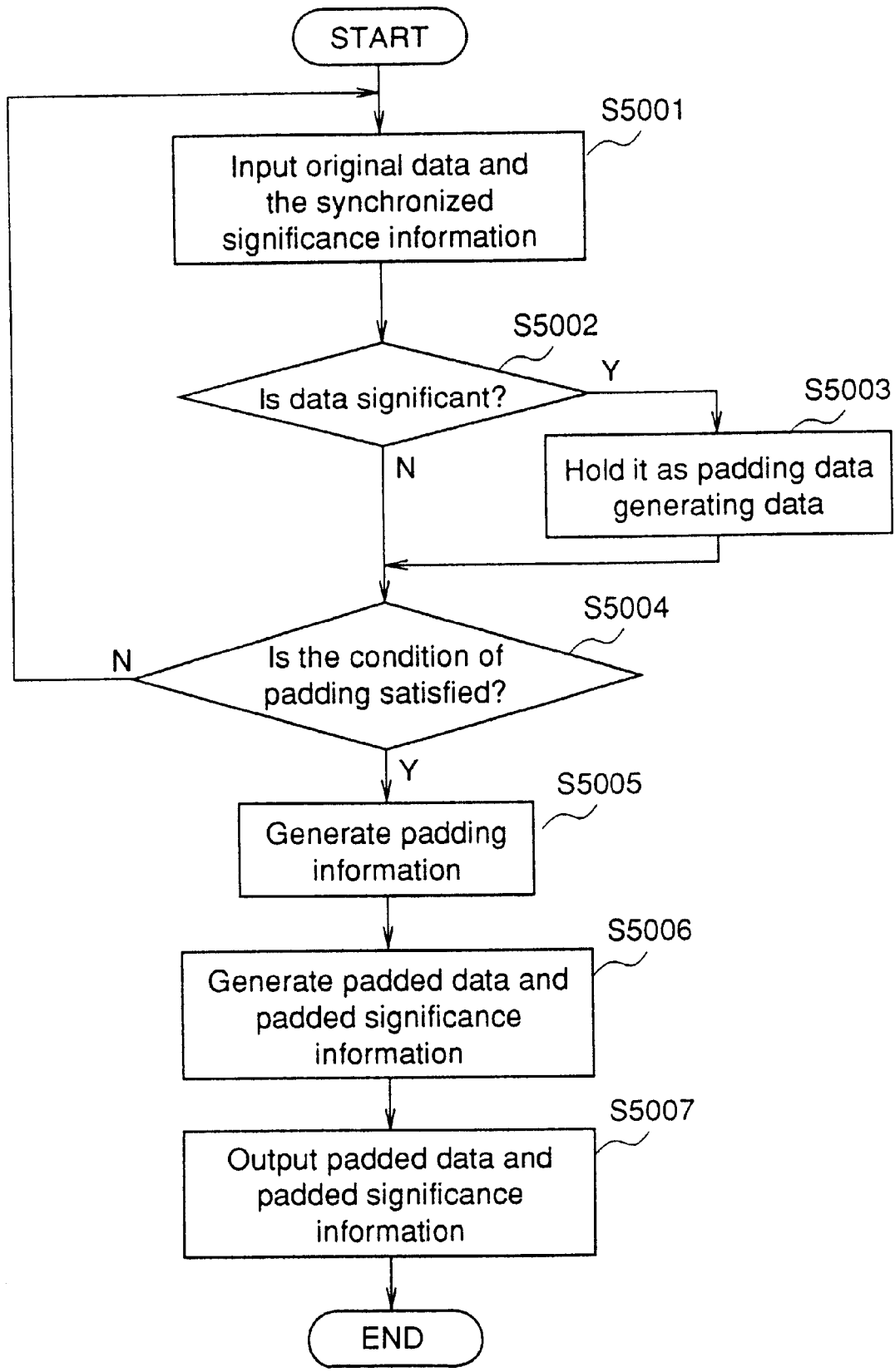
FIG. 50 is a flowchart showing the processing procedure of padding in the prior art data padding apparatus.

As described above, in the prior art data padding apparatus, it is assumed that data and significance information are input smoothly according to the orders allowing a correspondence between data and information, as shown in FIG. 49; in other words, the input is performed in a form which allows synchronization between the data and the information On the other hand, in the data padding apparatus of the first embodiment, it is not necessary to perform synchronous inputting and non-synchronous inputting may be performed as shown in FIG. 3 because the synchronization is established in the storage by means of the storage and padding means.

As shown in FIG. 3, the pieces of component data constituting the input data S101 do not correspond to the pieces of the component significance information constituting the input significance information S102, and the data and the information are input to the storage and padding means 101 at different input timings.

The data storage means 101a included in the storage and padding means 101 comprises a first data storage means, a second data storage means . . . , and an Nth data storage means, each of which data storage means stores one piece of component data. The significance information storage means 101b comprises a first significance information storage means, a second significance information storage means . . . , and an Nth significance information storage means, each of which significance information storage means stores one piece of component significance information.

At the beginning of the processing procedure shown in the flowchart of FIG. 2, the storage and padding means 101 inputs input data S101 and input significance information S102 in step 201. Then, in step 202, storage and synchronization are performed. The storage and padding means 101 sequentially stores the input data S101 in such an order that the included component data d1 is sliced in the first data storage means and the component data d2 is stored in the second data storage means . . . , thereby realizing a storage status which enables the data to be sequentially taken in an order of i1, 12, . . . . Similarly, the storage and padding means 101 sequentially stores the input significance information S102 in such an order that the included component significance information i2 is stored in the second significance information storage means and the significance information data i4 is stored in the fourth significance information storage means . . . , thereby realizing a storage status which enables the significance information to be sequentially taken in an order of i1, . . . .

In step 203, it is decided whether the input reaches an amount of a processing unit of padding processing. When it is found that the input reaches it, the steps at following stages from step 204 are performed; when it is found not so, the operation is returned to step 201 where input and synchronization are performed. Steps 201 to 203 are iterated until it is decided that the amount equal to a processing unit has been input. As shown in FIG. 4a), one processing unit data consists of eight pieces of component data (d1 to d8).

When step 204 is performed following the decision in step 203, the storage and padding means 101 outputs the original data S103 and the synchronized significance information S104 which are in synchronization shown in FIG. 4d) to the padding information holding means 102.

The original data S103 and the synchronized significance information S104 are used as the outputs of the data padding apparatus, too. For example, when object coding in which each object is treated as an unit is performed in picture processing, the original data S103 and the synchronized significance information S104 are used for synthesizing processing which synthesizes objects to generate one picture.

C. Generation of Padding Information

At the beginning of the processing procedure of the flowchart of FIG. 5, initially, the padding information holding means 102 receives the original data S103 and the synchronized significance information S104 from the storage and padding means 101 in step 501. Then, in step 502, for each of the component data constituting the original data S103, the padding information holding means 102 decides whether the component data is significant or not, using the synchronized significance information S104. When the data is significant, step 503 is performed where the significant component data is held as the data for generating padding data (hereinafter referred to as padding data generating data), followed by step 504. In step 504, it is derided whether padding condition is satisfied or not, and when the condition is satisfied, step 505 is performed where padding information is generated. On the other hand, when it is not satisfied, the operation is returned to step 501, and the following steps to step 504 inclusive are iterated. This iteration is continued until a decision is made in step 504 that the padding condition is satisfied.

The data padding apparatus according to the first embodiment performs the same padding processing performed by the prior art data padding apparatus which is shown in FIGS. 51a) and 51b) The decision in step 503 is performed in the same manner as in the case of the prior art data padding apparatus; it is decided that padding condition is satisfied when two pieces of padding data generating data are held or when endvertex information is obtained and one piece of padding data generating data is held.

Therefore, when the original data shown in FIG. 4a) is treated as a group of component data d1, d1 . . . and sequentially processed, steps 501 to 504 are performed in the following way. In step 501, component data d1 and the component significance information corresponding to this data are input, and since the decision is made in step 502 that the data is insignificant according to the component significance information, step 503 is skipped to perform step 504.

From the fact that no other significant data except endvertex information is available because the processing has just started, it is decided in step 504 that the padding condition is not satisfied and the operation is returned to step 501. In step 501, component data d2 and the component significance information corresponding to this component data are input and the same procedure is performed, followed by step 501 again.

Next, when component data d3 and the component significance information corresponding to this data are input, the decision is made in step 502 that the data is significant, and step 503 is performed where the component data d3 is held as padding data generating data. Then, in step 504, it is decided that the padding condition is satisfied because endvertex information is available and padding data generating data d3 is held.

When the padding condition is satisfied and step 505 is performed, the padding information holding means 102 generates padding data according to the padding data generating data as well as padding address information and holds the generated padding data and padding address information. In step 506, the padding data S105 and the padding address information S106 are output to the storage and padding means 101.

Therefore, when step 505 is performed, one piece of padding data is generated from padding data generating data d3, and the data identical to d3 is generated as padding data P1 which is to be replaced with the component data d1 and d2 as the constituents of the original data.

The padding address information is generated as the information specifying which data storage means stores the component data to be replaced, that is, the insignificant component data storage media such as semiconductor memories are used as the data storage means and the significance information storage means, and padding address information can use memory address that uniquely specifies a storage area in the storage medium.

Since the data to be replaced are d1 and d2, the padding address information generated indicates that the first and second data storage means within the data storage means 101*a* hold d1 and d2, respectively. In step 506, the padding data S105 and the padding address information S106 both generated in step 505 are output to the storage and padding means 101.

The padding information holding means 102 performs repetitive operation according to the flowchart of. FIG. 5, assuming that after steps 505 and 506, holding of padding data generating data is performed in the same manner as in the case of the prior art data padding apparatus.

D. Padding Processing

In the flowchart of FIG. 2, when padding information is input to the storage and padding means 101 in step 205, padding processing is performed in step 206. The storage and padding means 101 is informed from the padding address information S106 that the component data to be replaced in padding processing are d1 and d2 which are held in the first and second data storage means, respectively Therefore, the storage and padding means 101 replaces d1 and d2 with p1 input as padding data S105. To the component data d3, the storage and padding means 101 does not perform padding. Further, the storage and padding means 101 makes i1 and i2, which correspond to the original component data d1 and d2 subjected to replacement, as the significant information among the component significance information held in the first to third significance information storage means.

In step 207, it is decided whether the padding processing to processing unit data has been completed or not; if it has been completed, step 208 is performed following this step, whereas if it has not been completed, the operation is returned to step 205 where padding data is input and padding processing is performed. Steps 205 to 207 are performed repetitively until a decision is made in step 207 that the processing has been completed.

In this case, in is only d1 to d3 that have been processed and all of the eight pieces of data constituting a processing unit have not been processed. Therefore, decision is made that the processing in not completed yet and the operation is returned to step 105.

F. Iteration of Padding Information Generation and Padding Processing

The padding information holding means 102 performs processing to the subsequent component data from d4 according to the flowchart of FIG. 5, as described in "C. Generation of Padding Information". To the component data d4 to d6, the processing for d1 and d2 is performed, and decision is made in step 504 that the padding condition is not satisfied, whereby step 505 and following steps are not performed.

Then, is step 501, when component data d7 and the corresponding component significance information is input, decision is made in step 502 that the data is significant, followed by step 503. This causes a status that two pieces of padding data generating data are held and step 504 accordingly makes a decision that the padding condition is satisfied, followed by steps 505 and 506.

In step 505, padding data is generated according to the two pieces of padding data generating data. More specifically, as the padding data to be replaced with insignificant component data d4 to d6, padding data p2 which is equal to (d3+d7)/2 is generated based on the padding data generating data (the significant component data) d3 and d7. As in the case of the prior art data padding apparatus, holding the padding data generating data d3 which has been held prior to the other generating data is stopped, and the other padding data generating data d7 only is held.

Padding address information is generated in the same manner described in "C. Generation of Padding information", and padding data S105 and padding address information S106 are output to the storage and padding means 101.

In the storage and padding means 101, steps 205 and 206 are performed to replace d4, d5, and d6, which are respectively stored in the fourth to sixth data storage means, with p2 Then the component significance information i4 to i6 corresponding to the original component data d4 to d6 are changed to become significant. In step 207, decision is made that the processing is not completed yet and the operation is returned to step 205 again.

The padding information holding means 102 repeats the processing procedure shown in the flowchart of FIG. 5. After iteration of steps 501 to 504 for insignificant component data d8, endvertex information is held corresponding to the component data d8 which is the end constituent of the processing unit data. Therefore, when step 504 is performed again, steps 505 and 506 follow this step because the padding data generating data (d7) and the endvertex information have been held. As the padding data to be replaced with the component data d8, p3 identical to the padding data generating data d7 is generated based on the data d7.

In step 506 shown in FIG. 5, the padding data S105 which is p3 and the padding address information S106 indicating the eighth data storage means are output to the storage and padding means 101.

In the storage and padding means 101, steps 205 to 206 are performed to replace d8 stored in the eighth data storage means with p3. Then, the component significance information stored in the eighth significance information storage means is changed so that it denotes "significant". Thus, the padded data shown in FIG. 4*b*) is generated.

Thereafter, following the decision in step 207 that the processing to the processing unit data has been completed, step 208 is performed where padded data S107 and padded significance information S108 are used as the outputs of this data padding apparatus.

As described above, the data padding apparatus according to the first embodiment comprises a storage and padding means 101 and a padding information holding means 102. For input data S101 and input significance information S102 input with no assured synchronism between them, the storage and padding means 101 performs synchronization to generate original data S103 and synchronized significance information S104 which are synchronized. The padding information holding means 102, using the original data S103 and the synchronized significance information S104, generates padding information consisting of padding data S105 and padding address information S106, from which information the storage and padding means 101 performs padding. Therefore, this apparatus can process a set of data and significance information having no assured synchronism between them which might be processing objects for various coding and decoding methods, with improved efficiency, resulting in a more versatile data padding apparatus.

In the prior art data padding apparatus shown in FIG. 49 and the coding apparatus and decoding apparatus including such data padding apparatus, data to be processed and the accompanied information are normally stored in an input buffer for the time being before being input. In the data padding apparatus according to the first embodiment, however, the data storage means and the significance information storage means included in the storage and padding means 101 serve as an input buffer, and thus this apparatus can perform synchronization for appropriate padding processing by fully utilizing the device resources such as the memories used as input buffer, preventing an increase in circuit size due to addition of the dedicated storage media and processing circuits for previous processing (synchronization).

Although in the first embodiment the input data S101 and the input significance information S102 with no assured synchronism between them are stored and subjected to synchronization, on component data basis for the data S101 and on component significance information basis for the information S102, respectively, the data S101 and the significance information S102 can be input as the input data and input significance information which are non-synchronous, on processing unit data basis for the data S101 and on processing unit significance information basis for the information S102, respectively, and then stored and subjected to synchronization on processing unit basis. In this case, the data storage means included in the storage and padding means 101 comprises first to Nth data storage means each capable of holding processing unit data, and the significance information storage means can perform holding in the same manner.

In the first embodiment, a synchronization realizing a storage status which allows to specify a correspondence can be performed on the assumption that data and significance information are held in first to Nth storage means, respectively. However, it is not the synchronization only that can realize such storage status, and this status can be realized by using a storage method capable of determining a correspondence between data and significance information by specifying storage location on a storage medium.

Embodiment 2

A data padding apparatus according to a second embodiment of the present invention performs synchronization before padding as in the first embodiment, and determines a padding method corresponding to significance information.

Figure 6:
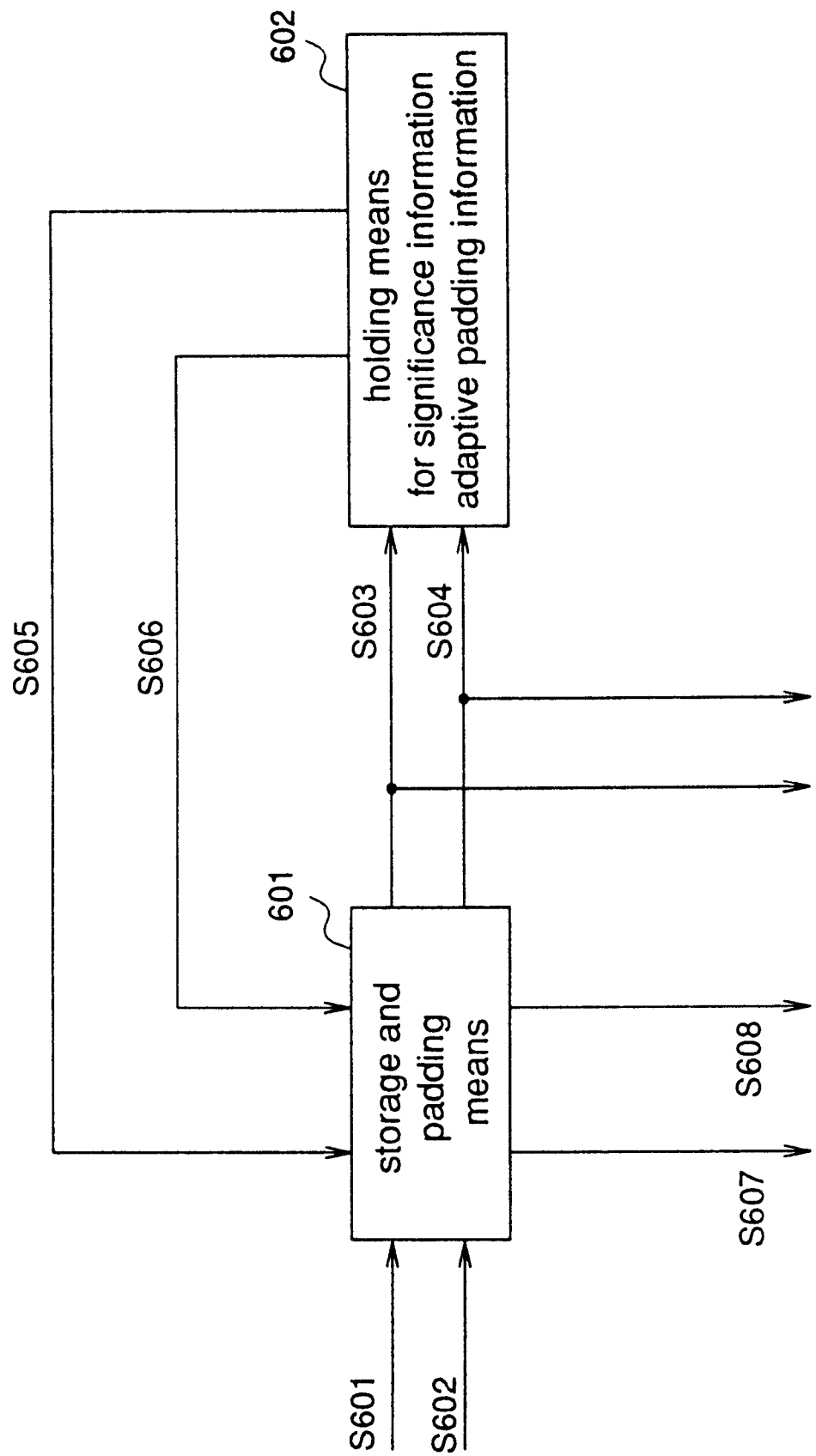
FIG. 6 is a block diagram illustrating the construction of a data padding apparatus according to a second embodiment of the present invention.

FIG. 6 is a block diagram illustrating the construction of the data padding apparatus according to the second embodiment. As shown in the figure, the data padding apparatus of the second embodiment comprises a storage and padding means 601 and a holding means for significance information adaptive padding information 602. The storage and padding means 601, like the storage and padding means 101 of the first embodiment, includes a data storage means for storing data to be padded and a significance information storage means for storing significance information used for padding processing. This storage means performs synchronization to the data and significance information using the data storage means and the significance information storage means, and then performs padding to the data stored in the data storage means using the information obtained from the holding means 602 which will be described later. The holding means for significance information adaptive padding information 602 determines a padding method employed for padding processing using the synchronized data and significance information from the storage and padding means 601, and generates padding information that consists of padding data and padding address according to the determined padding method. Padding method is determined based on a relation between the locations of significant and insignificant component data constituting the data to be padded and the correlation, and data properties including a method of generating digital data which is an object of padding processing.

Figure 7:
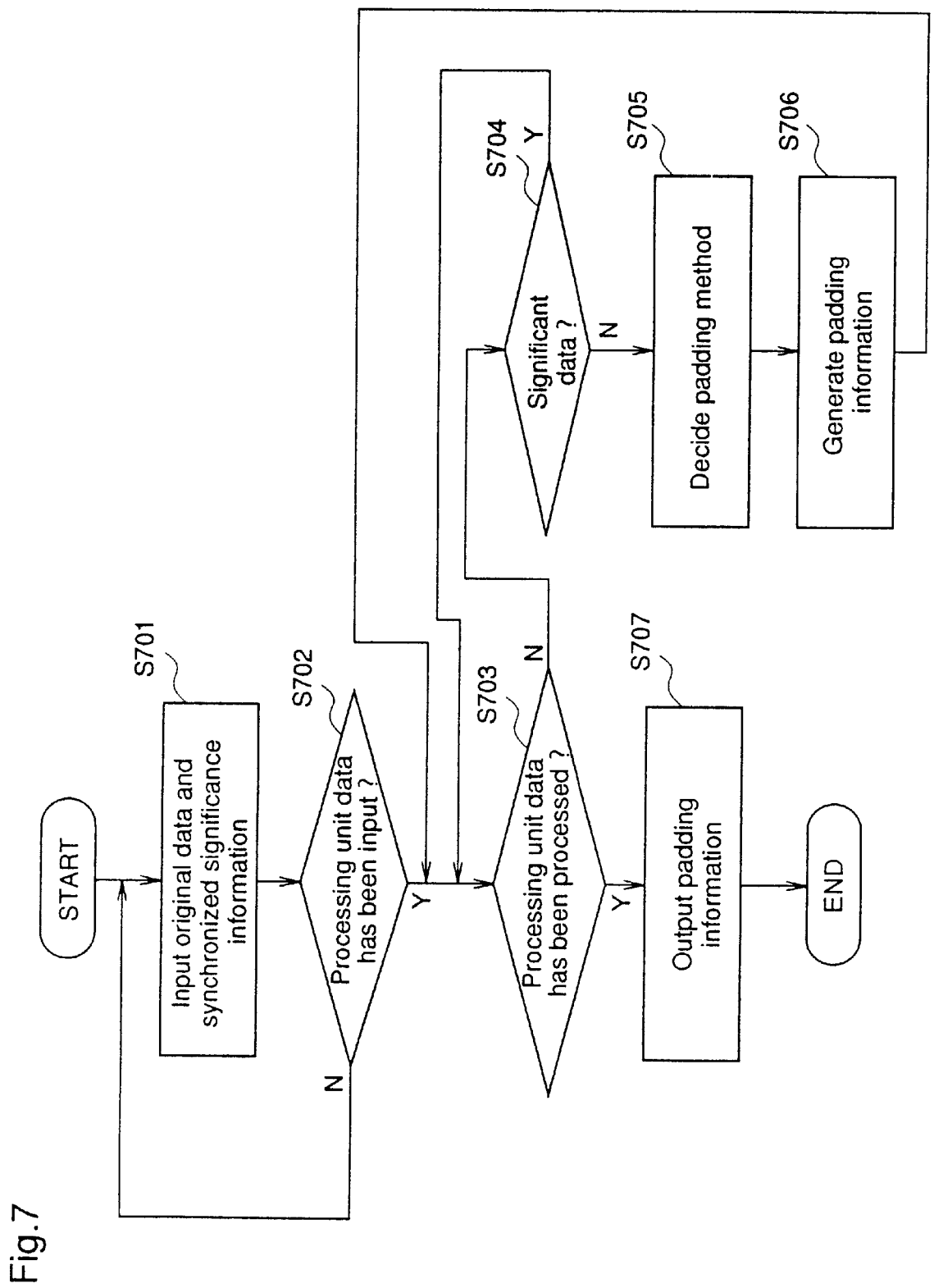
FIG. 7 is a flowchart illustrating the processing procedure performed by a holding means for significance-information adaptive padding information 602 included in the data padding apparatus of the second embodiment.
Figure 8:
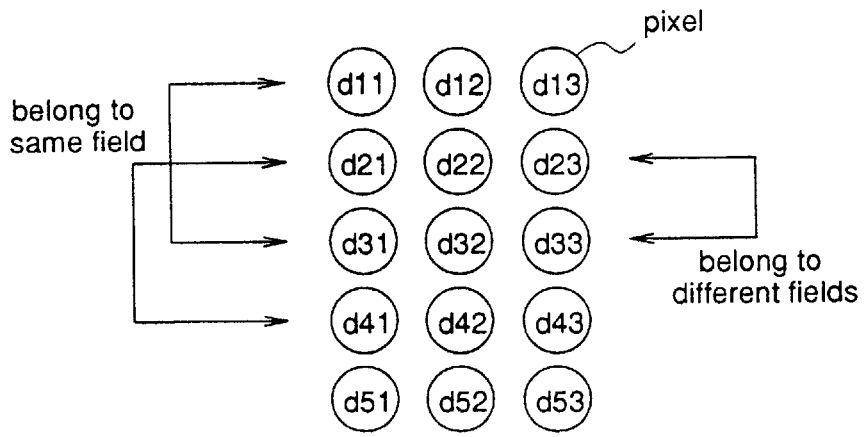
FIGS. 8a) and 8b) are diagrams for explaining decision of padding method in the second embodiment.
Figure 8:
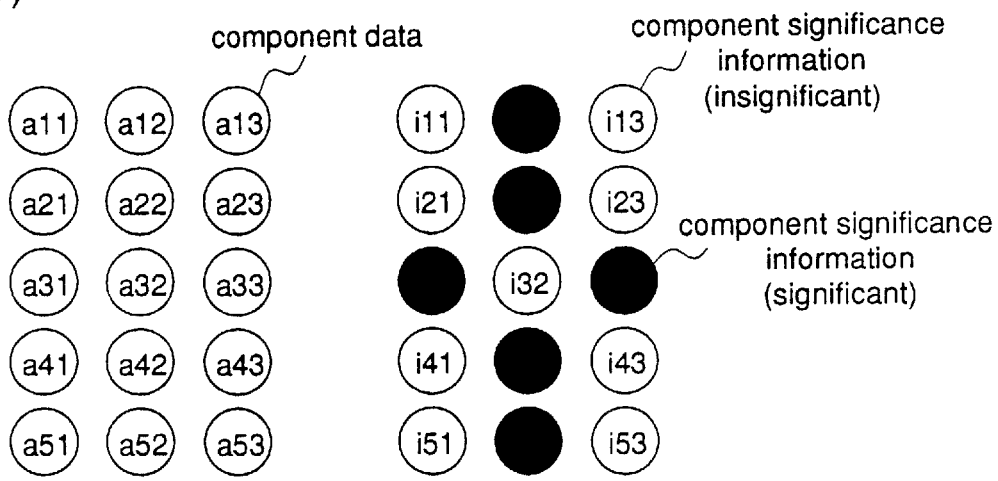

FIG. 7 is a flowchart showing the processing procedure of the holding means 602 included in the data padding apparatus according to the second embodiment. FIGS. 8*a*) and 8*b*) are diagrams for explaining determination of padding method in the second embodiment.

Here a description is given of the operation of the data padding apparatus according to the second embodiment; Since the storage and padding means 601 performs synchronization and padding in the same manner as in the first embodiment, the operation of the holding means 602 will be mainly described along the flowchart of FIG. 7, with further reference to FIGS. 6 and 8*a*) and 8*b*).

In step 701 shown in FIG. 7, the holding means 602 receives original data 3600 and synchronized significance storage and padding means 601 on component basis. In the second embodiment, since padding method is determined using processing unit data and processing unit significance information, in a next step 702, it is decided whether processing unit data has been input or not. If the data has been input, step 703 and following steps are performed, but if it is not input yet, the operation is returned to step 701 and steps 701 and 702 are iterated until the decision is made in step 702 that the processing unit data has been input.

In step 703, it is decided if determination of a next padding method and generation of padding information have been performed to processing unit data and processing unit information. When both of them have been performed, step 707 is performed, but when they are not performed yet, the processings to component unit after step 704 are performed.

In step 704, it is decided whether component data to be processed is significant or not. When the data is significant, the following processings are not performed and the operation is returned to step 703, but when the data is insignificant, steps 705 and 706 are performed. In step 705, padding method is determined. In step 706, padding data and padding address are generated according to the padding method determined in step 705 and held.

Hereinafter a description is given of determination of padding method taking the case of picture data as an example. In general, for making two-dimensional data such as still picture data one-dimensional data, two-dimensional screen which consists of pixels as discrete data is scanned according to a given rule to obtain one-dimensional data comprising arrays of pixels. With one screenfull (one frame) of still picture data, normally, screen is horizontally scanned, which scanning is realized by interlaced scanning that horizontal scan lines constituting a screen are alternately scanned, or by non-interlace scanning that scanning is performed sequentially.

When interlaced scanning is performed, it is considered that one frame of still picture data consists of an even filed comprising scan lines in even order and an odd field comprising scan lines in odd order. In the coding process for the data generated in interlaced scanning method, an intensity of correlation between the odd field and the even field is judged, and according to the judgement, the pixels used for padding processing is determined. When it is judged that there is a higher correlation in a single field, padding processing is performed using the adjacent pixels within the field. On the contrary, when there is a higher correlation within one frame, that is, a high correlation between pixels on adjacent scan lines of different fields, padding is performed using adjacent pixels within the frame. Judgement on the correlation between fields can be performed pursuant to MPEG2 (TEST MODEL).

FIG. 8a) is diagram for explaining an instance of determination of padding method, and illustrates the above-described case where picture data is a processing object. In the figure, d11 to d53 are some of the pixels constituting one frame picture as two-dimensional data, and a group of d11, d12, and d13, a group of d21, d22, and d23, . . . are groups of pixels located on single lines in the case of this picture data. The group of d11, d12, d13 and the group of d21, d22, d23 are the groups of pixels located on adjacent pixel lines and belong to different fields. On the other hand, the group of d11, d12, d13 and the group of pixels d31, d32, d33 belong to a single field. With pixel d32 as an object to be padded, when padding is performed using the adjacent pixels in a single field, padding pixel to be replaced with the pixel d32 is obtained using pixels d12, d31, d33, and d52; When padding is performed using the adjacent pixels within a single frame, padding pixel to be replaced with the pixel d 32 is obtained using pixels d22, d31, d33, and d42. A padding method to be used can be determined depending on an intensity of a correlation between one field including the group of d11 to d13, the group of d31 to d33, and the group of d51 to d52 . . . , and another field including the group of d21 to d23 and the group of d41 to d43, according to MPEG2.

FIG. 8b) shows the data as a processing object in the second embodiment. The data a11 to a53 shown in the figure are a group of component data constituting a part of two-dimensional data, like the pixel group shown in FIG. 8a).

The attached numerals a11 to a53 represent the addresses of the respective component data, and in this embodiment, the address used specifies one of the first to Nth data storage means included in the storage and padding means.

In the second embodiment, the holding means for significance information adaptive padding information 602 decides between two prescribed padding methods in step 705 of FIG. 7 (hereinafter the two padding methods are referred to as first and second padding methods). In the first padding method with a32 as an object to be padded, padding data to be replaced with data a32 is generated using component data a12, a31, a33, and a 52. In the second padding method with a32 as an object to be padded, padding data to be replaced with data a32 is generated using component data a22, a31, a33, and a42. The determination of padding method is performed based on an intensity of correlation as in the case of picture data.

In step 706 of FIG. 7, padding data is generated using selected component data, according to the padding method determined in step 705. Padding address that specifies insignificant component data is also generated as in the first embodiment.

When steps 705 and 706 are performed, the operation is returned to step 703 where it is decided whether one piece of processing unit data has been processed or not. Until decision is made in this step that the data has been processed, steps 703 to 706 are iterated for performing the processing to the subsequent component data included in the same processing unit data. When step 707 is performed according to the decision in step 703, the holding means 602 outputs padding data S605 and padding address S606 to the storage and padding means 601.

As described above, the data padding apparatus according to the second embodiment comprises a storage and padding means 601 and a holding means for significance information adaptive padding information 602. Therefore, this padding apparatus not only processes input data and input significance information with no synchronism between them appropriately by performing synchronization in the same manner as in the first embodiment, but determines a padding method corresponding to data properties, thereby performing more appropriate padding.

Further, the data padding apparatus according to the second embodiment can properly deal with the case of using the component data which is not within the processing unit data including the component data to be padded for generating padding data, in other words, the case of using adjacent pieces of processing unit data or the data having been padded.

In the second embodiment, padding method is determined based on a relation between the locations of significant and insignificant component data and the correlation, but this determination can be also made based on a data generation method which is one of the properties of the data to be padded. In the instance described above, it is decided whether to make field/frame selection based on a data property indicating whether the scanning method is interlaced scanning or not, and when the method is interlaced scanning, a choice is made between the first padding method and the second padding method.

Although in the second embodiment padding method is determined based on a judgement on the data to be processed, the data padding apparatus can determine a padding method in advance and specify it. For example, when the data padding apparatus is used for coding processing, judgement is made on a prescribed number of pieces of data, and a padding method specified according to the judgement is used for such number of pieces of data; When the data padding apparatus is used for decoding processing, according to the information multiplexed with the coded data which is a processing object, the padding method indicated by the information is employed to the pieces of data whose number is indicated by the information.

Embodiment 3

A data padding apparatus according to a third embodiment of the present invention performs padding after synchronization as in the first embodiment, and specifies a continuous region as an object to be padded.

Figure 9:
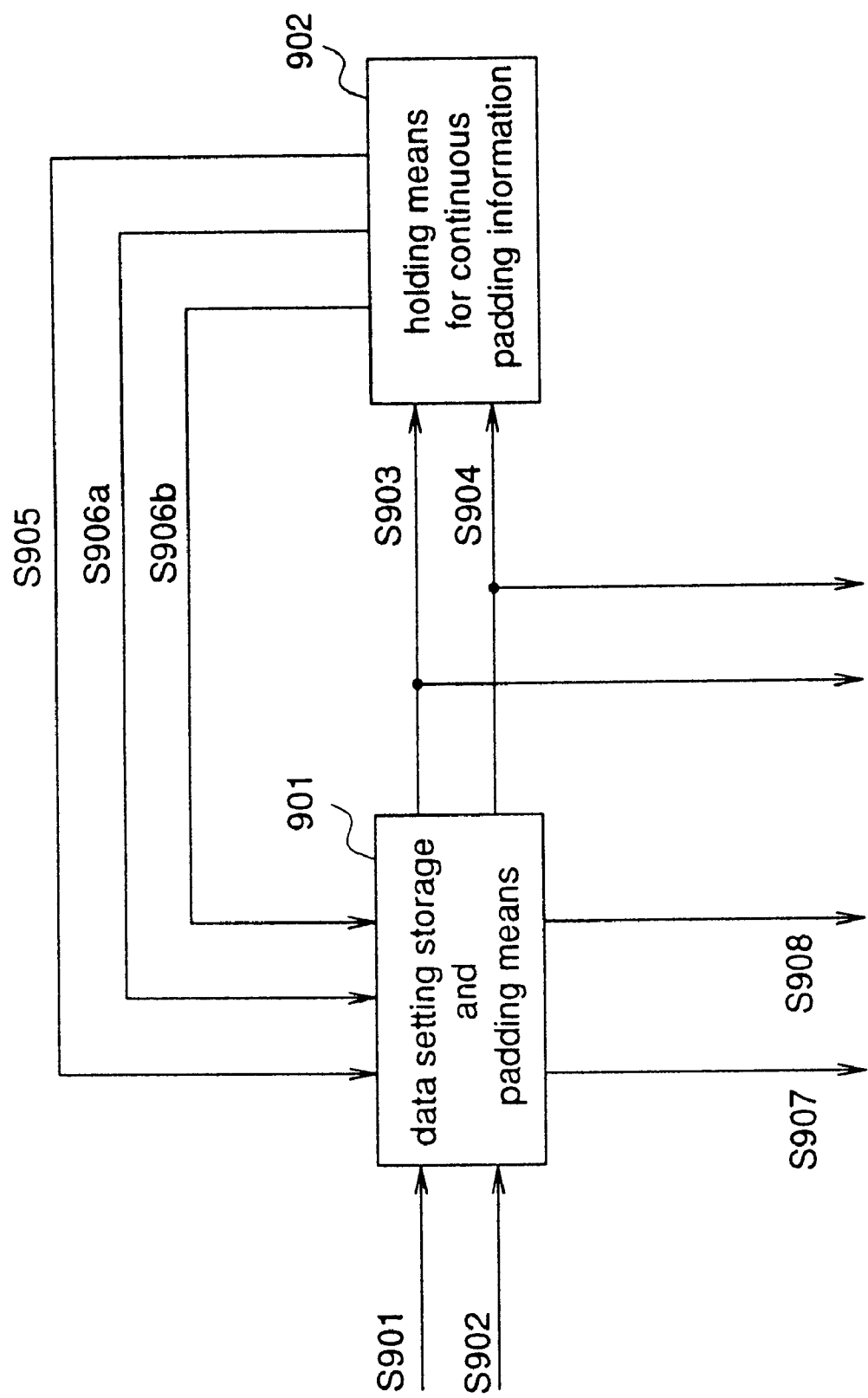
FIG. 9 is a block diagram illustrating the construction of a data padding apparatus according to a third embodiment of the present invention.

FIG. 9 is a block diagram illustrating the construction of the data padding apparatus according to the third embodiment. As shown in the figure, the data padding apparatus of the third embodiment comprises a data setting storage and padding means 901 and a holding means for continuous padding information 902.

The data setting storage and padding means 901 performs synchronization and padding to data and significance information like the storage and padding means 101 of the first embodiment, but in the padding, this means performs continuous padding to tho data stored in a data storage means included therein using the information obtained from the holding means for continuous padding information 902 which will be described later. The holding means 902 generates padding information as in the first embodiment, but what is generated in the third embodiment are padding starting address information and padding ending address information that specify a range of contiguous addresses while padding address information is generated in the first embodiment.

Figure 10:
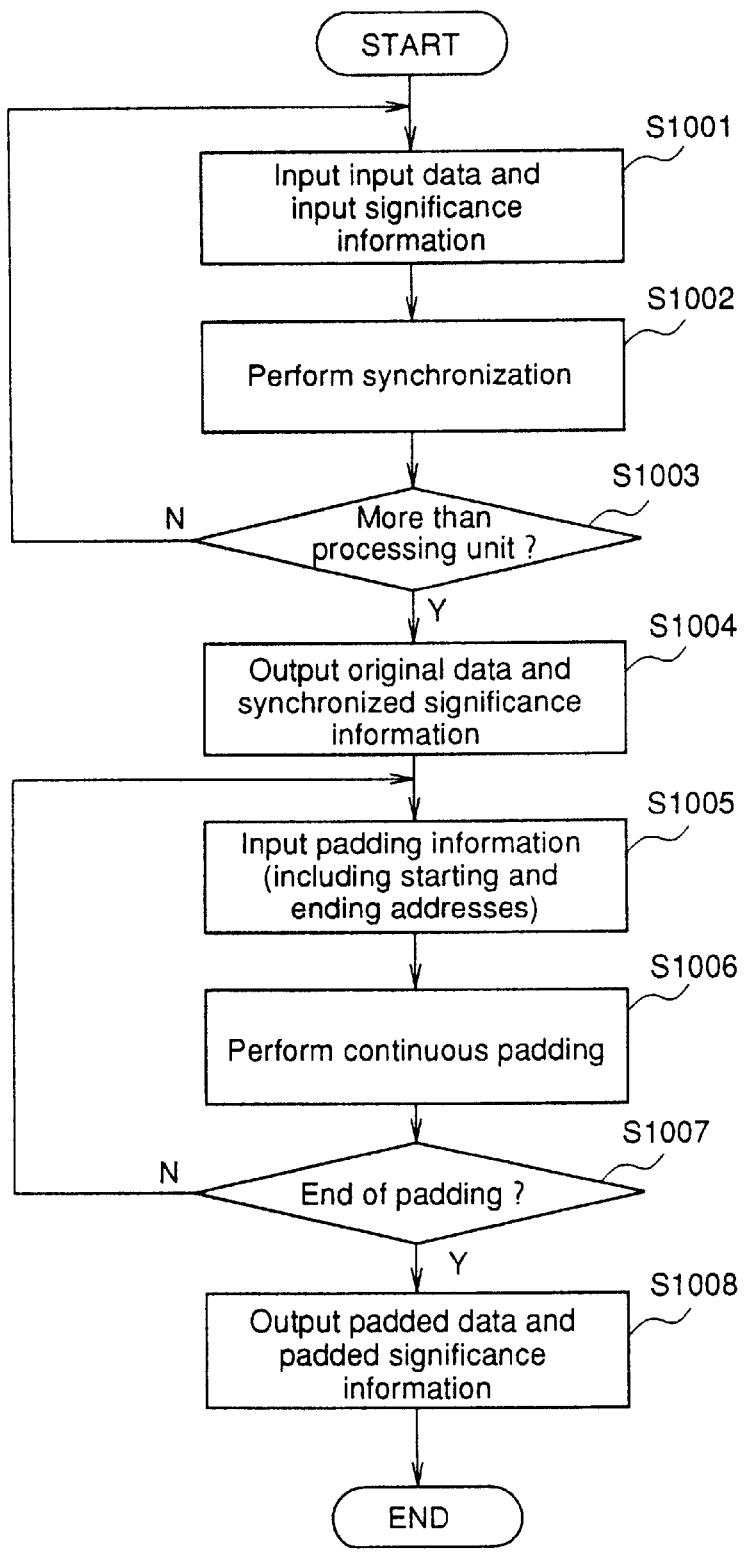
FIG. 10 is a flowchart illustrating the processing procedure performed by a data setting storage and padding means 901 included in the data padding apparatus of the third embodiment.
Figure 11:
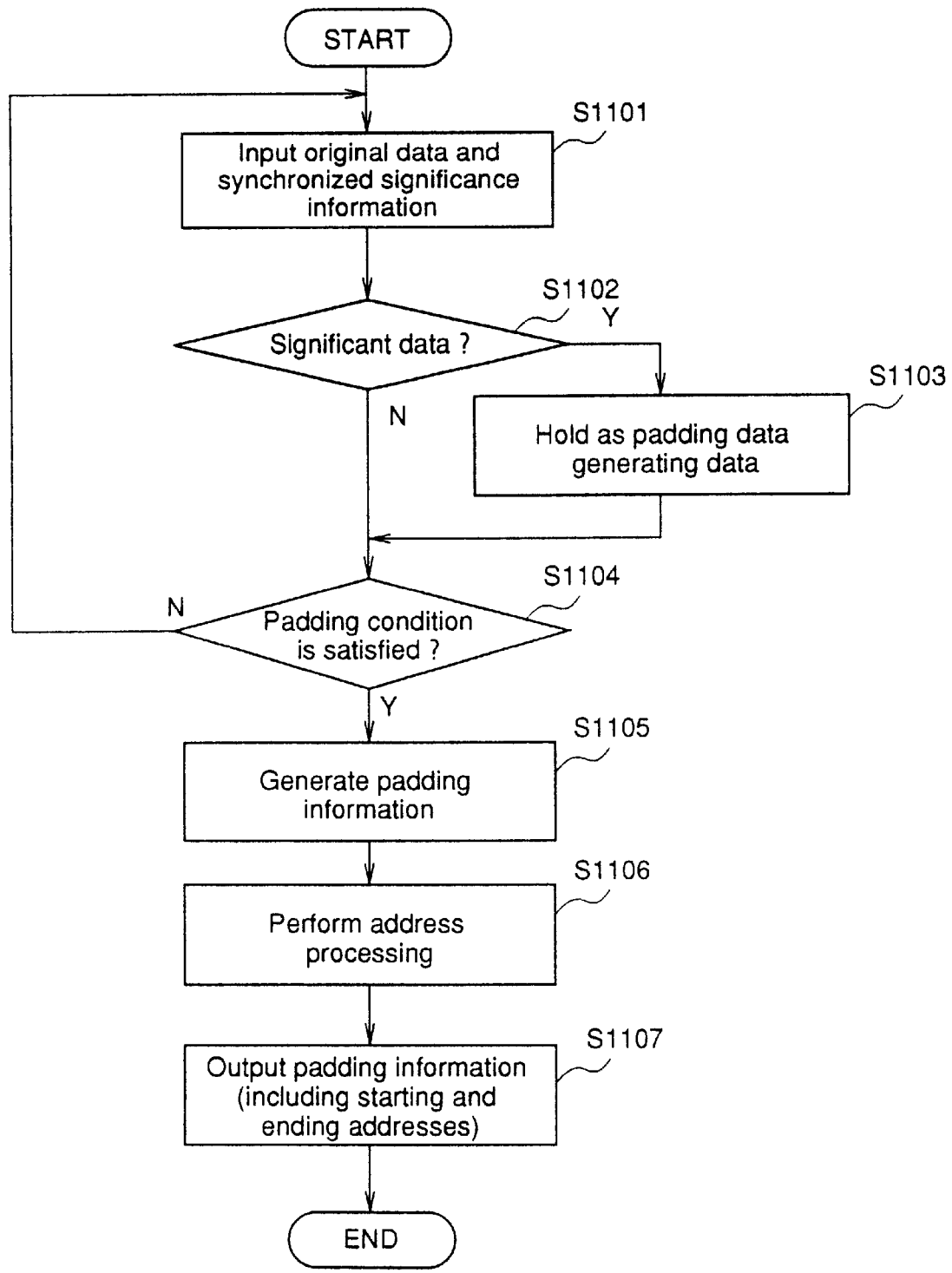
FIG. 11 is a flowchart of the processing procedure performed by a holding means for continuous padding information 902 included in the data padding apparatus of the third embodiment.

FIG. 10 is a flowchart showing the processing procedure of the data setting storage and padding means 901, and FIG. 11 is a flowchart showing the processing procedure of the holding means 902. In the operation of the data padding apparatus according to the third embodiment, the synchronization performed by the data setting storage and holding means is performed in the same manner as the operation of the apparatus according to the first embodiment. Therefore, a description is given of the operation for generation of padding information and padding processing with reference to FIGS. 9 to 11.

The processing procedure of the data setting storage and padding means 901 shown in FIG. 10 is identical to that according to the first embodiment shown in FIG. 2 except for steps 1005 and 1006.

In step 1005, padding starting address information S906a and padding ending address information S906b are input with padding data S905 as padding information, as shown in FIG. 9. In step 1006, padding is performed using the padding starting address information S906a and padding ending address information S906b in place of the padding address information used in the first embodiment.

Padding starting address information S906a and padding ending address information S906b indicate an address range in combination, and the data setting storage and padding means 901 performs padding to the data held within the indicated address range using padding data S905.

The processing procedure of the holding means 902 shown in FIG. 11 are identical to the processing procedure of the first embodiment shown in FIG. 5 except for steps 1106 and 1107.

In this embodiment, the same processings are performed as in the first embodiment until step 1105 where padding address information specifying the component data to be padded is generated. The padding address information can be generated as the information specifying the data storage means holding the component data, using address. In step 1106 subsequent to step 1105 of the third embodiment, address processing is performed. The holding means 902 detects a range within which objects to be padded are present contiguously corresponding to the padding address information generated in step 1105. Then the holding means 902 generates padding starting address information and padding ending address information from the first and end parts of the detected range. As for non-contiguous address information included in the padding address information, padding starting address information and padding ending address information are regarded as identical ones which indicate a single address. In step 1107, the padding starting address information S906a and the padding ending address information S906b are output with the padding data S905.

Here it is assumed that address information specifying one of first to Nth data storage means included in the data setting storage and padding means 901 represents a storage means in such a way that a Kth data storage means is expressed as "k", for example. It is also assumed that six pieces of component data held in the eleventh to sixteenth data storage means are the component data to be subjected to padding processing. In this case, the padding starting address information S906a and the padding ending address information 3906b, which are constituents of the padding information, indicate 11 and 16, respectively. Therefore, in the padding information, not only padding data but also the information indicating 11 and 16 are included. On the other hand, in the first embodiment, the padding address information indicates "11, 12, 13, 14, 15, 16", which means that the padding information is more redundant in comparison with that of the third embodiment.

Further, the information indicating a difference between a padding starting address and a padding ending address may be used by setting, instead of the padding ending address information, resulting in further reduced data amount; In the above-described case, the padding starting address information and the difference information indicate 11 and 5, respectively.

Further, if padding is performed to all of the component data within a range specified by padding starting address information and padding ending address information using a single piece of padding data, repetitive operation of generating the padding data S905 output from the holding means 902 can be avoided, resulting in further reduced redundancy of padding information. More specifically, when padding is performed to six contiguous pieces of component data using a single piece of padding data Pd, the padding data to be output from the holding means 902 is not "PD, PD, PD, PD, PD, PD" but "PD", and when padding information including padding starting address information and padding ending address information is padding can he performed to a specified range using the single piece of padding data, resulting in reduced amount of padding information.

Also in the data setting storage and padding means 901, efficiency of padding can be improved by receiving the padding information specifying a continuous range and processing the specified range at once.

As described above, the data padding apparatus according to the third embodiment comprises a data selling storage and padding means 901 and a holding means for continuous padding information 902, and this apparatus not only performs synchronization in the same manner as in tho first embodiment for appropriate processing of input data and input significance information having no assured synchronism between them, but generates the padding information specifying a range, thereby reducing the amount of padding information and improving processing efficiency.

Although in the third embodiment range specification is performed to the address information having consecutive values, the range specification can be performed to the address information having non-consecutive values by using the information indicating a certain increment. In the case where successive data specification is possible for the data of multidimensional structure in a specified dimension, when address specification has been performed to a dimension different from the specified dimension, appropriate range specification is possible by using a certain difference value although the values of the address information themselves are not consecutive.

Although in the third embodiment generation of padding information in which continuous padding and range specification are included is performed based on the first embodiment, generation of padding information in which continuous padding and range specification are included may be performed based on the second embodiment, resulting in appropriate padding processing by determination of padding method as well as efficient processing due to range specification.

Embodiment 4

A data padding apparatus according to a fourth embodiment of the present invention performs padding after synchronization as in the first embodiment, and can perform padding at plural times by changing objects to be padded.

Figure 12:
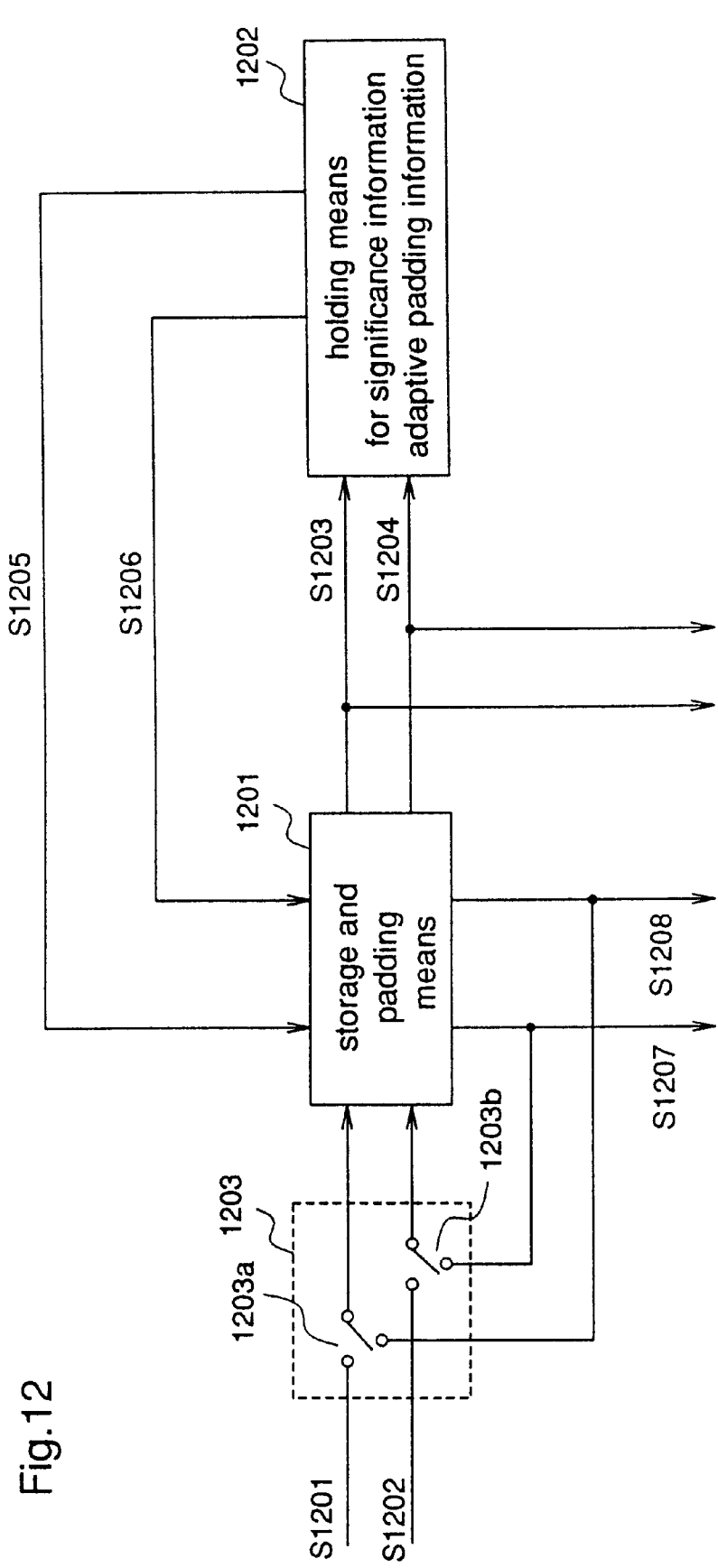
FIG. 12 is a block diagram illustrating the construction of a data padding apparatus according to a fourth embodiment of the present invention FIGS. 13a) to 13d) are diagrams for explaining a first example of a padding processing in the fourth embodiment.

FIG. 12 is a block diagram illustrating the construction of the data padding apparatus according to the fourth embodiment. As shown in the figure, the data padding apparatus of the fourth embodiment comprises a storage and padding means 1201, a holding means for significance information adaptive padding information 1202, and a processing object switching means 1203.

The storage and padding means 1201 performs synchronization and padding as in the first embodiment, but in the padding processing, the data which is changed and input by the processing object switching means 1203 and significance information are used as processing objects. The holding means for significance information adaptive padding information 1202, which is identical to the holding means 602 of the second embodiment (see FIG. 6), determines padding method and generates padding information according to the determined padding method. The processing object switching means 1203 comprises a data switch 1203a and a significance information switch 1203b and changes inputs to the storage and padding means 1201. More specifically, the data switch 1203a inputs either input data S1201 or padded data S1207 to the storage and padding means 1201 and the significance information switch 1203b inputs either input significance information 1202 or padded significance information S1208 to the storage and padding means 1201.

Hereinafter a description is given of the operation of the data padding apparatus thus constructed according to the fourth embodiment in "A. Initial Padding Processing", and "B. Repetitive Padding Processing.

Initial Padding Processing

At the initiation of the processing, the processing object switching means 1203 is set to input input data S1201 and input significance information S1202 to the storage and padding means 1201. Therefore, the data padding apparatus according to the fourth embodiment performs the some processing performed in the second embodiment with the input data S1201 and the input significance information S1202 as device inputs to output padded data S1207 and padded significance information S1208 from the storage and padding means 1201.

Repetitive Padding Processing

As a rule, repetitive padding processing is performed after initial padding processing is performed.

The processing object switching means 1203 included in the data padding apparatus according to the fourth embodiment switches the data switch 1203a and the significance information switch 1203b such that padded data S1207 and padded significance information S1208 are input to the storage and padding means 1201.

In the data padding apparatus of the fourth embodiment, the same processing performed to the input data S1201 and the input significance information S1202 is performed to the padded data S1207 and the padded significance information S1208 to output from the storage and padding means 1201 the padded data S1207 and the padded significance information S1208 that have been subjected to padding processing twice.

In the data padding apparatus of the fourth embodiment, first of all, initial padding processing is performed, and after switching by the processing object switching means 1203, repetitive processing is performed. This enables to perform padding at a set number of times while maintaining a switch status of the processing object switching means 1203.

FIGS. 13a) to 13d) and FIGS. 14a) to 14d) are diagrams for explaining first and second examples of performing padding processing at plural times by means of the data padding apparatus according to the fourth embodiment.

FIG. 13a) illustrates the input data in the first example. As shown in the figure, input data S1201 (see FIG. 12) is a group of component data having a two-dimensional structure.

In this example, the data shown in FIG. 13a) is regarded as input data S1201 and the significance information corresponding to this data is regarded as the input significance information S1202, and the input data and significance information are input to the data padding apparatus of the fourth embodiment and subjected to initial padding processing. It is assumed here that component data are sequentially and horizontally input to form the two-dimensional structure shown in the figure. In initial padding process, horizontal padding processing is performed to generate padded data. The resultant padded data S1207 (generated by initial padding processing) shown in FIG. 12 is input to the processing object switching means 1203.

Then, switching is performed using the switches included in the processing object switching means to input padded data S1207 (subjected to the initial padding processing) and the corresponding padded significance information S1208 are input to the storage and padding means 1201 where repetitive padding processing is performed. In the repetitive padding processing, vertical padding processing is performed by changing the processing procedure to obtain the padded data S1207 (subjected to first iteration of the repetitive padding). The change of padding direction due to change of processing procedure can be realized by changing an order in which storage is performed into tho data storage means included in the storage and padding means 1201 and performing the subsequent processings in the changed order, or by changing an order in which reading from the data storage means is performed and performing the subsequent processings in the changed order. By performing padding at plural times in the manner shown in FIGS. 13a) to 13d), two-dimensional padding processing shown in the figures is executed.

FIGS. 14a) to 14d) illustrate, as a second example, a case where different padding processing is performed to the data identical to the input data used in the first example, and FIG. 14a) illustrating the input data S1201 is thus identical to FIG. 13a). As in the first example, initial padding processing is performed with input data S1201 and input significance information S1202 as device inputs. In this example, it is set such that insignificant component data adjacent to significant component data is replaced with padding data generated based on the significant component data. Therefore, initial padding processing generates the padded data S1207 (subjected to initial padding process) shown in FIG. 14b).

Switching is performed at the processing object switching means 1203 to perform repetitive padding processing. In this example, the processing procedure of the repetitive padding processing is not changed; that is, the padding direction is not changed and the processing is performed in the same manner as that of the initial processing. However, the repetitive padding processing differs from the initial padding processing in that insignificant component data is padded based on either significant component data or padded component data. Such processing can be performed with ease in the same manner as the initial padding processing by using padded significance information.

In this example, repetitive padding processing is iterated until the whole padding is completed, that is, all of the insignificant component data shown in FIG. 14a) are padded.

As described above, the data padding apparatus according to the fourth embodiment is identical to the data padding apparatus of the second embodiment further including a processing object switching means 1203, and performs repetitive padding processing to the padded data output from the storage and padding means 1201. Therefore, sophisticated padding processing such as multidimensional processing or multi-step processing can be realized by effectively utilizing the device resource of a data padding apparatus in a relatively small circuit size which performs simple padding processing.

In the fourth embodiment, the data padding apparatus of the second embodiment to which a processing object switching means 1203 including switches is added is employed for performing padding processing at plural times. However, if the padding apparatus of the second embodiment has a storage and padding means adaptive to the repetitive padding processing and uses padded data and padded significance information held in the included data storage means and significance information storage means as processing objects according to a setting, padding process can be performed at plural times, thereby realizing a sophisticated processing by effective use of the device resource of a relatively small-sized circuit.

Although in the fourth embodiment the data padding apparatus of the second embodiment to which a processing object switching means 1203 including switches is added is employed for performing padding processing at plural times, the data padding apparatus of the first embodiment further including the processing object switching means 1203 is applicable and the processing described in the first example can be performed. Further, the padding apparatus of the third embodiment to which the processing object switching means 1203 is added is also applicable, thereby reducing the amount of padding information. In the padding apparatus according to the first or third embodiment, padding processing can be performed at plural times by setting the storage and padding means to be adaptable to repetitive padding processing, instead of adding the processing object switching means 1203.

Embodiment 5

A data padding apparatus according to a fifth embodiment of the present invention performs division, and then performs parallel padding processing to divided pieces of data and reconstructs them.

Figure 15:
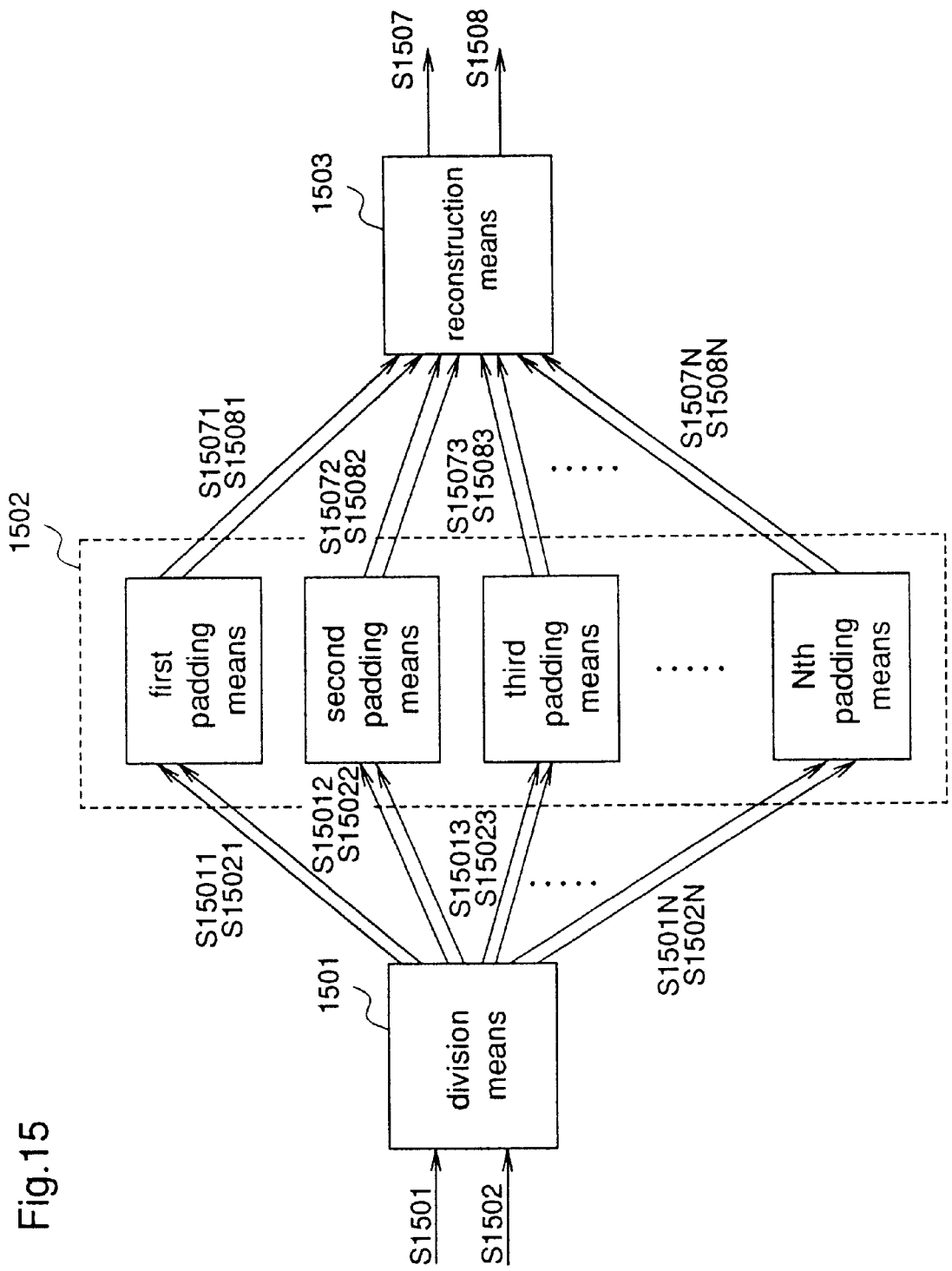
FIG. 15 is a block diagram illustrating the construction of a data padding apparatus according to a fifth embodiment of tho present invention.

FIG. 15 is a block diagram illustrating the construction of the data padding apparatus according to the fifth embodiment. As shown in the figure, the data padding apparatus of the fifth embodiment comprises a division means 1501, a parallel padding means 1502, and a reconstruction means 1503, the parallel padding means 1502 comprising N padding means in total (first to Nth padding means). In the fifth embodiment, each of the first to Nth padding means is identical to the data padding apparatus of the first embodiment.

The division means 1501 divides input data and input significance information into N pieces of data (hereinafter this data is referred to as division data) and N pieces of significance information (hereinafter this information is referred to as division significance information) The parallel padding means 1502 performs parallel padding processing to N pieces of division data and N pieces of division significance information to generate N pieces of division data subjected to padding (hereinafter referred to as division data after padding) and N pieces of division significance information subjected to padding (hereinafter referred to as division significance information after padding). Each of the padding means constituting the parallel padding means 1502 performs a set of division data and division significance information to generate a set of division data after padding and division significance information after padding. The reconstruction means 1503 reconstructs N pieces of division data after padding and N pieces of division significance information after padding to generate padded data and padded significance information.

Hereinafter a description is given of the operation for padding by the data padding apparatus of the fifth embodiment having such construction.

Input data S1501 and input significance information S1502 are input to the division means 1501 as the inputs of the data padding apparatus of the fifth embodiment and then subjected to division to generate first to Nth division data S15011 to S1501N and first to Nth division significance information S15021 to S1502N the division means 1501 outputs the resultant first to Nth division data S15011 to S1501N and the resultant first to Nth division significance information S15021 to S1502N to the parallel padding means 1502.

In the parallel padding means 1502, division data and division significance information are input in combination to d corresponding padding means in such a way that the first division data S15011 and the first division significance information S15021 are input to the first padding means, and the second division data S15012 and the second division significance information S15022 input to the second padding means, for example.

The first padding means receives the first division data S15011 and the first division significance information S15021 and performs padding as in the first embodiment to generate first division data after padding S15071 and first division significance information after padding S15081. The second to Nth padding means also perform padding in the same manner as the first padding means to generate second to Nth division data after padding S15072 to S1507N and second to Nth division significance information after padding S15082 to S1508N.

The first to Nth division data dater padding S15071 to S1507N and the first to Nth division significance information after padding S15081 to S1508N, that are all generated by the parallel padding means 1502, are output to the reconstruction means 1503.

The reconstruction means 1503 reconstructs the first to Nth division data after padding S15071 to S1507N which are input to generate padded data S1507. Further, this means reconstructs the first to Nth division significance information after padding S15081 to S1508N which are input to generate padded significance information S1508. The padded data S1507 and the padded significance information S1508 are used as the outputs of the data padding apparatus of the fifth embodiment.

FIGS. 16a) to 16d) and FIGS. 17a) to 17d) are diagrams for explaining first and second examples of parallel padding processings by means of the data padding apparatus of the fifth embodiment.

FIG. 16a) is a diagram illustrating input data S1501 (see FIG. 15) in the first example. As shown in the figure, the input data S1501 has a two-dimensional structure, and is input to the division means 1501 where it is divided horizontally into division data S15011 to S15018 of one-dimensional structure as shown in FIG. 16b). The division data S15011 to S15018 are input with the corresponding division significance information S15021 to S15028 (not shown in FIGS. 16a) to 16d)) to the first to eighth padding means where the same padding processing as in the first embodiment is performed In the first to eighth padding means, the first to eighth division data after padding S15071 to S15078 as shown in FIG. 16c) are generated and input to the reconstruction means 1503. The reconstruction means 1503 reconstructs division data after padding S15071 to S15078 to generate padded data shown in FIG. 16d).

In the padding process described in the first example, one-dimensional, horizontal padding processing is performed to division data of one-dimensional structure. More specifically, since the horizontal correlation in the original two-dimensional structure is not considered, the padding proccessings to the respective division data are independent, thereby realizing parallel processing. Therefore, high-speed padding processing can be realized by performing the processing like this example by means of the data padding apparatus of the fifth embodiment.

FIG. 17d) is a diagram illustrating input data S1501 (see FIG. 15) in the second example. As shown in the figure, input data S1501, which has four regions of S1701, A, B, and C, is input to the division means 1501 where the data is divided into the respective regions to generate division data S15011 to S15014 shown in FIG. 17b). The division data S15011 to S15014 are input to the first to fourth padding means, respectively, and subjected to the same padding processing as in the first embodiment. In the first to fourth padding means, the first to fourth division data after padding S15071 to S15074 are generated and input to the reconstruction means 1503. FIG. 17c) illustrates that the division data S1701 is padded to generate division data after padding S15071, and the division data A, B, and C are padded to generate division data after padding Af, Bf, and Cf, respectively. The reconstruction means 1503 reconstructs the first to fourth division data after padding S15071 to S15074 to generate the padded data shown in FIG. 17d).

As in the first example, since division data within a region can be padded independently of the division data in the other regions, parallel processing is thus possible, resulting in high-speed processing.

Although in this embodiment the parallel padding means 1502 comprises a plurality of data padding apparatuses according to the first embodiment, the parallel padding means comprising a plurality of padding apparatuses according to the second embodiment is applicable and each division data can be processed by a padding method selected for the division data. This padding processing enables flexible padding processing corresponding to the data property of each region.

As described above, the data padding apparatus according to the fifth embodiment comprises a division means 1501, a parallel padding means 1502 comprising a plurality of padding means, and a reconstruction means 1503, and this apparatus can divide input data and significance information, perform parallel padding processing to the division data and information, and reconstruct them after the processing. This can speed up processing and realize flexible padding processing such as a processing employing partially different padding methods.

Although in the fifth embodiment the first to Nth padding means constituting the parallel padding means 1502 are each identical to the data padding apparatus of the first embodiment, use of the second embodiment enables to determine padding method according to data property, use of the data padding apparatuses of tho third embodiment can realize more efficient processing, and use of the padding apparatuses of the fourth embodiment enables to perform repetitive padding process.

The data padding apparatus of the first embodiment, as described in the first embodiment, outputs original data and synchronized significance information as device outputs to use them in the processings at subsequent stages, as described in the first embodiment. Also in the fifth embodiment, each padding apparatus outputs divided original data that is generated from division data and divided synchronized significance information that is generated from division significance information to a reconstruction means which outputs original data and synchronized significance information to use them for the processings at subsequent stages.

Embodiment 6

A data padding apparatus according to a sixth embodiment of the present invention performs plural types of padding processing simultaneously by means of plural padding means, and then synthesizing process.

Figure 18:
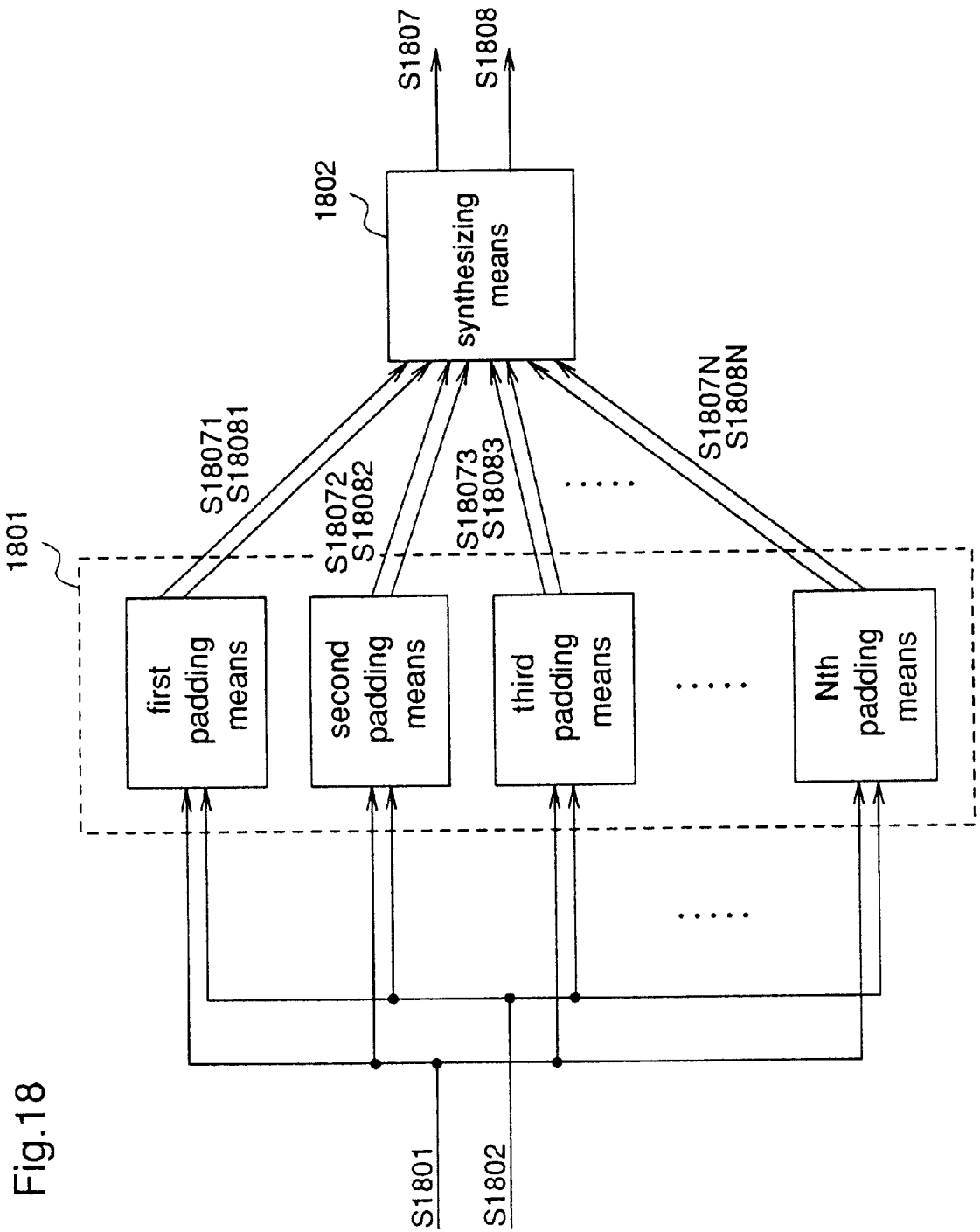
FIG. 18 is a block diagram illustrating the construction of a data padding apparatus according to a sixth embodiment of the present invention.

FIG. 18 is a block diagram illustrating the construction of the data padding apparatus according to the sixth embodiment. As shown in the figure, the data padding apparatus of the sixth embodiment comprises a parallel padding means 1801 and a synthesizing means 1802, and the parallel padding means 1801 comprises N padding means (first, second, . . . Nth padding means). In the sixth embodiment, each of the first to Nth padding means is the data padding apparatus of the first embodiment.

The parallel padding means 1801 performs padding to input data and input significance information simultaneously to generate N pieces of padded data and N pieces of padded significance information. The first padding means as a constituent of the parallel padding means 1801 performs padding using a first padding method. The second to Nth padding means similarly perform padding using second to Nth padding methods, respectively. The synthesizing means 1802 synthesizes N pieces of padded data which are generated by the parallel padding means 1801 into one piece of padded data, as well as synthesizes N pieces of padded significance information into one piece of significance information.

The operation for padding by the data padding apparatus according to the sixth embodiment that is thus constructed will be described below.

Input data S1801 and input significance information S1802, which are the inputs of the data padding apparatus of the sixth embodiment, are input to the first to Nth padding means constituting the parallel padding means 1801. The first padding means performs padding to the input data S1801 and the input significance information S1802 by a first padding method to generate first padded data and first padded significance information S18081. Similarly, the second i. Nth padding means perform padding to the input data S1801 and the input significance information S1802 by second to Nth padding methods to generate second to Nth padded data S18072 to S1807N and second to Nth padded significance information S18082 to S1808N.

The first to Nth padded data S18071 to S1807N and the first to Nth padded significance information S18081 to S1808N are all output to the synthesizing means 1802.

The synthesizing means 1802 synthesizes the input first to Nth padded data S18071 to S1807N into padded data S1807. This means also synthesizes the input first to Nth padded significance information S18081 to S1808N into padded significance information S1808. The padded data S1807 and the padded significance information 31808 are used as the outputs of the data padding apparatus of the sixth embodiment.

FIGS. 19*a*) to 19*c*) and FIG. 20*a*) to 20*c*) are diagrams for explaining first and second example of parallel padding processing using the data padding apparatus of the sixth embodiment.

FIG. 19*a*) is a diagram illustrating the input data S1801 (see FIG. 18) in the first example. As shown in the figure, the input data S1801 includes eight pieces of component data d1 to d8, and component data d3 and d7 are significant while the other component data are insignificant.

The input data S1801 and the input significance information S1802 (not shown in figures 19*a*) to 19*c*)) are input to the first and second padding means constituting the parallel padding means 1801. The first padding means performs padding to the input data S1801 using a first padding method to generate first padded data S18071. The second padding means performs padding to the input data S1801 using a second padding method to generate second padded data S18072.

In the first padding method, component data d1 to d8 are processed in a direction of d1→d8 and insignificant component data are replaced with padding data generated based on the significant component data which is loaded on the left of the insignificant data in FIGS. 19*a*) to 19*c*). In the first padded data, therefore, insignificant data d1 and d2 are not padded because there is no significant component data on the left of the data d1 and d2, as illustrated in FIG. 19*b*). Significant data d3 is left as it is, and insignificant component data d4 to d6 are replaced with padding data generated based on the significant component data d3 located on the left of the data d4 to d6. Another significant data d7 is also left as it is, and insignificant component data d8 is replaced with padding data generated based on the significant data d7 on the left of the data d8.

In the second padding method, component data are processed in a direction of d8→d1 and insignificant component data are replaced with padding data generated based on the significant component data which is located on the right of the insignificant data in FIGS. 19*a*) to 19*c*). In the second padded data, therefore, insignificant data d8 is not padded because there is no significant component data on the right thereof, as illustrated in FIG. 19*b*). Significant data d7 is left as it is, and insignificant component data d4 to d6 are replaced with padding data generated based on the significant component data d7 located on the right of the data d4 to d6. Another significant data d3 is also left as it is, and insignificant component data d1 and d2 are replaced with padding data generated based on the significant data d3 on the right of the data d1 and d2.

The first and second padded data shown in FIG. 19*b*) are output to the synthesizing means 1802 to be synthesized. In the synthesizing, component data padded by one of the first and second padding methods is treated as the padded data generated by the padding method, and the component data padded by both the first padding method and the second padding method is treated as the padded data generated by averaging the padded data obtained by both of the padding methods. This synthesizing generates padded data S1807 shown in FIG. 19*c*). As shown in the figure, the result of this padding processing is identical to the result obtained by the prior art data padding apparatus.

The first and second padding methods used in this example are simpler than those used in the prior art data padding apparatus and enable parallel processing, thereby realizing a faster processing than the prior art technique capable of providing the same effects.

FIG. 20*a*) is a diagram illustrating the input data S1801 (see FIG. 18) in the second example. As shown in the figure, the input data S1801 has a two-dimensional structure. The input data S1801 and the input significance information S1802 (not shown in FIGS. 20*a*) to 20*c*)) are input to the first and second padding means which constitute the parallel padding means 1801. The first padding means performs padding to the input data S1801 using a first padding method to generate first padded data S18071. The second padding method performs padding to the input data S1801 using a second padding method to generate second padded data S18072.

Here it is assumed that in the first padding method, padding is performed in the horizontal direction of that figure, whereas, in the second padding method, padding is performed in the vertical direction of the same figure. Thus, by the first and second padding methods, the first and second padded data shown in FIG. 20*b*) are generated by the first and second padding means, respectively.

The first and second padded data shown in FIG. 20*b*) are output to the synthesizing means 1802 to be synthesized into padded data S1807.

In this example, a relatively simple, one-dimensional padding processing is realized either by the first padding method or by the second padding method and the processings by these padding methods are performed simultaneously, which means that a faster processing is possible. Further, the padded data obtained in this example is identical to that obtained by a sophisticated, two-dimensional padding.

As described above, the data padding apparatus of the sixth embodiment comprises a parallel padding means 1801 and a synthesizing means 1802, and this apparatus performs padding to input data and significance information simultaneously and independently, and then synthesizes them after the parallel padding processing. Therefore, by performing such parallel processing using relatively simple process methods, this apparatus enables to realize more efficient, faster processing, thereby providing sophisticated padding processing and complicated padding method with no increase in capacity of storage and circuit size.

Although in the sixth embodiment, the data padding apparatus of the first embodiment is employed as the first to Nth padding means which constitute the parallel padding means 1801, use of the data padding apparatus of the second embodiment makes it possible to determine padding methods corresponding to data properly, use of the data padding apparatus of the third embodiment can realize more efficient processing, and use of the data padding apparatus of the fourth embodiment enables to perform repetitive padding processing.

Although in the sixth embodiment each padding means performs one-dimensional processing, when the data padding apparatus of the fourth embodiment is used as the first to Nth padding means, more sophisticated padding processing can be realized by making each padding means perform complicated processing such as two-dimensional processing and synthesizing the respective padding results.

Embodiment 7

Figure 21:
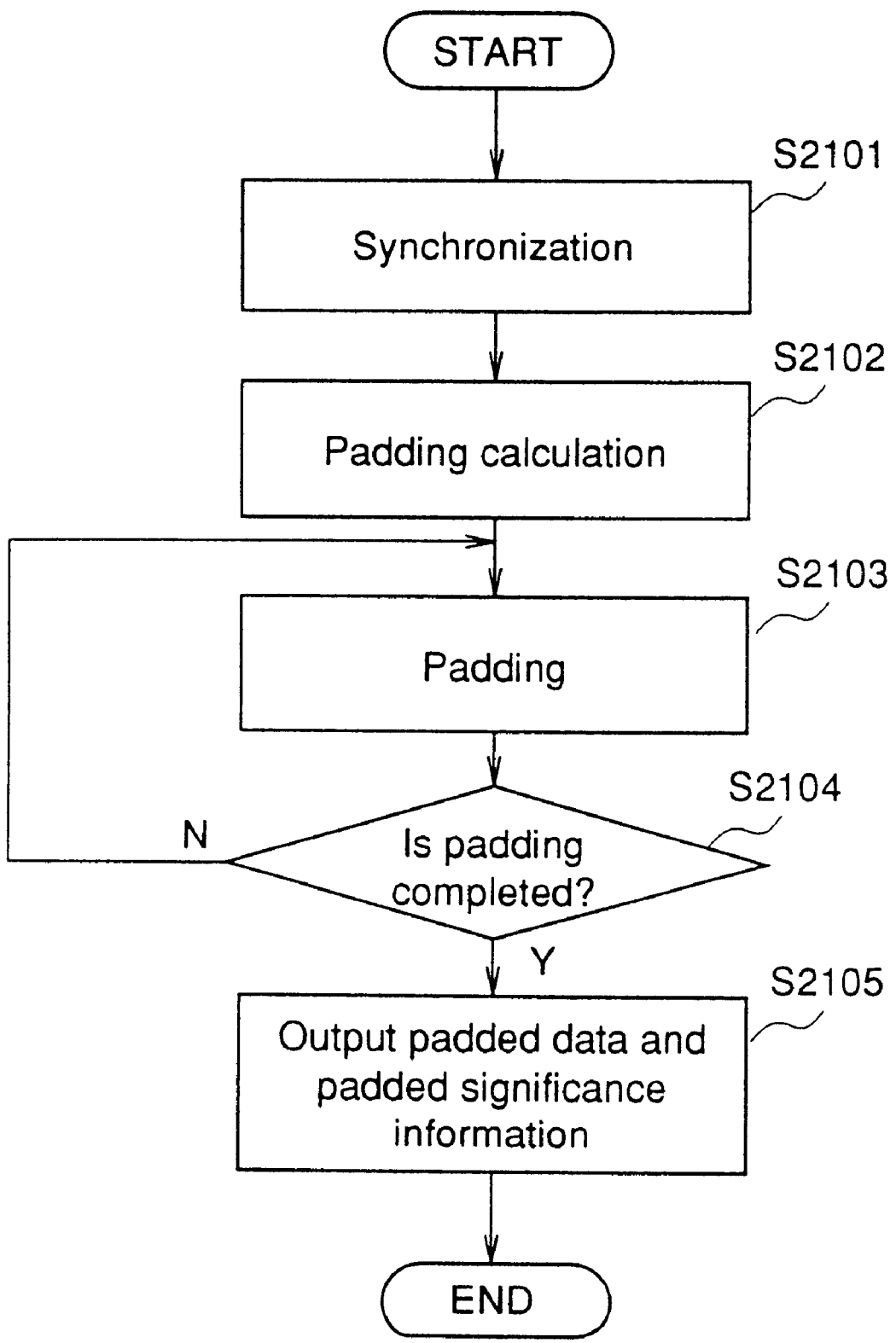
FIG. 21 is a flowchart showing processing procedure of a data padding method according to a seventh embodiment of the present invention.
Figure 22:
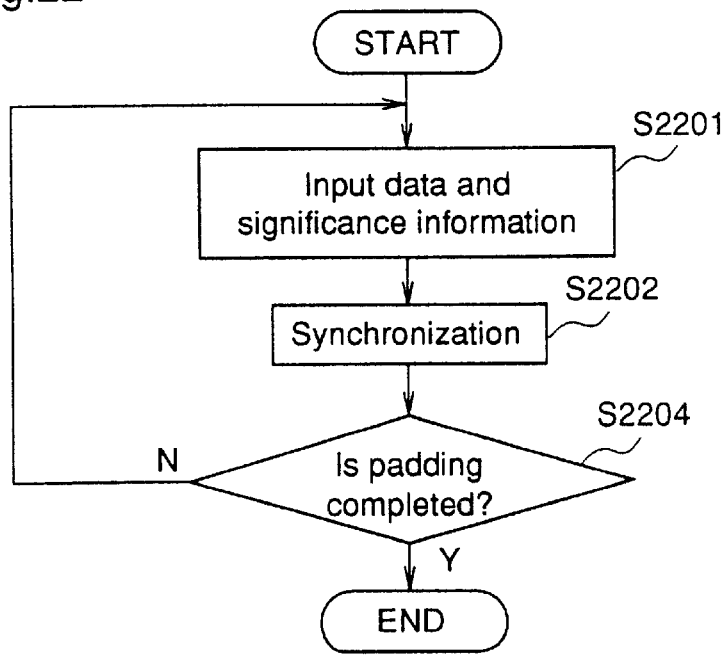
FIG. 22 is a flowchart showing detailed procedure of a data synchronization step of the seventh embodiment.
Figure 23:
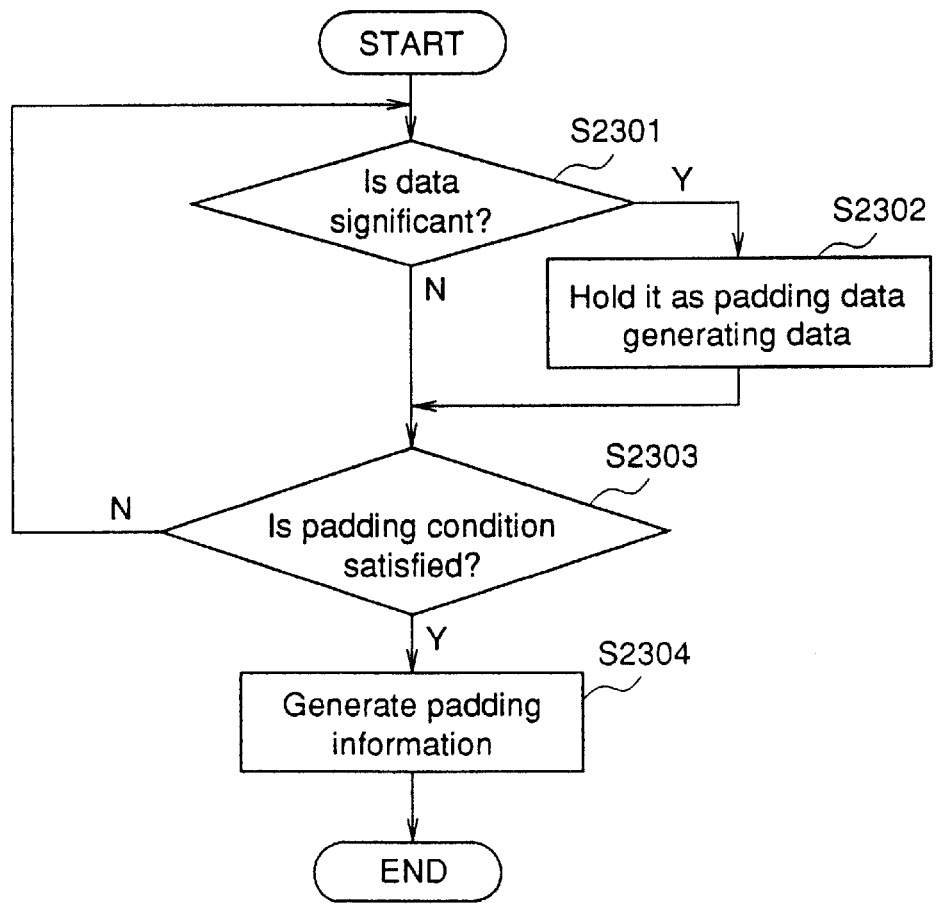
FIG. 23 is a flowchart showing detailed procedure of a padding calculation step of the seventh embodiment.

A data padding method according to a seventh embodiment of the present invention carries out padding after storing data to be subjected to padding and significance information to be used in padding, and synchronizing the same. FIG. 21 a flowchart showing the processing procedure of the data padding method according to the seventh embodiment. As shown in the figure, the data padding method according to the seventh embodiment executes a data synchronizing step 2101 for synchronizing input data and significance information, a padding calculation step for generating padding information to be used in padding, a padding step 2103 for carried out padding according to the padding information, a padding completion deciding step 2104 for deciding whether the padding is completed or not, and an output step 2105 for outputting the data and padded significance information. FIGS. 22 and 23 are flowcharts showing the details of the operations of the data synchronizing step and the padding calculation step, respectively.

Referring to FIGS. 21 to 23, the operation in executing the data padding method according to the seventh embodiment as follows.

In the seventh embodiment, as the processing procedure shown in FIG. 21 starts, the step 2101 in the figure is initially executed and thus the data synchronization is carried out. The data synchronization is executed according to the processing procedure along the flow shown in FIG. 22.

In the seventh embodiment, similarly to the first embodiment, input data, which consists of component data that are discrete digital data, is processed in each processing unit data that consists of a predetermined number of component data input significance information also consists of component significance information or processing unit significance information.

In a step 2201 in FIG. 22, one component of each of input data and input significance information is input. Thereafter, a step 2202 is executed, and the data and the significance information are rearranged so as to be synchronized. In a following step 2203, it is decided whether or not the amount of the data and significant information that have been processed is equal to the amount of a processing unit, and if the process is not completed, the process goes back to the step 2201 where a next component is input. The steps 2201 to 2203 are repeated until in the step 2203 the process for a processing unit is decided to be completed.

In the step 2203, if the process is decided to be completed, the synchronized original data and significant information have been generated and therefore the processing procedure shown the flow in FIG. 22 is completed, and the following process in the flow shown in FIG. 21 is executed. In the flow shown in FIG. 21, the step 2101 is completed and then the step 2102 follows.

In the step 2102, the padding calculation is carried out, based on the original data and synchronized significance information that have been generated in the step 2101, to generate padding information. The padding calculation is executed according to the processing procedure along the flow shown in FIG. 23. In a step 2301 in FIG. 23, it is decided whether each component data which constitutes the original data is significant or not, using the synchronized significance information. If the component data is significant, a step 2302 is executed and thus the component data is held as padding data generating data, and the step 2303 follows. On the other hand, if the component data is insignificant, the step 2303 follows without executing the step 2302. In the step 2303, it is decided whether the padding condition is satisfied or not. If the condition is satisfied, a step 2304 is executed to generate the padding information. On the other hand, if the condition is not satisfied, the process goes pack to the step 2301 and is repeated up to the step 2303. The steps 2301 to 2303 are repeated until the padding condition is decided to be satisfied in the step 2303. The padding condition can be set to the same condition shown in the first embodiment if the padding similar to that in the first embodiment is carried out.

If the padding condition is satisfied and thus a step 2304 is executed, padding data is generated based on the padding data generating data while generating padding address information, and padding information consisting of the generated padding data and padding address information is held. The processing procedure of the flow in FIG. 23 is completed and the step 2102 in FIG. 21 is also completed, and then the step 2103 in FIG. 21 follows.

In the step 2103, padding is executed, using the padding information generated in the step 2102, to generate padded data and padded significance information. In the following step 2104, it is decided whether the padding is completed or not. If the padding is not completed, the process goes back to the step 2103 where padding is executed. The steps 2103 to 2104 are repeated until in the step 2104 the padding is decided to be completed. If in the step 2104 the padding is decided to be completed, the generated padded data and padded significance information are output in the following step 2105, and the processing procedure of padding according to the seventh embodiment shown in FIG. 21 is completed.

Figure 51:
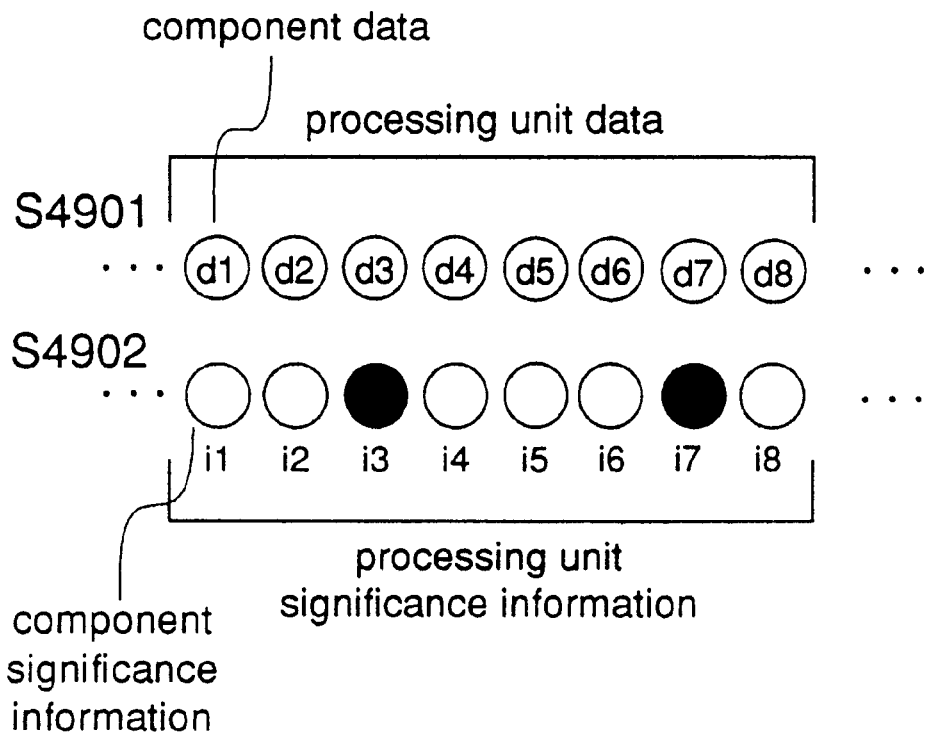
FIGS. 51a) and 51b) are diagrams for explaining padding in the prior art data padding apparatus.
Figure 51:
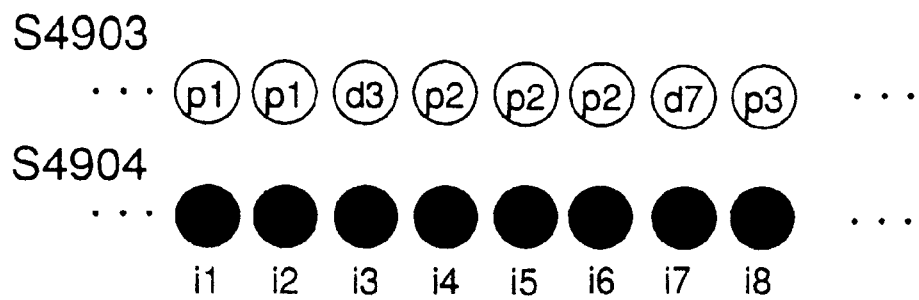

The data padding method according to the seventh embodiment carries out the proper padding to the input data and input significance information that are not synchronized as shown in FIG. 3 and can obtain the same result by the prior art padding shown in FIG. 51.

As described above, the data padding method according to the seventh embodiment includes the data synchronizing step 2101, the padding calculation step 2102, the padding step 2103, the padding completion deciding step 2104 and the output step 2105, wherein input data and input significance information which are not synchronized are subjected to the synchronization to generate the synchronized original data and the synchronized significant information, and using these original data and synchronized significance information, padding information is generated, and based on the padding information padding is carried out, thereby making it possible to efficiently process a pair of the data and significance information that are possibly subjected to kinds of coding and decoding and are not secured to be synchronized.

Embodiment 8

A data padding method according to an eighth embodiment of the present invention carries out padding after synchronization similarly to the seventh embodiment, and decides a padding method depending on significance information.

Figure 24:
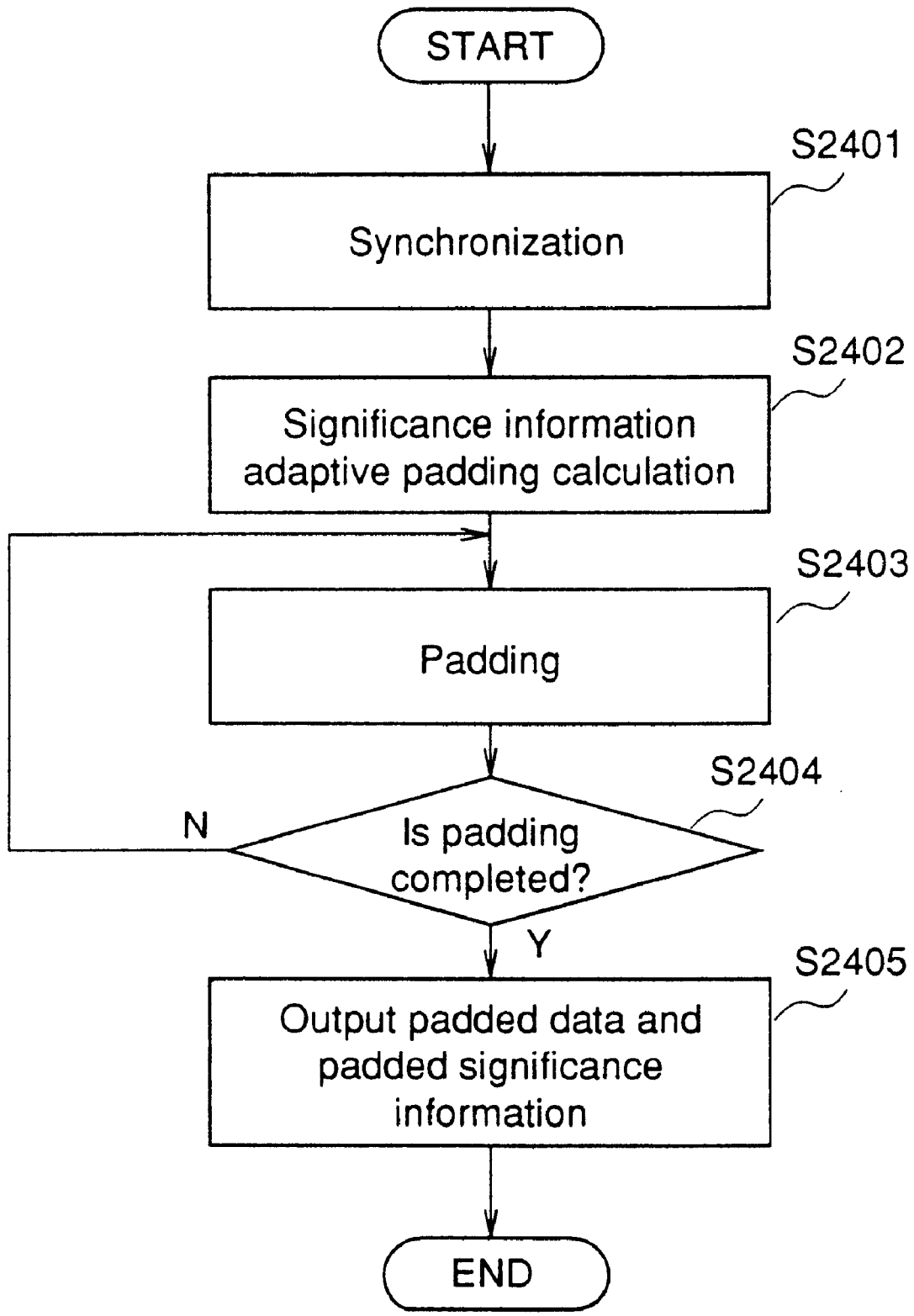
FIG. 24 is a flowchart showing processing procedure of a data padding method according to an eighth embodiment of the present invention.
Figure 25:
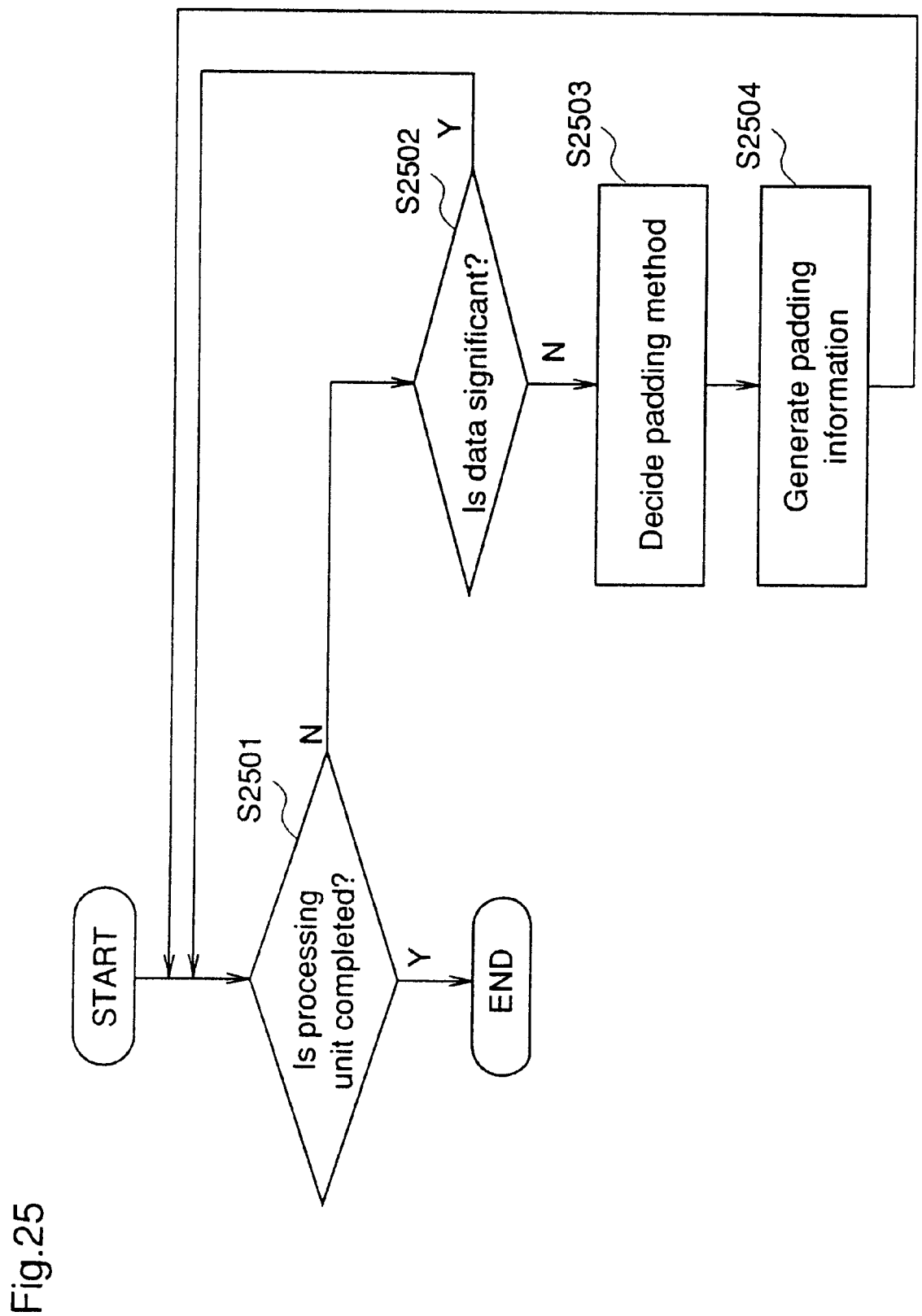
FIG. 25 is a flowchart showing detailed procedure of a significance information adaptive padding calculation step of the eighth embodiment.

FIG. 24 is a flowchart showing the processing procedure of the data padding method according to the eighth embodiment. As shown in the figure, the data padding method according to the eighth embodiment executes a data synchronizing step 2401 for subjecting input data and significant information to synchronization, a significance information adaptive padding calculation step 2402 for deciding a padding method and generating padding information to be used in padding according to the decided padding method, a padding step 2403 for carrying out padding according to the padding information, a padding completion deciding step 2404 for deciding whether the padding is completed or not, and an output step 2405 for outputting padded data and padded significance information. FIG. 25 is a flowchart showing the details of the operation of the padding calculation step.

The processing procedure of padding in the data padding method according to the eighth embodiment is executed similarly to the seventh embodiment except for the step 2402 in the flow shown in FIG. 24. Therefore, the process of the significance information adaptive padding calculation step in the step 2402 is explained according to the flow in FIG. 25.

In a step 2501, it is decided whether a padding method to be used below is decided and padding information is generated for a processing unit. If both are done, the processing procedure indicated by the flow in FIG. 25 is completed, the step 2404 in the flow shown in FIG. 24 is completed and the step 2403 follows, otherwise a step 2502 is executed.

In the step 2502, it is decided whether component data is significant or not. If it is significant, the process goes back to the step 2501 without executing the following steps. If it is insignificant, steps 2503 and 2504 are executed. In the step 2503, a padding method is decided. In the step 2504, padding data and padding address are generated according to the padding method decided in the step 2503, and the results are held. For determination of a padding method, the same selection of a data padding method in the second embodiment can be carried out. That is, the data padding method according to the eighth embodiment selects and decides a padding method, and can carry out an appropriate padding.

As described above, the data padding method according to the eighth embodiment includes the data synchronizing step 2401, the significance information adaptive padding calculation step 2402, the padding step 2403, the padding completion deciding step 2404 and the output step 2405, wherein input data and input significance information which are not synchronized are subjected to the synchronization to generate the synchronized original data and the synchronized significant information, and using these original data and synchronized significance information, a padding method adapting to the properties of the data and the like is decided, and according to the decided padding method, padding information is generated, and based on the padding information padding is carried out, thereby, similarly to the data padding method according to the seventh embodiment, making it possible to efficiently process a pair of the data and significance information that are possibly subjected to kinds of coding and decoding and are not secured to be synchronized, and in addition, to carry out more appropriate padding adapting to the properties of data and the like.

Embodiment 9

A data padding method according to a ninth embodiment of the present invention carries out padding after synchronization similarly to the seventh embodiment, and specifies data to be subjected to padding as a continuous region.

Figure 26:
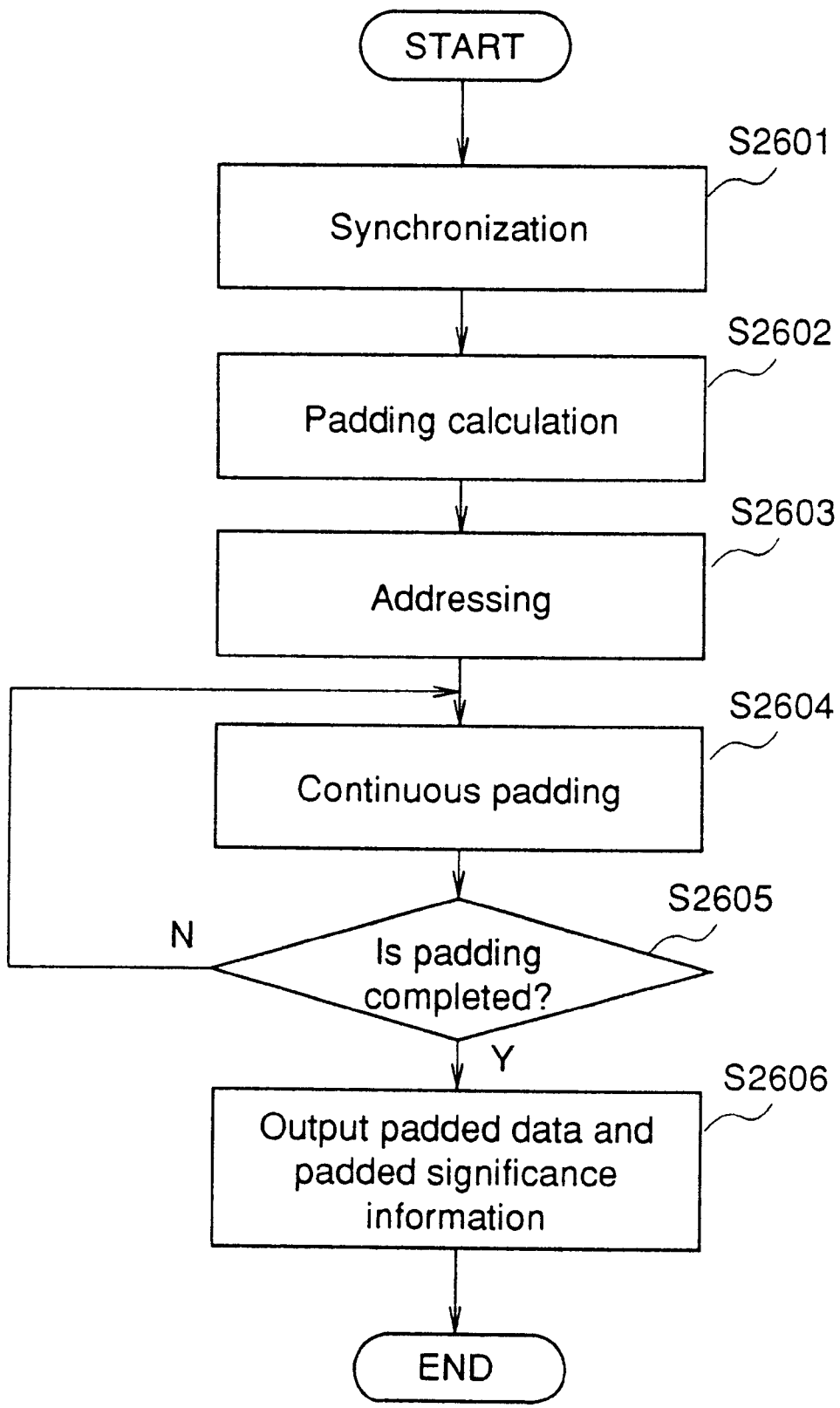
FIG. 26 is a flowchart showing processing procedure of a data padding method according to a ninth embodiment of the present invention.

FIG. 26 is a flowchart showing the processing procedure of the data padding method according to the ninth embodiment. As shown in the figure, the data padding method according to the ninth embodiment executes a data synchronizing step 2601 for subjecting input data and significant information to synchronization, a padding calculation step 2602 for generating padding information and padding address information, an addressing step 2603 for generating padding starting address information and padding ending address information based on the padding address information to make up padding information with the padding data, the padding starting address information and the padding ending address information, a continuous padding step 2604 for carrying out continuous padding according to the padding information, a padding completion deciding step 2605 for deciding whether the padding is completed or not, and an output step 2605 for outputting padded data and padded significance information. FIG. 25 is a flowchart showing the details of the operation in executing the padding calculation step.

The operation of the data padding method according to the ninth embodiment is explained referring to a flow in FIG. 26 as follows.

The data synchronization in the step 2601 and the padding calculation in the step 2602 are carried out similarly to the steps 2101 and 2102 in FIG. 21 described in the seventh embodiment. In the step 2601, synchronized original data and synchronized significance information are generated. In the step 2602, padding data and padding address information are generated from the original data and the synchronized significance information.

For the padding address information generated in the step 2602, the range of data to be continuously subjected to padding is detected. Thereafter, padding starting address information and padding ending address information are generated from addresses indicating the head and tail of the detected range. For discontinuous address information contained in the padding address information, the padding starting address information and the padding ending address information are identical, so that both are the information indicating a single address. Along with the padding data generated in the step 2602, the padding starting address information and the padding ending address information are contained in the padding information.

In the step 2604, the continuous range is specified with the padding starting address information and the padding ending address information, thereby carrying out the continuous padding using padding data. In the following step 2605, it is decided whether the padding is completed or not. If the padding is not completed, the process goes back to the step 2604 where padding is executed. The steps 2604 to 2605 are repeated until in the step 2605 the padding is decided to be completed. If in the step 2605 the padding is decided to be completed, the generated padded data and padded significance information are output in the following step 2606. The processing procedure of padding shown in FIG. 26 according to the ninth embodiment is completed.

As described above, the data padding method according to the ninth embodiment includes the data synchronizing step 2601, the padding calculation step 2602, the addressing step 2603, the continuous padding step 2604, the padding completion deciding step 2605 and the output step 2606, wherein input data and input significance information which are not synchronized are subjected to the synchronization to generate the synchronized original data and the synchronized significant information, and using these original data and synchronized significance information, padding data and padding address information are generated, and using the padding address, padding starting address information and padding ending address information are generated, and padding is carried out according to padding information consisting of the padding data, the padding starting address information and the padding ending address information, thereby, similarly to the data padding method according to the seventh embodiment, making it possible to efficiently process a pair of the data and significance information that are possibly subjected to kinds of coding and decoding and are not secured to be synchronized, and in addition, to carry out efficient and high-speed processing by reduction of the amount of information of padding information which is obtained because of information specifying the continuous range and by the continuous processing in padding.

Embodiment 10

A data padding method according to a tenth embodiment of the present invention carries out padding after synchronization similarly to the eighth embodiment, and specifies data to be subjected to padding as a continuous region.

Figure 27:
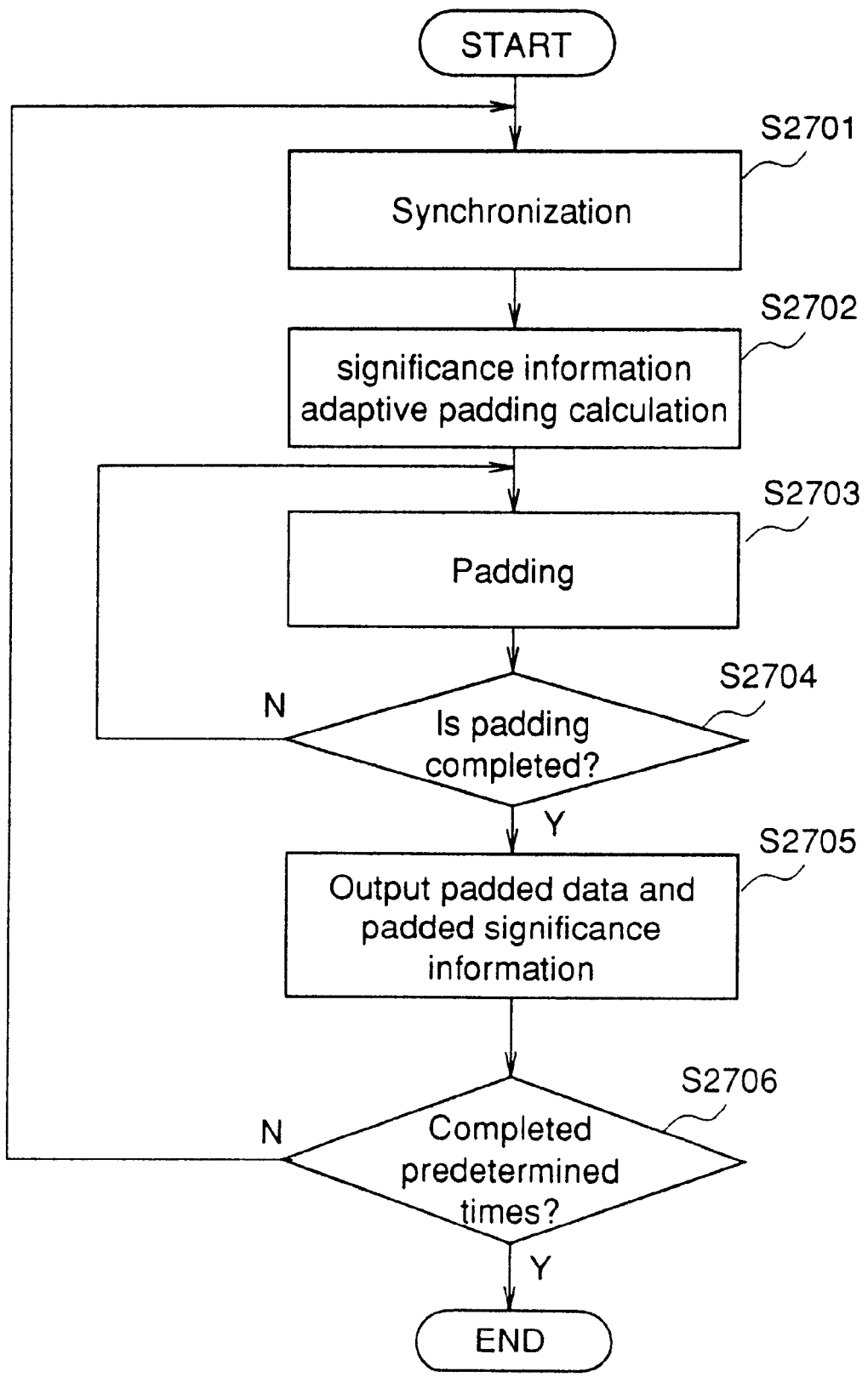
FIG. 27 is a flowchart showing a processing procedure of a data padding method according to a tenth embodiment of the present invention.

FIG. 27 is a flowchart showing the processing procedure of the data padding method according to the tenth embodiment. As shown in the figure, the data padding method according to the tenth embodiment executes a data synchronizing step 2701 for subjecting input data and significant information to synchronization, a significance information adaptive padding calculation step 2702 for deciding a padding method and generating padding information to be used in padding according to the decided padding method, a padding step 2703 for carrying out padding according to the padding information, a padding completion deciding step 2704 for deciding whether the padding is completed or not, an output step 2705 for outputting padded data and padded significance information, and a predetermined times completion deciding step 2706 for deciding whether padding is done a predetermined times or not.

The operation in executing the data padding method according to the tenth embodiment is explained according to the flow in FIG. 27 as follows.

The steps 2701 to 2705 are carried out similarly to the steps 2401 to 2405 in the embodiment 8. Consequently, padded data and padded significance information are generated. In the tenth embodiment, after the step 2705 executed is the step 2706 where it is decided whether the steps 2701 to 2705 are executed the predetermined times or not. If the repetition is not done the predetermined times, the process goes back to the step 2701 where padding is executed. Note that in the step 2701 the input data and the input significance information are to be subjected to the synchronization immediately after start of the padding of the data padding method according to the tenth embodiment, but after the decision in the step 2706, the subjects of the synchronization are the padded data and padded significance information output in the step 2705 immediately before the step 2706. The steps 2701 to 2706 are repeated until the number of the repetition is decided to be equal to the predetermined times in the step 2706. If the number of the repetition is decided to be equal to the predetermined times in the step 2706, the processing procedure shown in FIG. 27 is completed.

Figure 13:
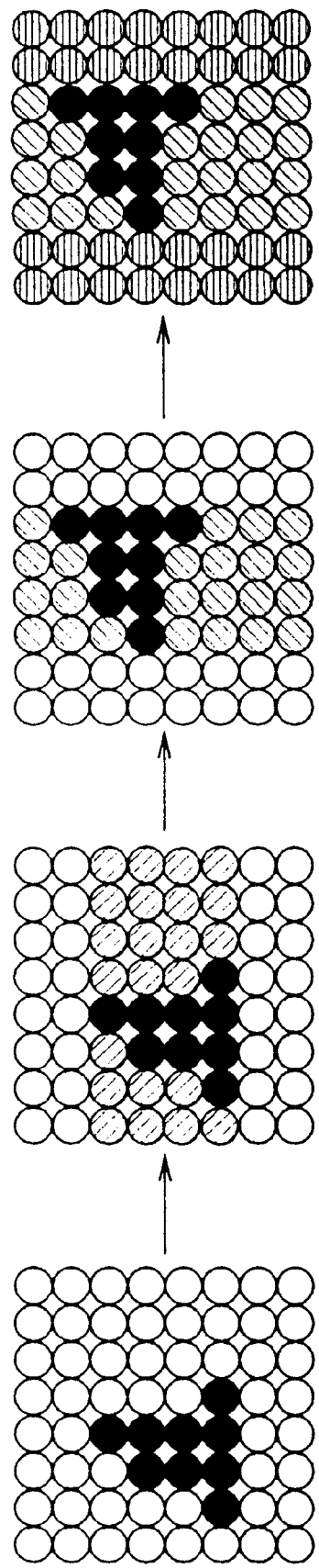
Figure 14:
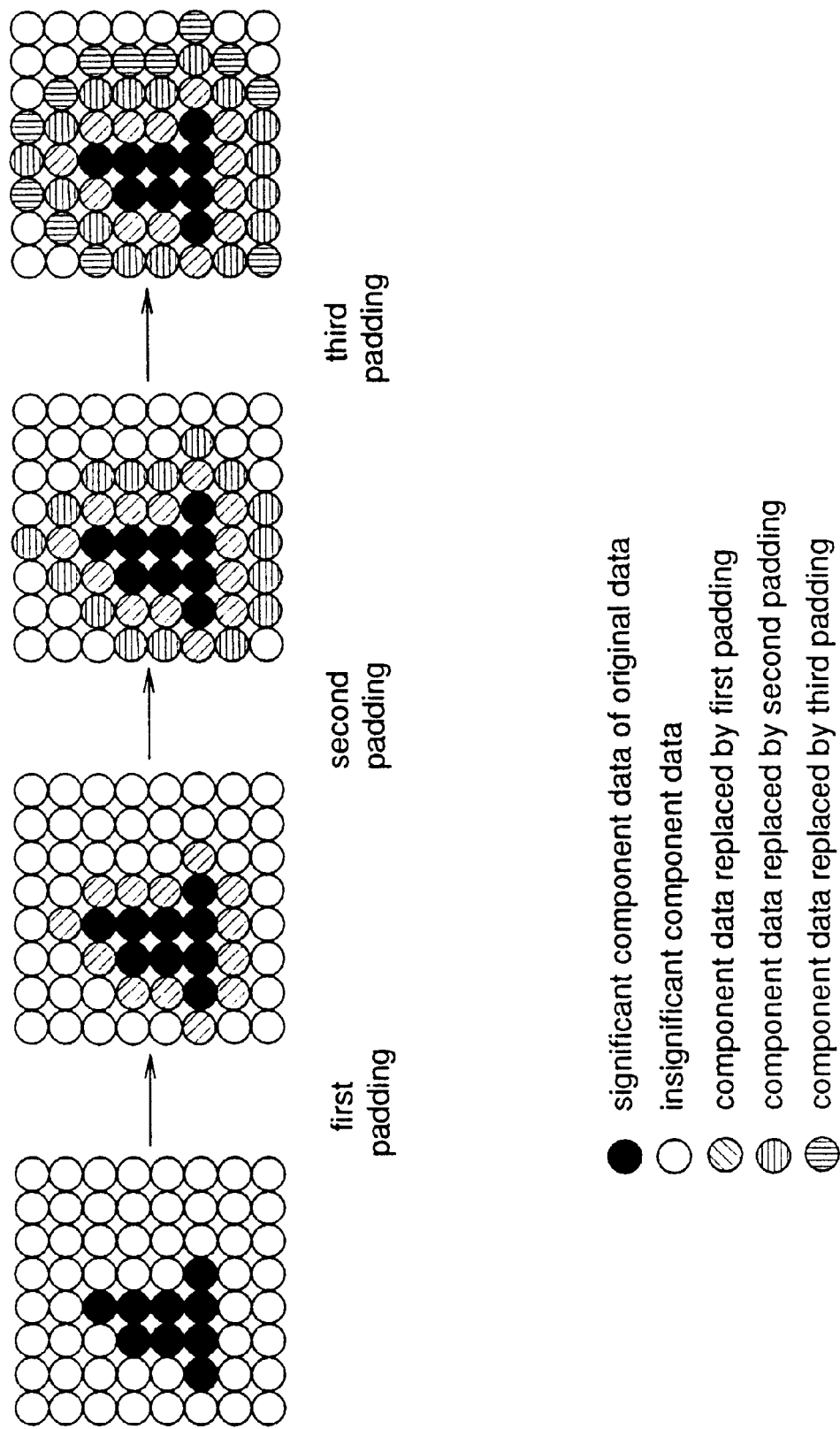
FIGS. 14a) to 14d) are diagrams for explaining a second example of the padding processing in the fourth embodiment.

The data padding method according to the tenth embodiment can carry out the padding shown in FIGS. 13 and 14, thereby making it possible to realize the advanced padding as a result of repeating the relatively simple processing.

As described above, the data padding method according to the tenth embodiment includes the data synchronizing step 2701, the significance information adaptive padding calculation step 2702, the padding step 2703, the padding completion deciding step 2704 and the output step 2705, wherein the padding method similar to that according to the eighth embodiment is repeated the predetermined times, thereby, similarly to the data padding method according to the seventh embodiment, making it possible to efficiently process a pair of the data and significance information that are possibly subjected to kinds of coding and decoding and are not secured to be synchronized, and further, similarly to the eighth embodiment, to carry out more appropriate padding adapting to the properties of data and the like, and furthermore, to carry out the advanced padding while fully using the apparatus source by repeating the relatively simple processing.

It should be noted that the tenth embodiment adds the predetermined times completion deciding step to the method according to the eighth embodiment, but can add the predetermined times completion deciding step to the method according to the seventh or ninth embodiment, whereby the advanced processing can be realized by the repetition.

Embodiment 11

A data padding method according to an eleventh embodiment divides data and significance information and subjects the division data and significance information to padding in parallel, and afterwards, reconstructs the results.

Figure 28:
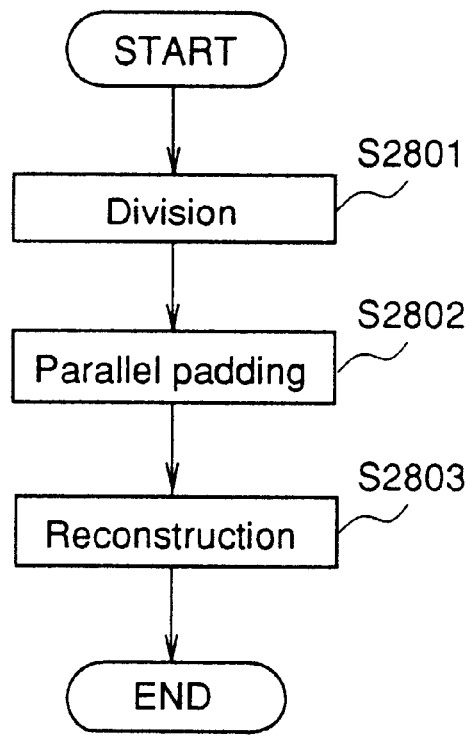
FIG. 28 is a flowchart showing the processing procedure of a data padding method according to an eleventh embodiment.

FIG. 28 is a flowchart showing the processing procedure of the data padding method according to the eleventh embodiment. As shown in the figure, the data padding method according to the eleventh embodiment executes a division step 2801 for dividing input data and input significance information, a parallel padding step 2802 for executing plural paddings in parallel for the division data and division significance information generated by the dividing in the step 2801 to generate padded division data and padded division significance information, and a reconstruction step 2803 for reconstructing the generate padded division data and the padded division significance information to generate padded data and padded significance information.

The operation in executing the data padding method according to the eleventh embodiment is explained according to the flow in FIG. 28 as follows.

In the step 2801, using a predetermined number N, the input data and the input significance information are divided to generate N pieces of first to N-th division data and N pieces of first to N-th division significance information. In the step 2802, the division data and division significance information generated in the step 2801 are subjected to paddings in parallel. That is, the first to N-th paddings are carried out in parallel in the following way: the first division data and the first division significance information are subjected to the first padding, the second division data and the second division significance information are subjected to the second padding, . . . . The first to N-th paddings generate N pieces of the first to N-th padded division data and N pieces of the first to N-th padded division significance information. In the step 2803, padded data are reconstructed from N pieces of the first to N-th padded division data, and padded significance information are reconstructed from N pieces of the first to N-th padded division significance information.

Figure 16:
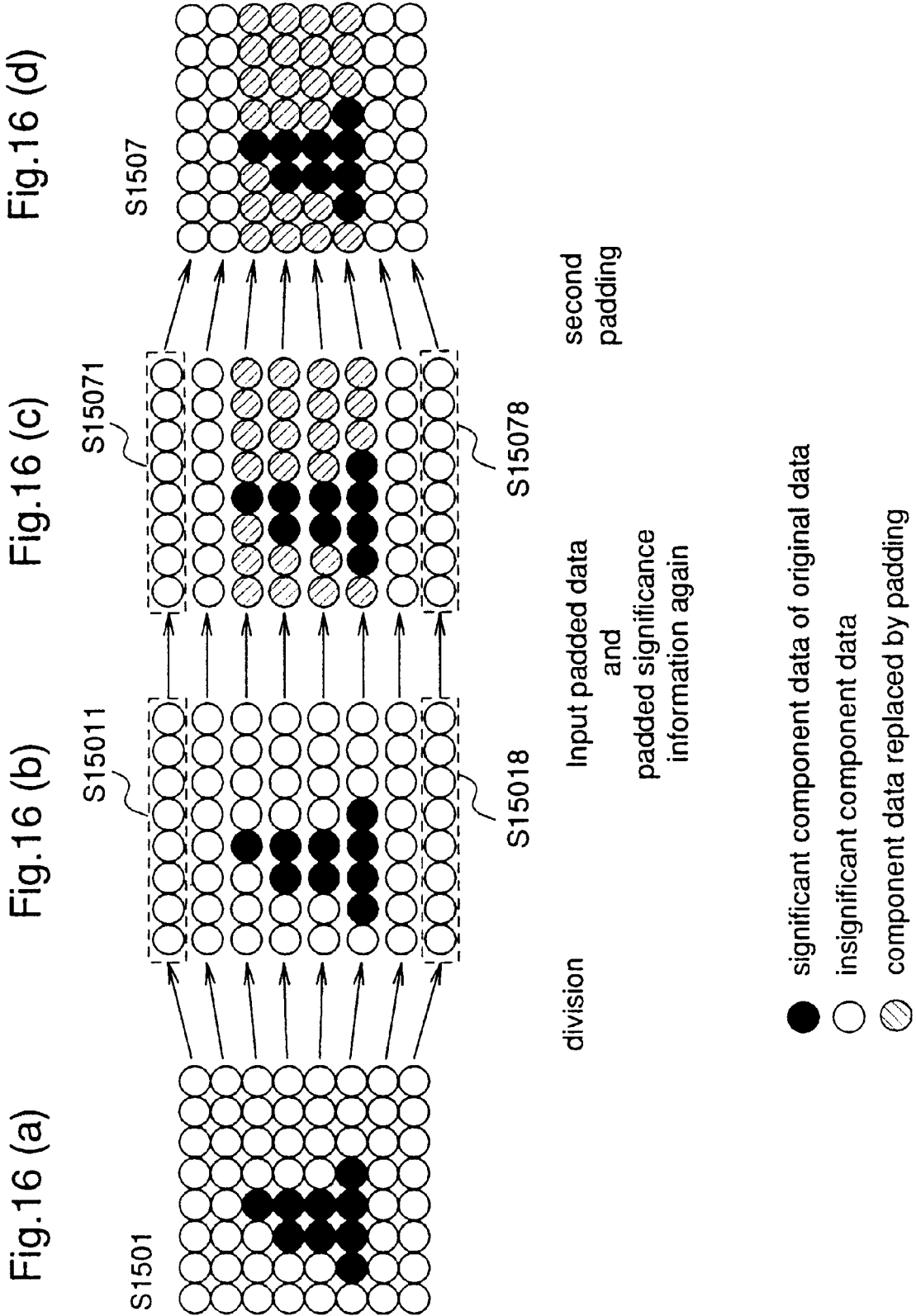
FIGS. 16a) to 16d) are diagrams for explaining a first example of a padding processing in the fifth embodiment.
Figure 17:
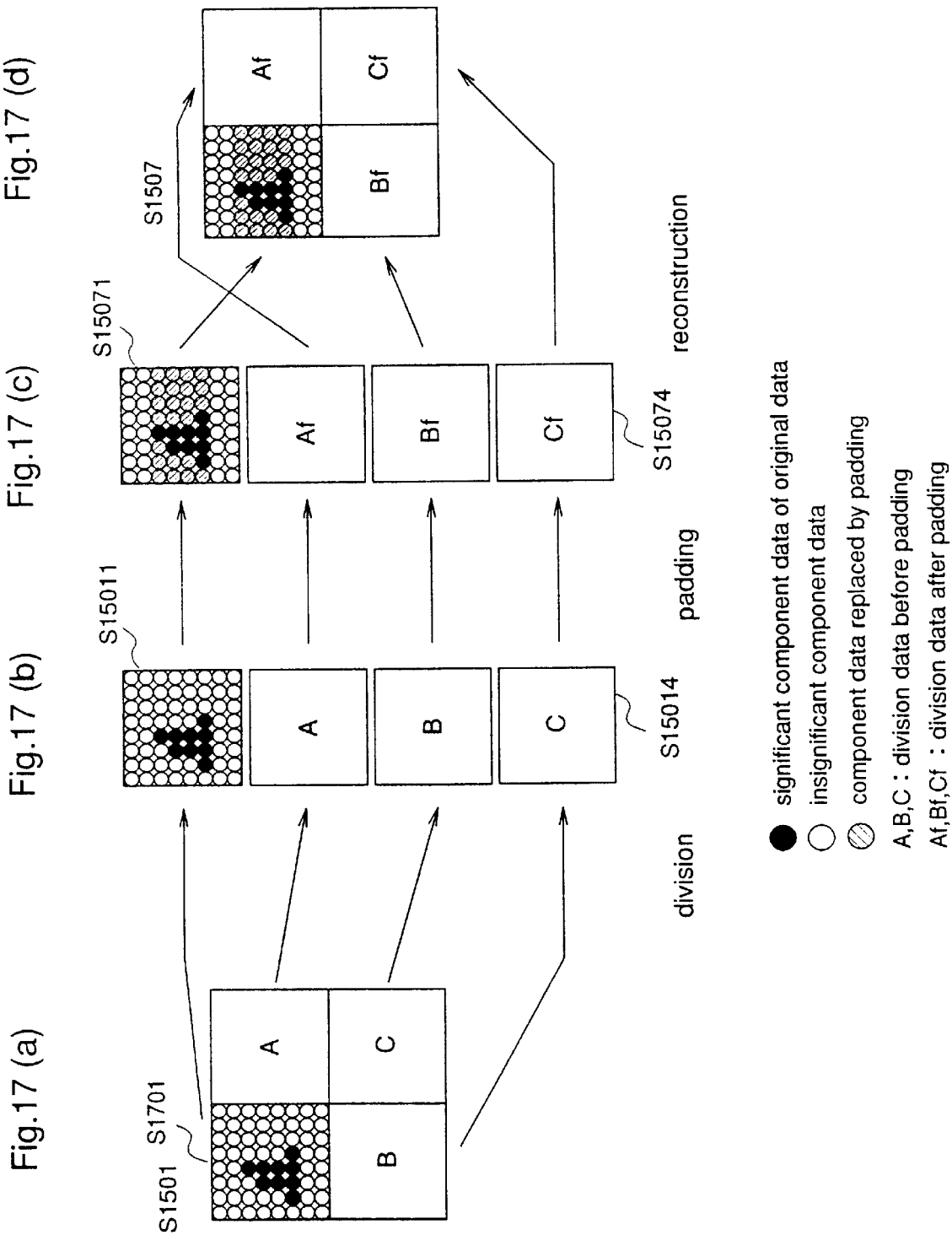
FIGS. 17a) to 17d) are diagrams for explaining a second example of the padding processing in the fifth embodiment.

As described above, the data padding method according to the eleventh embodiment can carry out the padding shown in FIGS. 16 and 17 and can realize the high-speed padding by executing the relatively simple processings in parallel. It is possible to apply a different padding method to each region.

As described above, the data padding method according to the eleventh embodiment includes the division step 2801, the parallel padding step 2802 and the reconstruction step 2803, wherein the input data and significance information are divided and then subjected to padding in plural processings in parallel and the data and padded significance information are reconstructed, so that the parallel processing can make the whole process high-speed, and further, it is possible to do flexible padding such as padding which is carried out according to a different method for each region.

Note that for the first to N-th paddings used in the parallel padding step in the eleventh embodiment, the data padding method shown in the seventh embodiment can be applied to handle inputs which are not synchronized, the method according to the eighth embodiment can be applied to carry out the appropriate processing adapting to the properties of data and the like, the method according to the ninth embodiment can be applied to improve efficiency by the continuous processing, and the method according to the tenth embodiment can be applied to carry out the advanced padding by the repetition.

Embodiment 12

A data padding method according to a twelfth embodiment subjects input data and significance information to plural paddings in parallel and synthesizes each result of padding.

Figure 29:
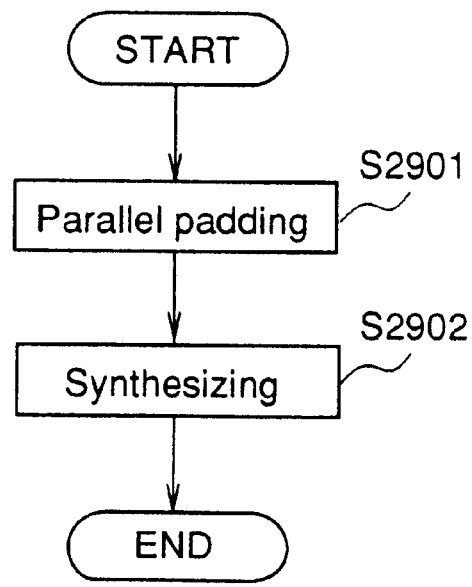
FIG. 29 is a flowchart showing the processing procedure of a data padding method according to a twelfth embodiment.

FIG. 29 is a flowchart showing the processing procedure of the data padding method according to the twelfth embodiment. As shown in the figure, the data padding method according to the twelfth embodiment executes a parallel padding step 2901 for executing plural paddings in parallel for the input data and significance information to generate padded data and padded significance information, and a synthesizing step 2902 for synthesizing the padded data and padded significance information obtained by the plural paddings to generate the synthesized padded data and padded significance information.

The operation in executing the data padding method according to the twelfth embodiment is explained according to the flow in FIG. 29 as follows.

In the step 2901, using a predetermined number N, the input data and the input significance information are sub-jected to N pieces of paddings in parallel. The first to N-th padding can be carried out according to respective different padding methods. The first to N-th padding generate first to N-th padded data and first to N-th padded significance information. In the step 2902, the first to N-th padded data are synthesized to generate the synthesized padded data. The first to N-th padded significance information are synthesized to generate the synthesized padded significance information.

Figure 19:
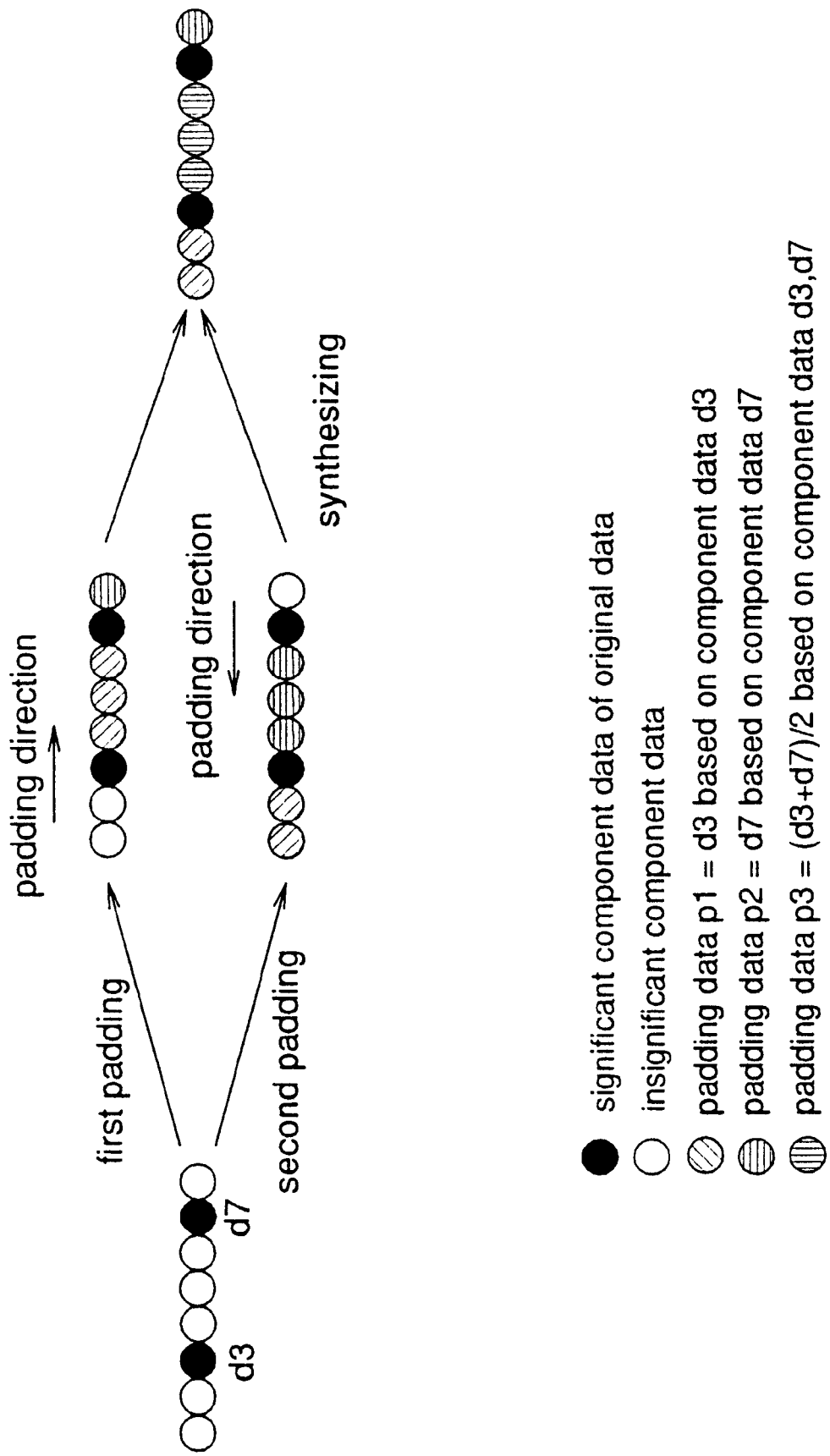
FIGS. 19a) to 19c) are diagrams for explaining a first example of a padding processing in the sixth embodiment.
Figure 20:
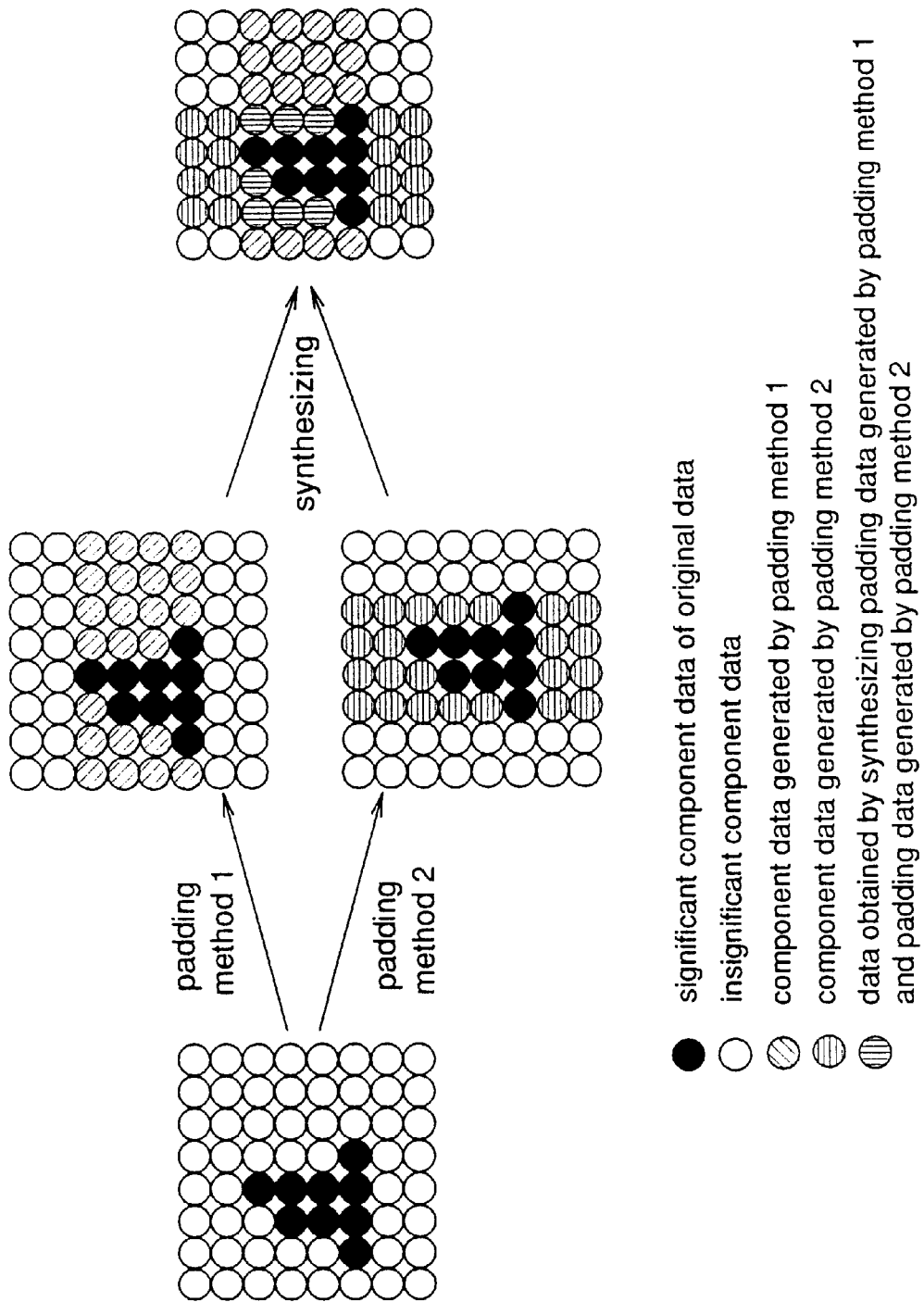
FIGS. 20a) to 20c) are diagrams for explaining a second example of the padding processing in the sixth embodiment.

The data padding method according to the twelfth embodiment can carry out the padding shown in FIGS. 18 and 19, and the high-speed and advanced padding by executing the relatively simple processings in parallel.

As described above, the data padding method according to the twelfth embodiment includes the parallel padding step 2901 and the reconstruction step 2902, wherein input data and significance information are padded with the plural processings in parallel, and the data and padded significance information are synthesized, whereby the parallel processing increases the processing rate, and the advanced padding and the complicated padding can be carried out by the combination of the relatively simple paddings.

Note that for the first to N-th paddings used in the parallel padding step in the twelfth embodiment, the data padding method shown in the seventh embodiment can be applied to handle inputs which are not synchronized, the method according to the eighth embodiment can be applied to carry out the appropriate processing adapting to the properties of data and the like, the method according to the ninth embodiment can be applied to improve efficiency by the continuous processing, and the method according to the tenth embodiment can be applied to carry out the advanced padding by the repetition.

Embodiment 13

A data padding apparatus and data padding method according to a thirteenth embodiment of the present invention, similarly to the third and ninth embodiments, specifies data to be subjected to padding as a continuous region and carries out processing according to changes of significance of data.

Figure 30:
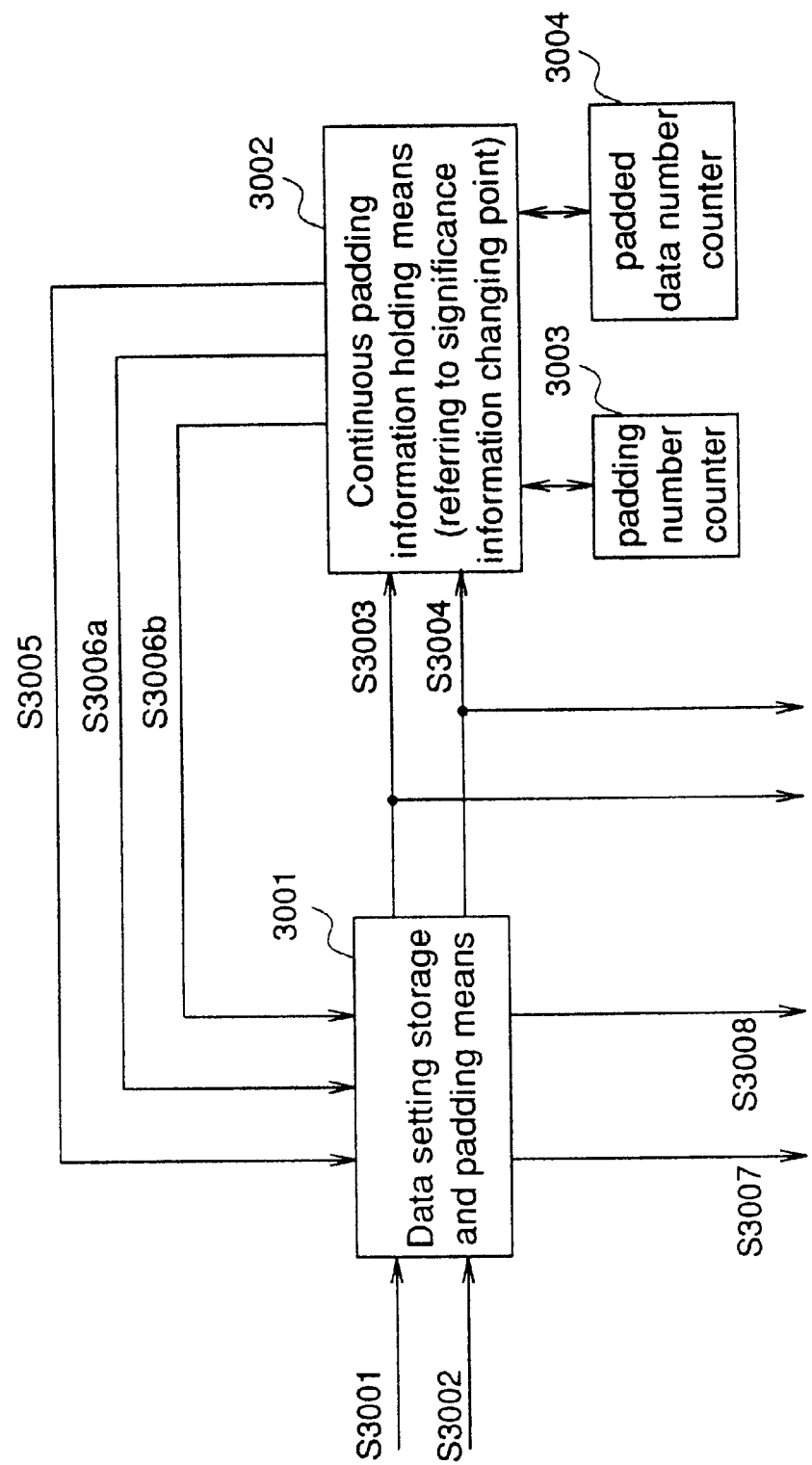
FIG. 30 is a block diagram the configuration of a data padding apparatus According to a thirteenth embodiment.

FIG. 30 is a block diagram showing the configuration of the data padding apparatus according to the thirteenth embodiment. As shown in the figure, the data padding apparatus according to the thirteenth embodiment comprises a data setting storage and padding means 3001, a continuous padding information holding means 3002 which incorporates a function of referring to significance information changing points, a padding number counter 3003 and a padded data number counter 3004.

The data setting storage and padding means 3001, similarly to the storage and padding means 101 according to the first embodiment, subjects data and significance information to synchronization and padding. In padding, the data stored in a data storage means included the data setting storage and padding means is subjected to the continuous padding using information obtained from the continuous padding information holding means 3002 described hereinafter, similarly to the data storage and padding means 901 according to the third embodiment. The continuous padding information holding means 3002, similarly to the continuous padding information holding means 902 according to the third embodiment, generates as padding information, padding starting address information and padding ending address information which specify the range of continuous addresses, but in the thirteenth embodiment, includes a function of referring to significance information changing points which detects a changing point where the component significance information corresponding to the component data change between information indicating 'significant' and information indicating 'insignificant', and carries out processing using the result of the detection. The padding number counter 3003 counts the number of continuous insignificant component data and the padded data number counter 3004 counts the number of component data already subjected to padding, the result of both of which are used to generate padding information in the continuous padding information holding means.

Figure 31:
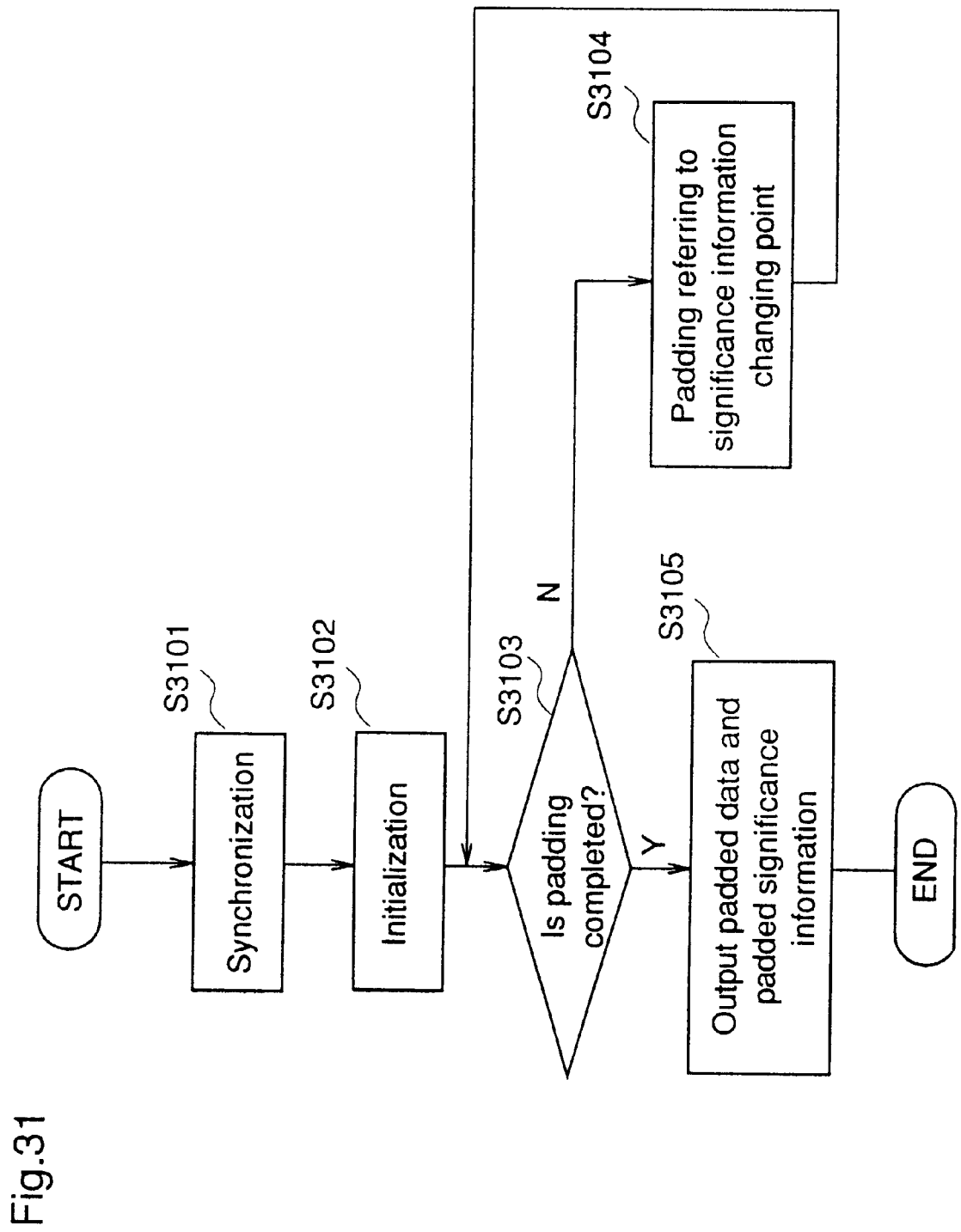
FIG. 31 is a flowchart showing the processing procedure of the data padding method according to the thirteenth embodiment.
Figure 32:
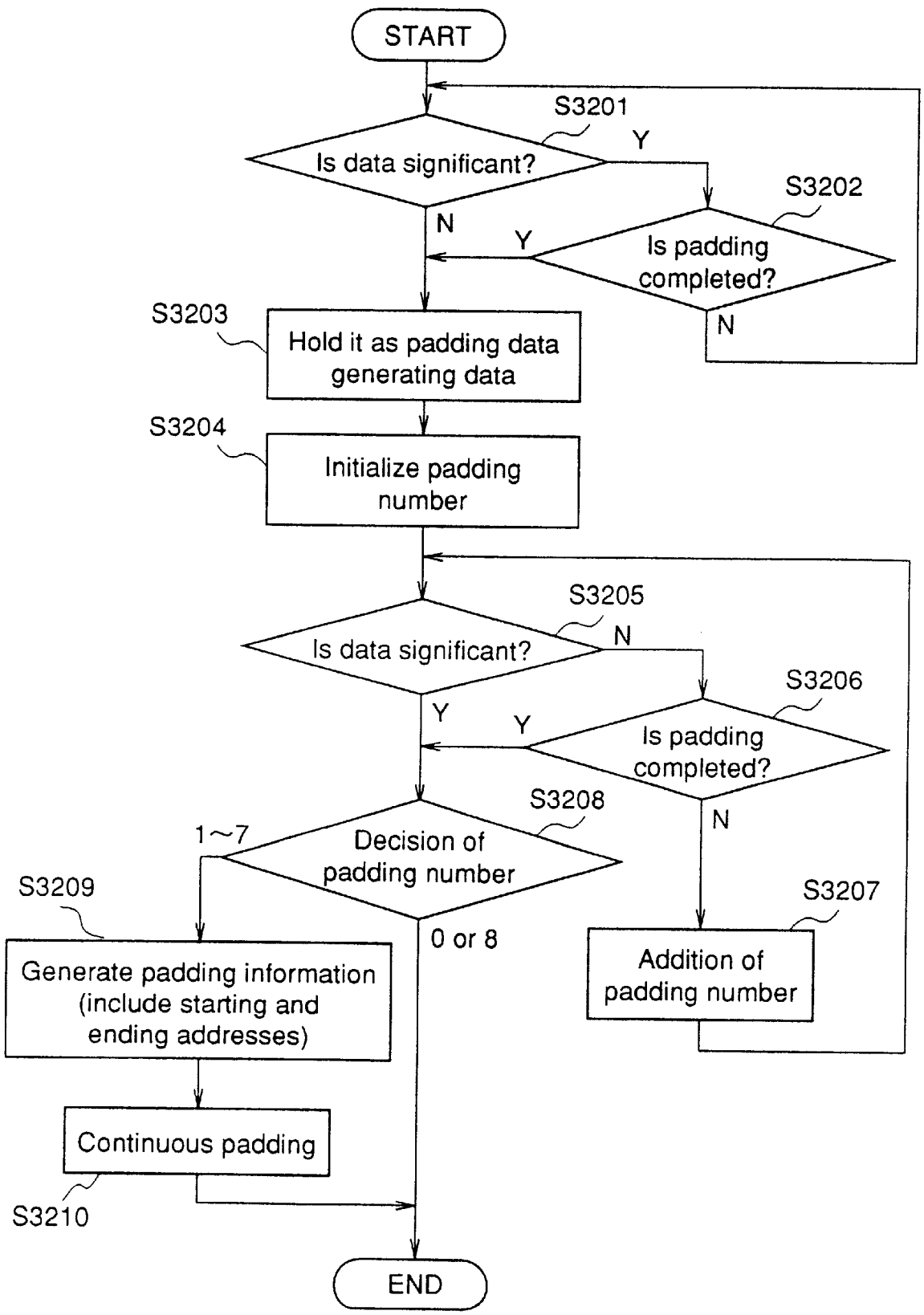
FIG. 32 is a flowchart showing the details of the processing procedure of a significance information changing point reference padding step according to the thirteenth embodiment.

FIG. 31 is a flowchart showing the processing procedure of the data padding method according to the thirteenth embodiment. As shown in the figure, the data padding method according to the thirteenth embodiment executes a data synchronizing step 3101 for synchronizing input data and input significance information, an initialization step 3102 for carrying out initialization for generating padding information, a padding completion deciding step 3103 for deciding whether padding is completed or not, a significance information changing point reference padding step 3104 for detecting the changes of component significance information of the significance information and generating padding information according to the changes and carrying out padding, and an output step 3105 for outputting padded data and padded significance information. FIG. 32 is a flowchart showing the details of the processing procedure of the significance information changing point reference padding step in the processing procedure shown in FIG. 31.

The operation of the data padding apparatus according to the thirteenth embodiment referring to FIGS. 30 to 32 as follows. Note that also in the thirteenth embodiment the input data consists of component data and the significance information consists of component significance information. A number being set as a processing unit number, the number of component data and the number of component significance information are processed in each processing unit.

When input data S3001 and input significance information S3002 are input to the data padding apparatus according to the thirteenth embodiment, the synchronization is, similarly to the first embodiment, carried out in the step 3101 in the flow shown in FIG. 31 to generate synchronized original data S3003 and synchronized significance information S3004. In FIG. 30, the original data S3003 and the synchronized significance information S3004 are input to the continuous padding information holding means 3002 where the processing unit number is set and the count number of the padded data number counter 3004 is initialized. In this case, the processing unit number is set to 8 and the padded data number counter 3004 is initialized to have a value 0.

In the step 3103, it is decided whether padding is completed or not. If the padding is not completed, the padding is executed in the step 3104 and then the process goes back to the step 3103. The steps 3103 to 3104 are repeated until in the step 3103 the padding is decided to be completed. When the padding is decided to be completed in the step 3103, the step 3105 follows and the processing procedure shown in FIG. 30 is completed.

A description is given of the details of the processing procedure of the significance information changing point reference padding which is carried out in the step 3004 when in the step 3103 the padding is not decided to be completed, referring to FIG. 32.

In the step 3201, the continuous padding information holding means 3002 judges, using the original data S3003 and synchronized significance information S3004 input, whether the component data to be processed is significant or not, and if it is decided to be significant, executes the step 3202, but if it is decided to be insignificant, executes the step 3203.

When the step 3202 is executed, for all component data constituting the processing unit data, it is decided whether in the step 3201 the significance of each component data is already decided. If all component data is already decided, the step 3203 follows, but if not, the process goes back to the step 3201 where the next component data is decided whether to be significant. When the step 3202 judges that all component data are completely decided, that is, when in the processing unit data including component data to be processed, the component data to be processed and the following component data are all decided to be significant, the step 3203 follows, virtually without executing the following steps, and the process of the flow in FIG. 32 is completed.

In the step 3203, the continuous padding information holding means 3002 holds the immediately previous significant component data as padding data generating data. At this time, when there is no immediately previous significant component data in the processing unit, the continuous padding information holding means 3002 holds information indicating 'no padding data generating data'.

The step 3203 is followed by the step 3204 where the padding number counter 3003 is initialized. After the padding number counter 3003 is set to 0, the step 3205 follows. In the step 3205, the component data to be processed is decided whether to be significant or not, and if it is decided to be significant, the step 3208 is executed, while if it is decided to be insignificant, the step 3205 is executed.

When the step 3206 is executed, the padding for the component data is decided whether to be completed. If it is decided to be completed, the step 3208 follows, while if not, in the step 3207 the count number of the padding number counter 3003 is added a value 1 and then the process goes back to the step 3205.

When the step 3208 is executed, the count number of the padding number counter 3003 is decided whether to be a value 0 or a value 8 or else. If the count number is 0 or 8, the processing procedure of the flow in FIG. 32 is completed. On the other hand, if the count number is a value except for 0 and 8, the steps 3209 to 3210 are executed.

In the step 3209, the continuous padding information holding means 3002 generates padding data based on the padding data generating data held in the step 3203 and the immediately previous significant component data. When the continuous padding information holding means 3002 holds the information indicating 'no padding data generating data', padding data is generated based only on the immediately previous significant component data. Thereafter, the continuous padding information holding means 3002 obtains the count numbers of the padding number counter 3003 and the padded data number counter 3004, and based on the count numbers, generates the padding starting address information and padding ending address information indicating the range to be subjected to the continuous padding. In FIG. 30, padding data S3005, padding starting address information S3006a and padding ending address information S3006b are output from the continuous padding information holding means 3002 to the data setting storage and padding means 3001. Moreover, the continuous padding information holding means 3002 updates the count number of the padded data number counter 3004.

In the step 3210, the data setting storage and padding means 3001 subjects the data specified by the padding starting address information S3006 and the padding ending address information S3006b to the continuous padding using the padding data S3005, and changes the region of significance information so as to continuously indicate 'significant', and generates padded data and padded significance information. Thus, the processing procedure of the flow in FIG. 32 is completed.

When the flow in FIG. 32 is completed, the process goes back to the flow in FIG. 31 where because the step 3104 has been completed, the step 3103 carries out the decision again. As described above, in the repetition of the steps 3103 to 3104, if the step 3105 is executed as a result of the decision in the step 3103, padded data S3007 and padded significance information S3008 are output.

As described above, the data padding apparatus according to the thirteenth embodiment comprises the data setting storage and padding means 3001, the continuous padding information holding means 3002 with the function of referring to significance information changing point, the padding number counter 3003 and the padded data number counter 3004, wherein the continuous padding information holding means 3002 detects the changing point where the significance changes in the significance information, using the padding number counter 3003 counting the number of continuous insignificant component data and the padded data number counter 3004 counting the number of component data already subjected to padding, and according to the detected changing point, generates padding information for the continuous padding, and using this padding information, the data setting storage and padding means 3001 carries out the continuous padding, whereby, similarly to the third embodiment, the generation of the padding information specifying the range reduces the amount of information of the padding information and therefore processing efficiency can be improved, and in addition, the component data are decided whether to be significant or not over the entire continuous region at a time, so that the processing efficiency can be more improved.

Further, the data padding method according to the thirteenth embodiment includes the data synchronizing step 3101, the initialization step 3102, the padding completion deciding step 3103, the significance information changing point reference padding step 3104 and the output step 3105, wherein the significance information changing point reference padding step 3104 detects the changing point where the significance changes in the significance information, and according to the detected changing point, generates padding information for the continuous padding, and using this padding information, carries out the continuous padding, whereby, similarly to the ninth embodiment, the generation of the padding information specifying the range reduces the amount of information of the padding information and therefore processing efficiency can be improved, and furthermore, the component data are decided whether to be significant or not over the entire continuous region at a time, so that the processing efficiency can be more improved.

Furthermore, in the thirteenth embodiment, the data synchronization extends the limits of sort of data to be processed and therefore puts the apparatus in wider use. However, even when data and significance information which are synchronized are input and thus are not subjected to the data synchronization, it is possible to improve the efficiency of padding by referring to the significance information changing point.

Embodiment 14

In a data padding apparatus and a data padding method according to a fourteenth embodiment of the present invention, padding is performed repeatedly and a result of padding in a stage is applied to padding in a next stage.

Figure 33:
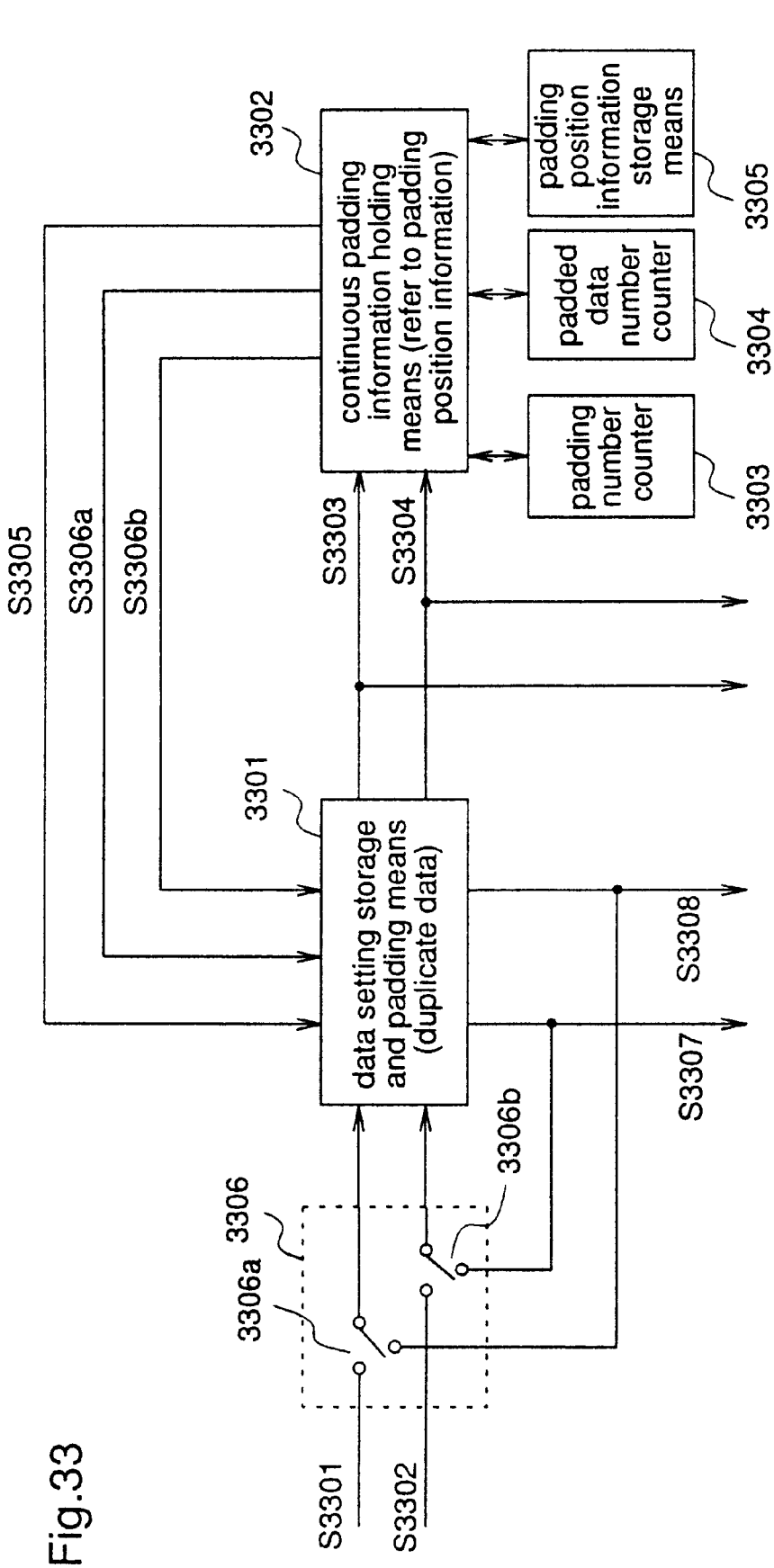
FIG. 33 is a block diagram showing the configuration of a data padding apparatus according to a fourteenth embodiment.

FIG. 33 is block diagram showing a construction of a data padding apparatus of the fourteenth embodiment. Referring to FIG. 33, the data padding apparatus of the fourteenth embodiment comprises data setting storage and padding means (with data duplicating capability) 3301, continuous padding information holding means (with capability of referring to padded information) 3302, a padding number counter 3303, padded data number counter 3304, padding position information storage means 3305, and processing object switching means 3306.

Specifically, the means 3301 is used for holding input data and input significance information, and performing continuous padding on the basis of padding information output from the holding means 3302, and has capability of duplicating and holding stored data. The holding means 3302 is used for producing padding starting and ending address information with which continuous address range is specified as the padding information, and in the fourteenth embodiment, it has capability of referring to padding position information, and is used for producing padding information for padding in a next stage on the basis of information on a result of a padding in a stage which is held in the storage means 3305. The counter 3303 is used for counting number of continuous component data which has riot been padded, and the counter 3304 is used for counting number of component data which has been padded. The counted numbers of these counters are used for producing the padding information in the holding means 3302. The storage means 3305 is used for holding information on a result of padding in a stage. The switching means 3306 comprises a data switch 3306a and a significance information switch 3306b, for switching an input to the means 3301. Through the data switch 3306a, one of input data and padded data is input to the means 3301, and through the significance switch 3306b, one of the input significance information and padded data is input thereto.

Figure 34:
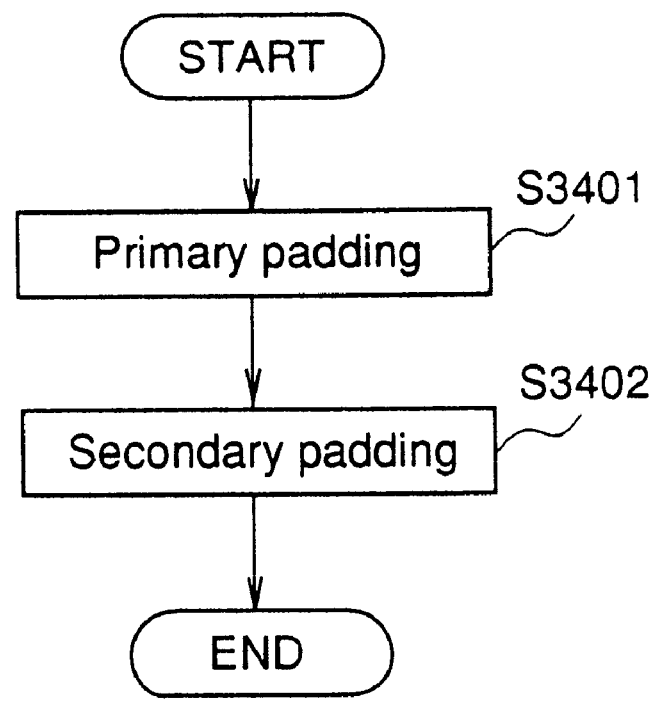
FIG. 34 is a flowchart of the processing procedure of the data padding method according to the fourteenth embodiment.
Figure 35:
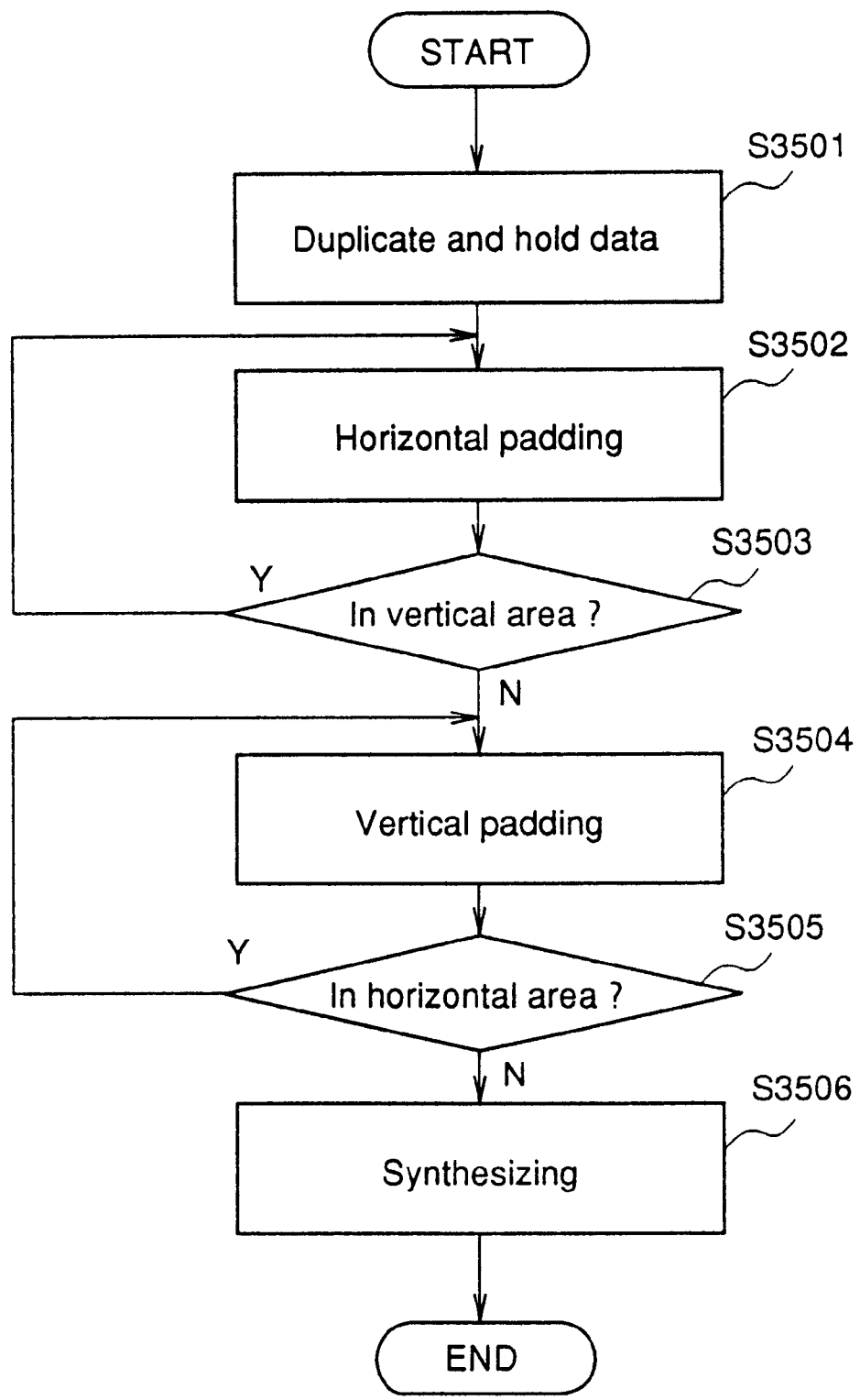
FIG. 35 is a flowchart showing the details of the processing procedure of a first padding step executed in the data padding method according to the fourteenth embodiment.
Figure 36:
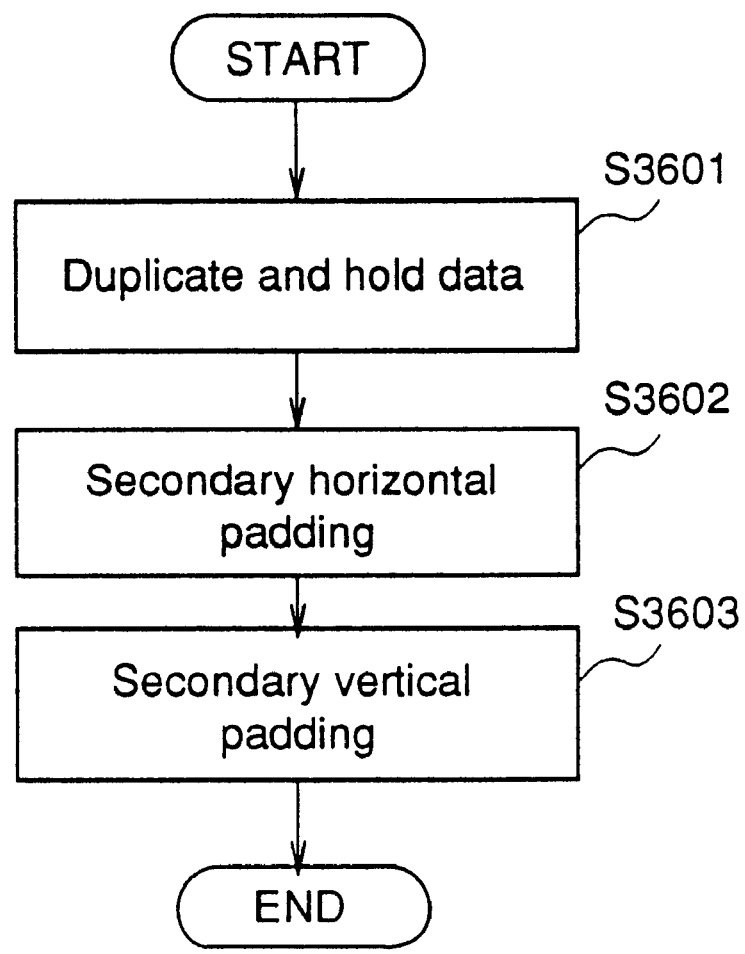
FIG. 36 is a flowchart showing the details of the processing procedure of a second padding step executed in the data padding method according to the fourteenth embodiment.
Figure 37:
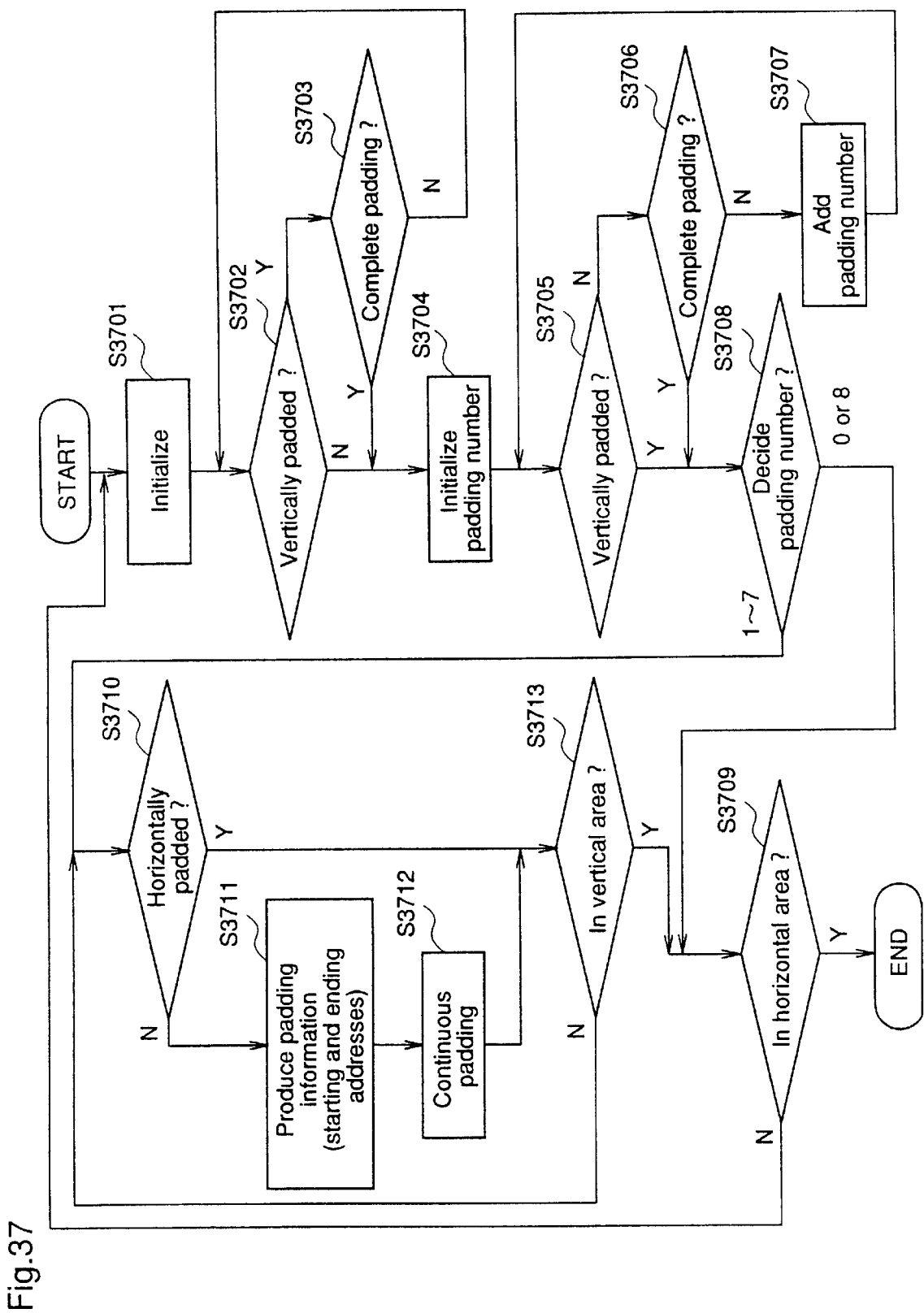
FIG. 37 is a flowchart showing the details of the processing procedure of a horizontal second padding step included in the second padding step executed the data padding method according to the fourteenth embodiment.
Figure 38:
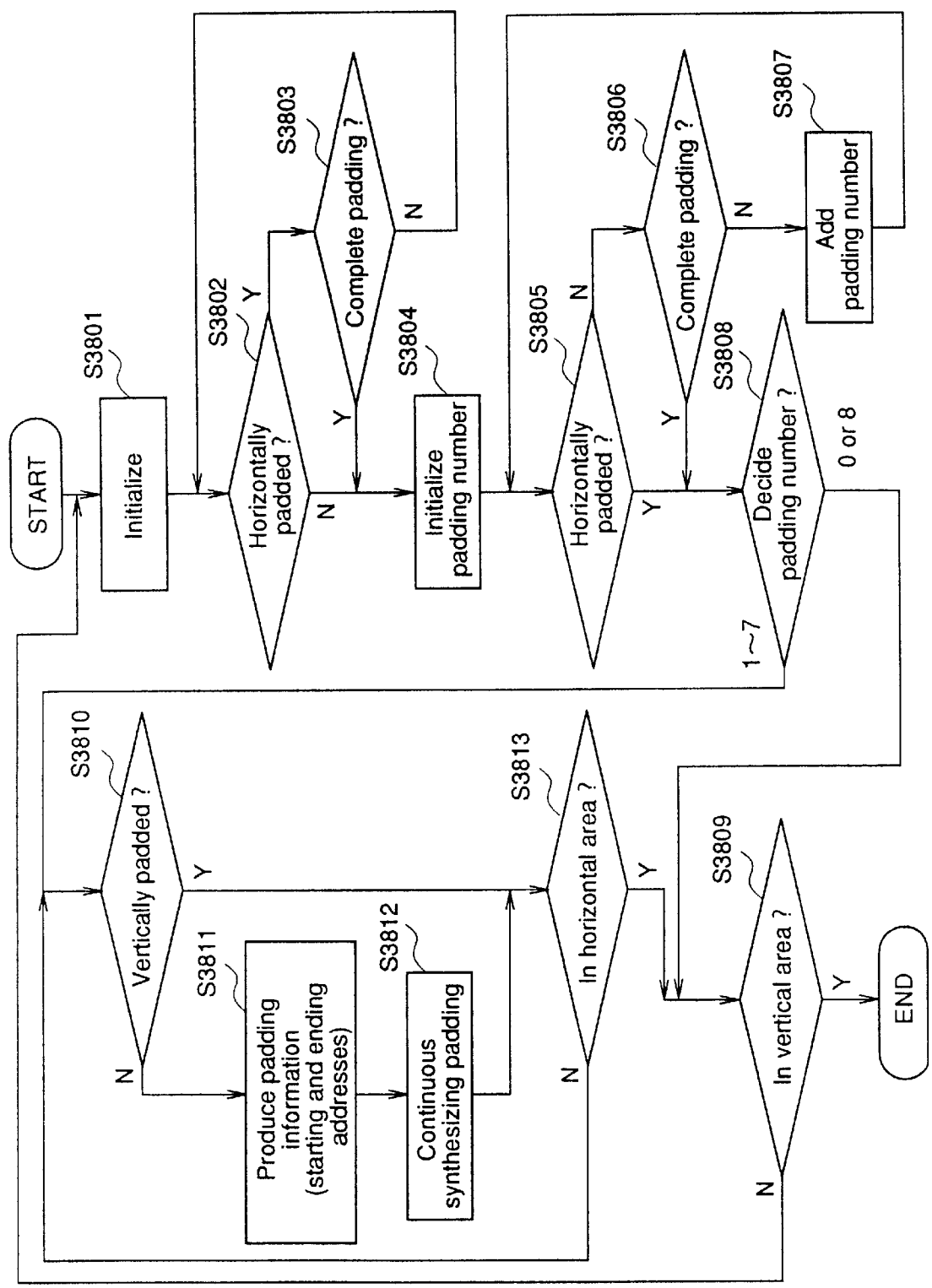
FIG. 38 is a flowchart showing the details of the processing procedure of a vertical second padding step included in the second padding step executed the data padding method according to the fourteenth embodiment.

FIG. 34 is a flowchart showing processing procedure of the data padding method according to the fourteenth embodiment. Referring to FIG. 34, according to the data padding method of the fourteenth embodiment, in a primary padding step S3401, a first padding is performed to the input data and the input significance information by a first padding method, to generate padded data and padded significance information, and padding position information indicating positions in which the first padding has been performed, and in a secondary padding step 3402, padding information is generated on the basis of the padding position information generated in the primary padding step 3401, a second padding is performed on the basis of the generated padding information. FIGS. 35 and 36 show the primary and secondary paddings in FIG. 34 in detail, respectively. FIGS. 37 and 38 are flowcharts showing a secondary horizontal padding and a secondary vertical padding in FIG. 36, respectively. FIG. 39 is a diagram showing padding in the data padding apparatus or by the data padding method of the fourteenth embodiment, and FIG. 40 is a diagram showing the padding position information of the fourteenth embodiment.

Hereinafter, operation of the data padding apparatus of the fourteenth embodiment will now be described with reference to FIGS. 33 to 40.

In "A. OUTLINE", following flow in FIG. 34, the data padding method of the fourteenth embodiment in FIG. 39 is described. In "B. primary padding", following flow in FIG. 35, and simultaneously with reference to FIGS. 33, 39, and

40, the primary padding of the data padding apparatus of the fourteenth embodiment is described. In "C. OUTLINE OF SECONDARY PADDING", "D. SECONDARY HORIZONTAL PADDING", and "E. SECONDARY VERTICAL PADDING", following flow in FIG. 36 and with reference to FIG. 33, following flow in FIG. 37 and with reference to FIG. 39, and following flow in FIG. 38 and with reference to FIG. 40, respectively, the secondary padding of the data padding apparatus of the fourteenth embodiment is described.

First, "A. OUTLINE" is described.

A. Outline

In step 3401 in FIG. 34, the primary padding is performed. This is described with reference to FIG. 39. Referring to FIG. 39, a) indicates input data of a two-dimensional structure. As shown in a), in horizontal processing, it is assumed that 8 pieces of component data aligned in the horizontal direction is horizontal processing unit component data, and in vertical processing, it is assumed that 8 pieces of component data aligned in the vertical direction is vertical processing unit component data.

Initially, the input data in a) is padded in the horizontal direction to generate first data after primary padding in b), and is padded in the vertical direction to generate second data after primary padding in c). Subsequently, the first data and second data after primary padding are synthesized to generate synthesized data after primary padding in d). In this synthesizing, significance component data, component data to which padding has been performed in one of the horizontal and vertical directions, and component data in which component data to which padding has been performed in the horizontal and vertical directions is averaged, are synthesized.

Then the padding position information is generated. This is described in FIG. 40. Referring to FIG. 40, a)–c) in this figure are identical to a)–c) in FIG. 39, and indicate input data, first data after primary padding and second data after primary padding, respectively.

From the first data after primary padding in b), information on a result of horizontal padding in d) is generated. The information indicates whether padding has been performed in the primary padding for each horizontal processing unit data or not, and indicates whether horizontal processing unit data must be padded in secondary padding in a next stage or not.

From the second data after primary padding in c), information on a result of a vertical padding in e) is generated. The information indicates whether padding has been performed in the primary padding or not for each vertical processing unit data, and indicates whether vertical processing unit data must be padded in secondary padding in a next stage or not.

In step 3402 in FIG. 34, secondary padding is performed. In this secondary padding, synthesized data after primary padding in d) is processed. This synthesized data is padded in the horizontal direction to generate first data after secondary padding in e), and is padded in the vertical direction to generate second data after secondary padding in f). In this fourteenth embodiment, the padding position information is used to increase efficiency in processing, which will be described later.

Then the first data and second data after secondary padding are synthesized to generate synthesized data after secondary padding in g). This synthesizing is performed as in the primary padding.

Although only data is shown in FIG. 39, note that the corresponding significance information is also to be padded, as well as this is used in padding.

Next, "PRIMARY PADDING" is described.

B. Primary Padding

Referring to FIG. 33 again, the processing object switching means 3306 sets the built-in switch so that the input data S3301 and the input significance information S3302 are input to the data setting storage and padding means 3301.

In step 3501 in FIG. 35, the means 3301 duplicates the input data S3301 and the input significance information S3302, to generate first and second input data S3301a and S3302b, and first and second input significance information S3302a and S3302b, respectively, to be held in built-in data storage means and significance information storage means, respectively.

In step 3502 in FIG. 35, horizontal padding is performed. Referring to FIG. 39 again, from horizontal processing unit data of input data in a), first data after primary padding in b) is generated. The means 3301 outputs the horizontal processing unit data of the first input data S3301a as original data S3303, and processing unit significance information of the first input significance information S3302a as the significance information S3304 to the holding means 3302. The holding means 3302 generates padding information and the means 3301 performs padding on the basis of the generated padding information, wherein the counter 3303 and the counter 3304 detect changing points of significance information, as in the case of the thirteenth embodiment. In this processing, the counter 3303 is used for counting number of continuous significance component data. The means 3301 holds the first data after primary padding and the first significance information after primary padding in the built-in data storage means and significance information storage means, respectively.

Meanwhile, the holding means 3302 generates padding position information on the basis of the generated padding information and outputs the padding position information to the storage means 3305, to be held therein. Herein the information on the result of the horizontal padding in d) in FIG. 40 is generated and held. The information comprises plural pieces of component information on a result of horizontal padding of the horizontal processing unit data, and the number is equal to that of horizontal processing unit data. Respective component information indicates "padded" when horizontal processing unit data comprises padded component data, and "padding is required" when it comprises no padded component data. On completion of processing of one horizontal processing unit data, one component information on a result of horizontal padding is generated and held in the storage means 3305.

In step 3503 in FIG. 35, it is decided whether all horizontal processing unit data in the vertical area of the input data of the two-dimensional structure has been horizontally padded in step 3502 or not. When decided it has been horizontally padded, in step 3504, vertical padding in a next stage is performed, whereas when decided it has not been horizontally padded, in step 3502 subsequent processing unit data is horizontally padded.

In step 3502 subsequent to decision in step 3503, from following horizontal processing unit data of the input data in a) in FIG. 39, following horizontal processing unit data of the first data after primary padding in b) in FIG. 39 is generated. In step 3502, the data padding apparatus of the fourteenth embodiment operates as described above. The horizontal processing unit data and horizontal processing unit significance information of the first data after primary padding and the first significance information after primary padding are added to the first data after primary padding stored in the data storage means and the first significance information after primary padding held in the significance information storage means, respectively, to be held therein. For the information on a result of horizontal padding, following component information on a result of horizontal padding, is generated, and added to the information on a result of horizontal padding held in the storage means 3305, and held therein.

Steps 3502 and 3503 are repeated for all the horizontal processing unit data in the vertical area of the input data. For the data in FIG. 39, the steps are performed 8 times. After step 3502 is performed 8 times, the first data after primary padding in b) in FIG. 39, the first significance information after primary padding, and the information in d) in FIG. 40, are stored in the data storage means of the means 3301, the significant information storage means of means 3301, and the storage means 3305, respectively.

In step 3504 in FIG. 35, vertical padding is performed. As shown in FIG. 39, from vertical processing unit data of the input data in a), second data after primary padding in c) is generated.

Referring to FIG. 33 again, the means 3301 outputs vertical processing unit data of the second input data S3301b as original data S3303, and vertical processing unit significance information of the second input significance information S3302b as the significance information S3304 to the holding means 3302. The holding means 3302 generates padding information and the means 3301 performs padding using the generated padding information, wherein the counters 3303 and 3304 detect changing points of significance information, as in the case of the thirteenth embodiment. Also in this processing, the counter 3303 is used for counting number of continuous significant component data. The means 3301 is used for holding the second data after primary padding and the second significance information after primary padding in the built-in data storage means and significance information storage means, respectively.

Meanwhile, the holding means 3302 generates padding position information on the basis of the generated padding information and outputs the padding position information to the storage means 3305, to be held therein. At this time, one component of information on a result of vertical padding in e) in FIG. 40 is held in the storage means 3305. As shown in the figure, the information comprises plural pieces of component information on a result of vertical padding of vertical processing unit data, and the number is equal to that of vertical processing unit data. Respective component information indicates "padded" when vertical processing unit data comprises padded data, and "padding is required" when it comprises no padded data. On completion of processing of one vertical processing unit data, one component information on a result of vertical padding is generated and held in the holding means 3305.

In step 3505 in FIG. 35, it is decided whether all vertical processing unit data in the horizontal area of the input data of the two-dimensional structure has been vertically padded in step 3504 or not. When decided it has been vertically padded, in step 3506, synthesizing in a next stage is performed, whereas when decided it has not been vertically padded, in step 3504 subsequent processing unit data is vertically padded.

In step 3504 subsequent to decision in step 3505, from following vertical processing unit data of the input data in a) in FIG. 39, following vertical processing unit data of the second data after primary padding in c) in FIG. 39 is generated. In step 3504, the data padding apparatus of the fourteenth embodiment operates as described above. The vertical processing unit data and vertical processing unit significance information of the second data after primary padding and the second significance information after primary padding are added to the second data after primary padding held in the data storage means and the second significance information after primary padding held in the significance information storage means, respectively, to be held therein. For the information on a result of vertical padding, following component information on a result of vertical padding, is generated, and added to the information on a result of vertical padding held in the storage means 3305, and held therein.

Steps 3504 to 3505 are repeated for all the vertical processing unit data in the horizontal area of the input data. For the data in FIG. 39, the steps are performed 8 times. After step 3504 is performed 8 times, the second data after primary padding in c) in FIG. 39, the second significance information after primary padding, and the information in e) in FIG. 40, are stored in the data storage means of the means 3301, the significance information storage means of the means 3301, and the storage means 3396, respectively.

Thereafter, in step 3506, synthesizing is performed. The means 3301 generates synthesized data after primary padding from the first data and second padded data held in the built-in data storage means on the basis of the padding information held in the holding means 3302, and synthesized significance information after primary padding from the first and second padded significance information held in the built-in significance storage means.

At the completion of procedure in FIG. 35, the synthesized data after primary padding in d) in FIG. 39, the synthesized significance information after primary padding, and the information in d) in FIG. 40, and the information in e) in FIG. 40, are held in the data storage means of the means 3301, and the significance information storage means of the means 3301, and the storage means 3305, respectively. At this point, step 3401 in FIG. 34 ends.

C. Outline of Secondary Padding

Referring to FIG. 33 again the processing object switching means 3306 sets the built-in switch so that the synthesized data after primary padding S3307 and the synthesized significance information after primary padding S3308 are input thereto.

In step 3601 in FIG. 36, the means 3301 in FIG. 33 duplicates the synthesized data after primary padding S3307 and the synthesized significance information after primary padding S3308, to generate first and second data after primary padding S3307a and S3307b, and first and second significance information after primary padding S3308a and S3308b, respectively, to be held in built-in data storage means and significance information storage means, respectively.

In step 3602, secondary horizontal padding is performed, wherein from the synthesized data after primary padding in d) in FIG. 39, the first data after secondary padding in e) in FIG. 39 is generated. In step 3603, secondary vertical padding is performed, wherein from the synthesized data after primary padding in d) in FIG. 39, second data after secondary padding in f) in FIG. 39 is generated. In actuality, in secondary vertical padding in step 3603, continuous padding is performed concurrently with synthesizing, and this will be described in "E. SECONDARY VERTICAL PADDING", and therefore, in flow in FIG. 36, synthesizing step corresponding to step 3506 is not performed. As a result, in secondary vertical padding in step 3603, synthesized data after secondary padding in g) in FIG. 39 is generated.

In steps 3602 and 3603, the information in d) in FIG. 40 and the information in e) in FIG. 40 which have been generated and held in primary padding are used. Also, the significant information is processed in steps 3602 and 3603 as in the case of data.

D. Secondary Horizontal Padding

Secondary horizontal padding is performed following procedure in FIG. 37. In step 3701, number of processing units is set, and counting number of the counter 3305 is initialized to "0". Herein the horizontal processing unit data comprises 8 pieces of component data and therefore number of the processing units is "8".

In this fourteenth embodiment, in secondary padding, only area which has not been padded in the primary padding is padded, whereby efficiency in processing is increased. Referring to FIG. 37, in steps 3702 and 3703, component data of horizontal processing unit data, which has been vertically padded in the primary processing is continuously detected and such component data is excluded from processing.

In step 3702, the information on a result of vertical padding held in the storage means 3305 is referred to, to decide whether the information indicates "padded" or not, whereby it is decided whether target component data is of vertical processing unit data to be padded or not. When decided that the corresponding component of the information indicates "padding is required", step 3704 is performed, whereas when decided it indicates "padded", in step 3703, decision in step 3702 has been made for all the component data of horizontal processing unit data or not, and when it has been made, step 3704 is performed, whereas when it has not been made, in step 3702 decision is made for following component data.

In step 3703, when decided that decision has been made for all component data, that is, when all component data subsequent to the target component data, of processing unit data comprising the target component data, is not of vertical processing unit data to be processed, padding number is initialized in step 3704, and then padding number is decided in step 3708, whereby processing in FIG. 37 is completed. Therefore, the horizontal processing unit data is not padded in the following step.

Steps subsequent to step 3704 are performed, when horizontal processing unit data comprises component data to be padded. In step 3704, number of the counter 3303 is initialized to "0", and then step 3705 is performed. IN-this processing, the counter 3303 is used for counting number of continuous padded component data.

In steps 3705 to 3707, component data of horizontal processing unit data, which has been vertically padded in the primary processing is continuously detected, and such component data is excluded from processing.

In step 3705, the information on a result of vertical padding, held in the storage means 3305 is referred to, to decide whether the information indicates "padded" or not, whereby it is decided whether target component data is of vertical processing unit data to be padded or not. When decided that the corresponding component of the information indicates "padding is required", step 3708 is performed, whereas when decided it indicates "padded", in step 3706, decision in step 3705 has been made for all component data of horizontal processing unit data or not, and when it has been made, step 3708 is performed, whereas when it has not been made, in step 3707 "1" is added to the counting number of the counter 3303, and then in step 3705 decision is made for following component data.

In step 3708, the counting number of the counter 3003 is decided among "0", "8", and "other than 0 and 8". When decided the number is "0" or "8", step 3709 is performed, while the number is "other than 0 and 8", step 3710 is performed. IN-the former case, processing unit data comprises no component data to be secondary-padded, and therefore step 3709 is performed without padding step.

When processing unit data comprises component data to be secondary-padded, in step 3710, component data which has been horizontally padded in the primary padding is excluded from the processing. In step 3710, the information on a result of horizontal padding, held in the storage means 3305 is referred to, to decide whether it indicates "padded" or not, whereby it is decided whether target component data is of horizontal processing unit data to be padded or not. When decided that it indicates "padding is required", steps 3711 and 3712 are performed, whereas when decided it indicates "padded", step 3713 is performed.

In step 3711, the holding means 3302 generates the padding data S3305 on the basis of data located in the vicinity of component data to be padded, and generates a padding starting address S3306a and a padding ending address S3306b on the basis of the counting numbers of the counters 3303 and 3304, which are output to the means 3301 as the padding information the holding means 3302 updates the counting number of the counter 3304. In step 3712, the means 3301 performs continuous padding on the basis of the padding information.

Subsequently to step 3710 or padding in steps 3711 and 3712, step 3713 is performed. In step 3713, it is decided whether horizontal processing is completed in the vertical area or not, and when decided that it is completed, step 3709 is performed, whereas when decided that it is not completed, in step 3710, it is decided whether horizontal padding has been performed or not.

Subsequently to step 3708 or step 3713, step 3709 is performed. In step 3709, it is decided whether vertical processing is completed in the horizontal area or not, and when decided that it is completed, processing in FIG. 37 is completed, whereas it is not completed, step 3701 is performed again.

When decided in step 3709 that processing in FIG. 37 is completed, the first data after secondary padding in e) in FIG. 39 has been generated, which is held in the data storage means of the means 3301.

E. Secondary Vertical Padding

Secondary vertical padding is performed following procedure in FIG. 38. In step 3801, number of processing units is initialized as in step 3701 in FIG. 37.

In step 3802, the information on a result of horizontal padding, held in the storage means 3305 is referred to, to decide whether the information indicates "padded" or not, whereby it is decided whether target component data is of horizontal processing unit data to be padded or not. In accordance with decision result, step 3803 or 3804 is performed. In step 3803, decision in step 3802 has been made on all component data of vertical processing unit data or not, and in step 3803, when decided that decision has been made for all the component data, padding will not be performed as in step 3703 in FIG. 37.

In step 3804, number of the counter 3303 is initialized to "0", and then step 3805 is performed. Also in this processing, the counter 3303 is used for counting number of continuous padded component data as in the secondary horizontal padding. In step 3805, the information on a result of horizontal padding, held in the storage means 3305 is referred to, to decide whether the information indicates "padded" or not, whereby it is decided whether target component data is of horizontal processing unit data to be padded or not. In accordance with the decision result, step 3806 or 3808 is performed. In step 3806, decision in step 3805 has been made on all component data of vertical processing unit data or not, and when it has been made, step 3808 is performed, whereas when it has not been made, in step 3807, the counting number of the counter 3303 is increased, and then in step 3805 is performed. In step 3808, the counting number of the counter 3003 is decided among "0", "8", and "other than 0 and 8". When decided the number is "0" or "8", step 3809 is performed, while the number is "other than 0 and 8", step 3810 is performed.

In step 3810, the information on a result of vertical padding, held in the storage means 3305 is referred to, to decide whether the information indicates "padded" or not, whereby padding is performed in steps 3811 and 3812, or step 3810 is performed.

In the case of steps 3811 and 3812, in step 3811, padding information is generated as in the step 3711 in FIG. 37, while in step 3812, continuous synthesizing padding is performed rather than the continuous padding in step 3712 in FIG. 37. As shown in e) and f) in FIG. 39, secondary horizontal padding in which first data after secondary padding is generated and secondary vertical padding in which second data after secondary padding is generated, are both performed to the same area of data having two-dimensional structure. This is because the padded component data is not padded on the basis of the information in d) in FIG. 40 and the information in e) in FIG. 40.

Therefore, in continuous synthesizing padding in step 3812, the data after primary padding in d) in FIG. 39 held in the data storage means of the means 3301 is continuously padded to generate second data after secondary padding in f) in FIG. 39, which is synthesized with first data after secondary padding in e) in FIG. 39, to generate synthesized data after secondary padding in g) FIG. 39.

Step 3813, and 3809, and their subsequent processing are identical to steps 3713 and 3709 in FIG. 37, except that replacement is made between horizontal and vertical paddings.

In step 3809, when it is decided that processing in FIG. 38 is completed, the synthesized data after secondary padding in g) in FIG. 39 is generated.

Also, as mentioned previously, the significance information is processed as in the case of the data. Therefore, synthesized data after secondary padding and synthesized significance information after secondary padding are output to the data padding apparatus of the fourteenth embodiment.

Thus, in accordance with the fourteenth embodiment, the data padding apparatus comprises the data setting storage and padding means 3301, the continuous information padding information holding means 3302, the padding number counter 3303, the padded data number counter 3304, the padding position information storage means 3305, and the processing object switching means 3306, to perform primary padding and secondary padding and in the primary padding, padding position information on the primary padding is generated, and then in the secondary padding, only the area which has not been padded in the primary padding is processed on the basis of the padding position information, whereby efficiency in high-level padding is increased.

In addition the data padding method of the fourteenth embodiment includes the primary padding step 3401 and the secondary padding step 3402, and in the primary padding step 3401, the padding position information is generated and held, and in the secondary padding step, only the area which has not been padded in the primary padding is processed on the basis of the padding position information, whereby efficiency in high-level padding is increased.

Figure 41:
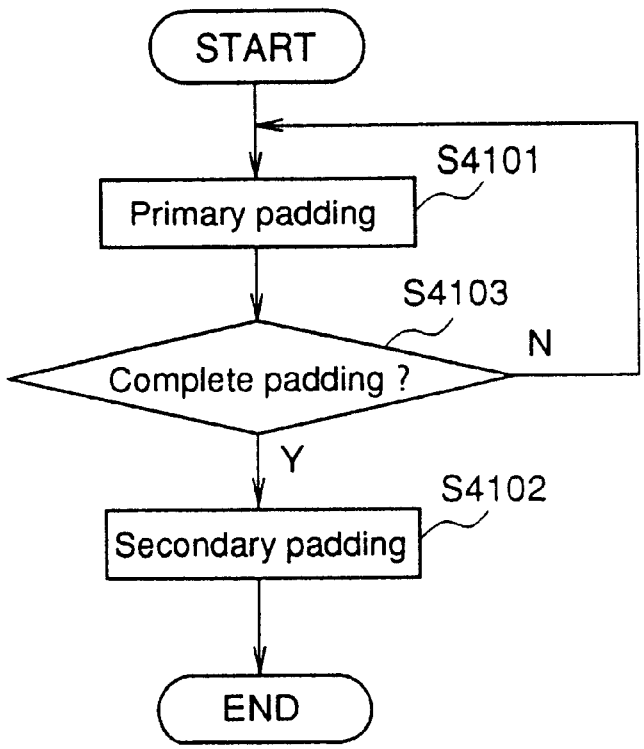
FIGS. 41a) and 41b) are flowcharts showing the processing procedure for executing an N-th padding in the fourteenth embodiment.
Figure 41:
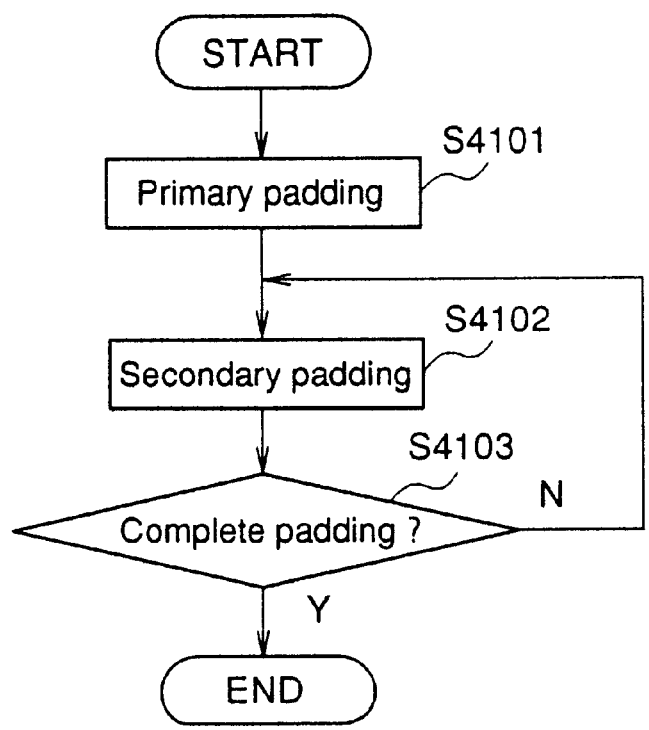

Although in the fourteenth embodiment, the primary and secondary paddings are performed, in general, primary to N-th (n: natural number) paddings can be performed. For example, primary to thirdly paddings are performed to data of a three-dimensional structure. FIGS. 41a) and 41b) are flowcharts each showing primary to N-th processing (expansion of the data padding method of the fourteenth embodiment).

In FIG. 41a), primary padding is repeated to implement padding in an N-th stage and in FIG. 41b), secondary padding is repeated to implement the padding in the N-th stage. The primary padding step 4101 and the secondary padding step 4102 are identical to the primary padding step 3401 and the secondary padding step 3402 in FIG. 34. In decision step 4103, it is decided whether the primary padding step 4101 and the secondary padding step 4102 are respectively repeated a prescribed number of times or not, and when decided they are not, the steps are repeated.

Also in the case of performing the padding in the N-th stage, a result of padding in a stage is held as padding position information, to be applied to padding in a next stage, whereby the padding in the next stage is performed effectively.

Furthermore, in the secondary padding of the data of two-dimensional structure, padding and synthesizing are performed. Similarly, in a case of thirdly padding of data of three-dimensional structure, padding and synthesizing are performed. Therefore, in N-th processing, an area to be padded matches an area to be synthesized, whereby efficiency in processing in N degree padding is increased.

This N-th processing is implemented by repetition, with the processing object switching means 3306 set to input padded data and padded significance information.

In the data padding of the fourteenth embodiment, continuous padding is performed according to the third embodiment, and changing points of significance information are detected according to the thirteenth embodiment, whereby higher processing is realized. Alternatively, synchronous processing may be performed to realize padding with high versatility according to the first embodiment, or appropriate padding method may be selected according to the second embodiment.

Also in the fourteenth embodiment, as in the thirteenth embodiment, in case of inputting synchronized data and significance information, efficiency in padding is increased.

Embodiment 15

In a data padding apparatus and a data padding method according to a fifteenth embodiment, parallel padding is repeated and a result of padding in a stage is applied to padding in a next stage.

Figure 42:
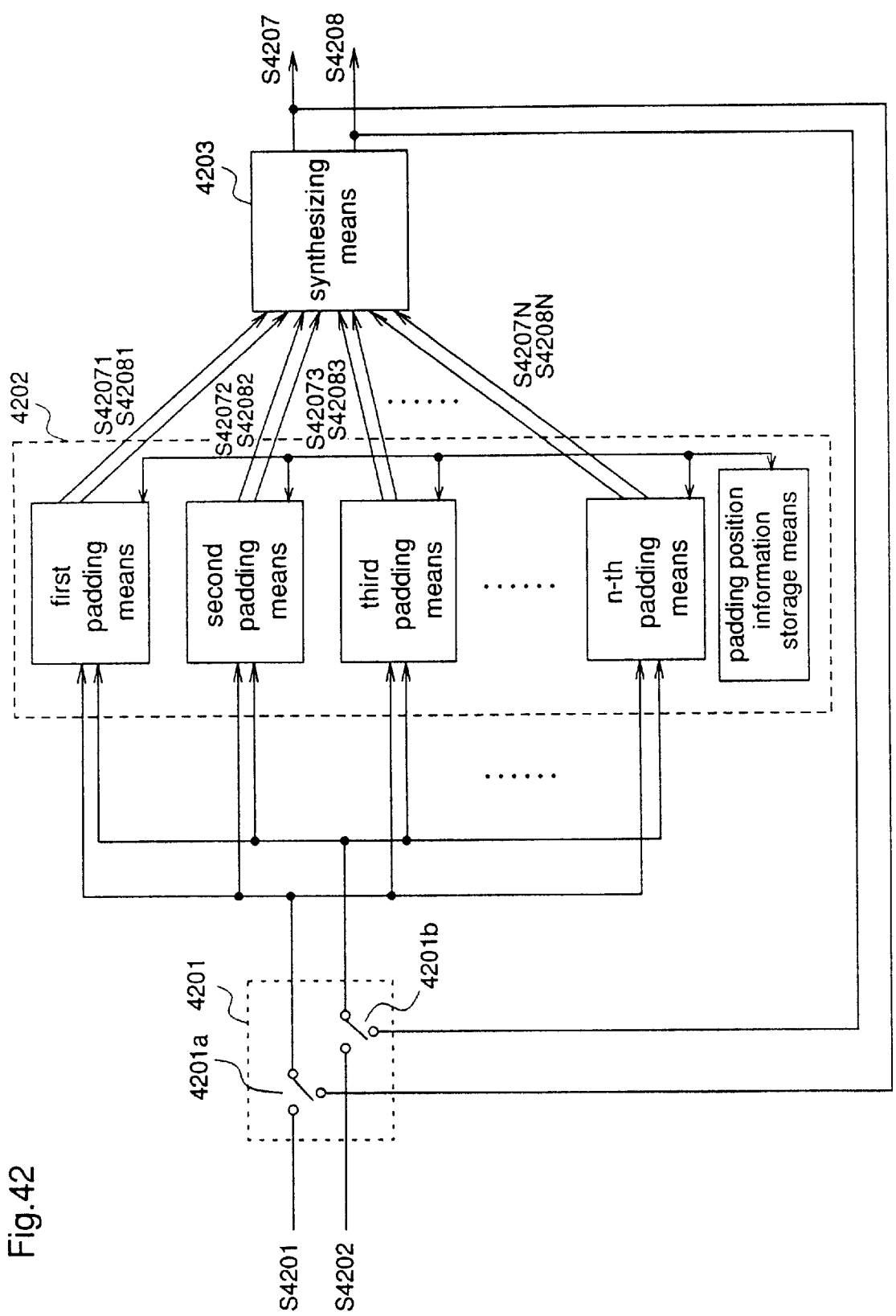
FIG. 42 is a block diagram showing the configuration of a data padding apparatus according to a fifteenth embodiment.

FIG. 42 is a block diagram showing a construction of a data padding apparatus of the fifteenth embodiment. Referring now to FIG. 42, the data padding apparatus of the fifteenth embodiment comprises processing object switching means 4201, parallel padding means 4202, and synthesizing means 4203. The parallel padding means 4202 comprises first to N-the padding means, and padding position information storage means.

The switching means 4201 comprises a data switch 4201a and a significance information switch 420b, for switching input to the parallel padding means 4202. Specifically, through the data switch 4201a, one of input data and padded data is input to the parallel padding means 4202, and through the significance information switch 4201b, one of input significance information and padded data is input to the parallel padding means 4202. In the parallel padding means 4202, the first to N-th padding means respectively perform parallel padding to the data and significance information from the switching means 4201 by their respective padding methods. In this fifteenth embodiment, assume that the first to N-th padding means is respectively identical to that of the fourteenth embodiment, but the first and second padding means respectively comprises no processing object switching means 3306 and the padding position information storage means 3305 in FIG. 33. The synthesizing means 4203 is used for synthesizing padding results output from, respective padding means of the parallel padding means 4202.

Figure 43:
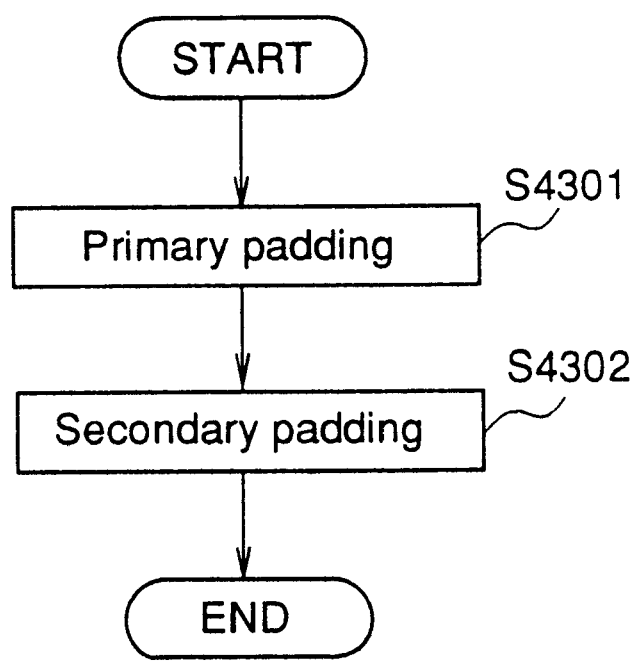
FIGS. 43a) and 43b) are flowcharts showing the processing procedure of a data padding method according to the fifteenth embodiment.
Figure 43:
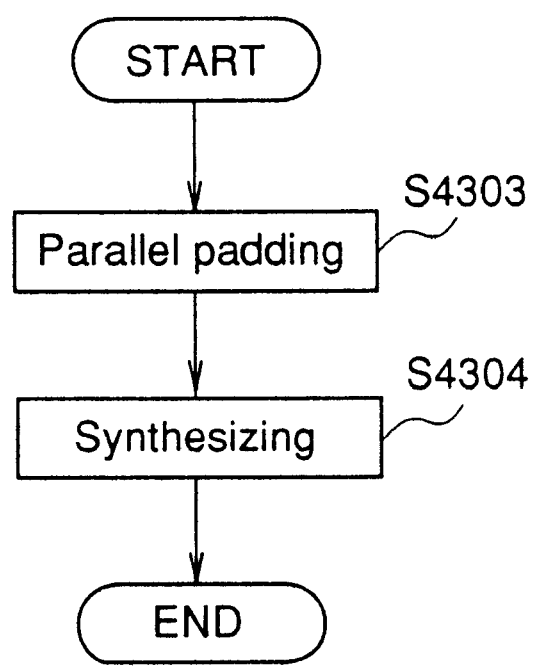

FIG. 43a) is a flowchart showing processing procedure of the data padding method according to the fifteenth embodiment. As shown in the figure, in the data padding method according to the fifteenth embodiment, in primary padding step S4301, first padding is performed to the input data and input significance information, to generate padded data and padded significance information by a prescribed method, and padding position information indicating positions where padding has been performed in the first padding, and in secondary padding step S4302, padding information is generated on the basis of the padding position information generated in step 4301, and second padding is performed on the basis of the generated padding information. FIG. 43b) is a flowchart showing procedure of the primary padding step and the secondary padding step. The primary padding step and the secondary padding step respectively comprise a parallel padding step S4303 wherein horizontal padding and vertical padding are performed in parallel, and a synthesizing step S4304 in which results of horizontal padding and vertical padding are synthesized.

In the fifteenth embodiment, as in the fourteenth embodiment, padding in FIG. 39 is performed. The padding position information in FIG. 40 is generated in the primary padding, to be used in the secondary padding. Hereinafter, operation of the data padding apparatus of the fifteenth embodiment will be described with reference to FIGS. 42 to 43, and 39 and 40.

Referring to FIG. 42 again, the switching means 4201 sets a built-in switch so that the input data S4201 and the input significance information S4202 are input to the parallel padding means 4202. The primary padding in step S4301 in FIG. 43a) is performed to the input data S4201 and the significance information S4202. In step S4303 in FIG. 43b), the input data S4201 and the input significance information S4202 are input to the first padding means and the second padding means, respectively. The first padding means performs horizontal padding to the input data S4201 in figure a) in FIG. 39, to generate first data after primary padding S42071 in b) in FIG. 39, which is output to the synthesizing means 4203. The first padding means also generates the information on a result of horizontal padding in d) in FIG. 40, to be held in built-in padding position information storage means of the parallel padding means 4202.

Concurrently with processing of the first padding means, the second padding means performs vertical padding to the input data S4201 in a) in FIG. 39, to generate second data after primary padding S42072 in c) in FIG. 39, which is output to the synthesizing means 4203. The second padding means also generates the information on a result of vertical padding in e) in FIG. 40, to be held in built-in padding position information storage means of the parallel padding means 4202. In the padding position information storage means, the padding position information comprising the information on a result of horizontal padding and the information on a result of vertical padding in FIG. 40 is stored.

The synthesizing means 4203 synthesizes the first data S42071 and the second data S42072, to generate synthesized data after primary padding S4207 in d) in FIG. 39. The significance information is also processed in parallel and synthesized as in the case of data.

Referring to FIG. 42 again, the processing object switching means 4201 sets a built-in switch so that the synthesized data after primary padding S4207 and the synthesized significance information after primary padding S4208 are input to the parallel padding means 4202. Herein, secondary padding in step 4302 in FIG. 43a) is performed to the synthesized data after primary padding S4207 and the synthesized significance information after primary padding S4208. In step 4303 in FIG. 43b), the data S4207 and the significance information S4208 are input to the first padding means and the second padding means, respectively. The first padding means performs horizontal padding to the data S4207 in d) in FIG. 39 on the basis of the padding position information, to generate first data after secondary padding S42071 in e), which is output to the synthesizing means 4203. Concurrently with processing of the first padding means, the second padding means performs vertical padding to the data S4207 in d) in FIG. 39 on the basis of the padding position information, to generate second data after secondary padding S42072 in f) in FIG. 39, which is output to the synthesizing means 4203. The synthesizing means 4203 synthesizes the first data S42071 and the second data S42072, to generate synthesized data after secondary padding in g) in FIG. 39. The significance information is also processed in parallel and synthesized as in the case of data.

Thus, in accordance with the fifteenth embodiment, the data padding apparatus comprises the processing object switching means 4201, the parallel padding means 4202, and the synthesizing means 4201, to perform padding effectively on the basis of the padding information as in the fourteenth embodiment, and simultaneously to perform padding in parallel in the primary and secondary paddings, whereby efficiency in processing is further increased.

Furthermore, in the data padding method of the fifteenth embodiment, in the primary padding step S4301, padding position information is generated and held, and in secondary padding step 4302, on the basis of the padding position information, the area which has not been performed in the primary padding is processed, whereby efficiency in high-level padding is increased.

In addition, the primary padding step S4301 and the secondary padding step S4302 respectively include the parallel padding step S4303 and the synthesizing step S4304, whereby parallel processing is performed. As a result, efficiency is further is increased.

Furthermore, in the data padding of the fifteenth embodiment, continuous padding is performed according to the third embodiment, and changing points of significance information are detected according to the thirteenth embodiment, whereby higher processing is realized as in the fourteenth embodiment. Alternatively, synchronous processing may be performed to realize padding with high versatility according to the first embodiment, or appropriate padding method may be selected according to the second embodiment. Also in the fourteenth embodiment, as in the thirteenth embodiment, in case of inputting synchronized data and significance information, efficiency in padding is increased.

Embodiment 16

In a data padding apparatus and a data padding method according to a sixteenth embodiment, on the basis of padding position information of a processing in a stage, line unit processing is performed in processing in a next stage.

Figure 44:
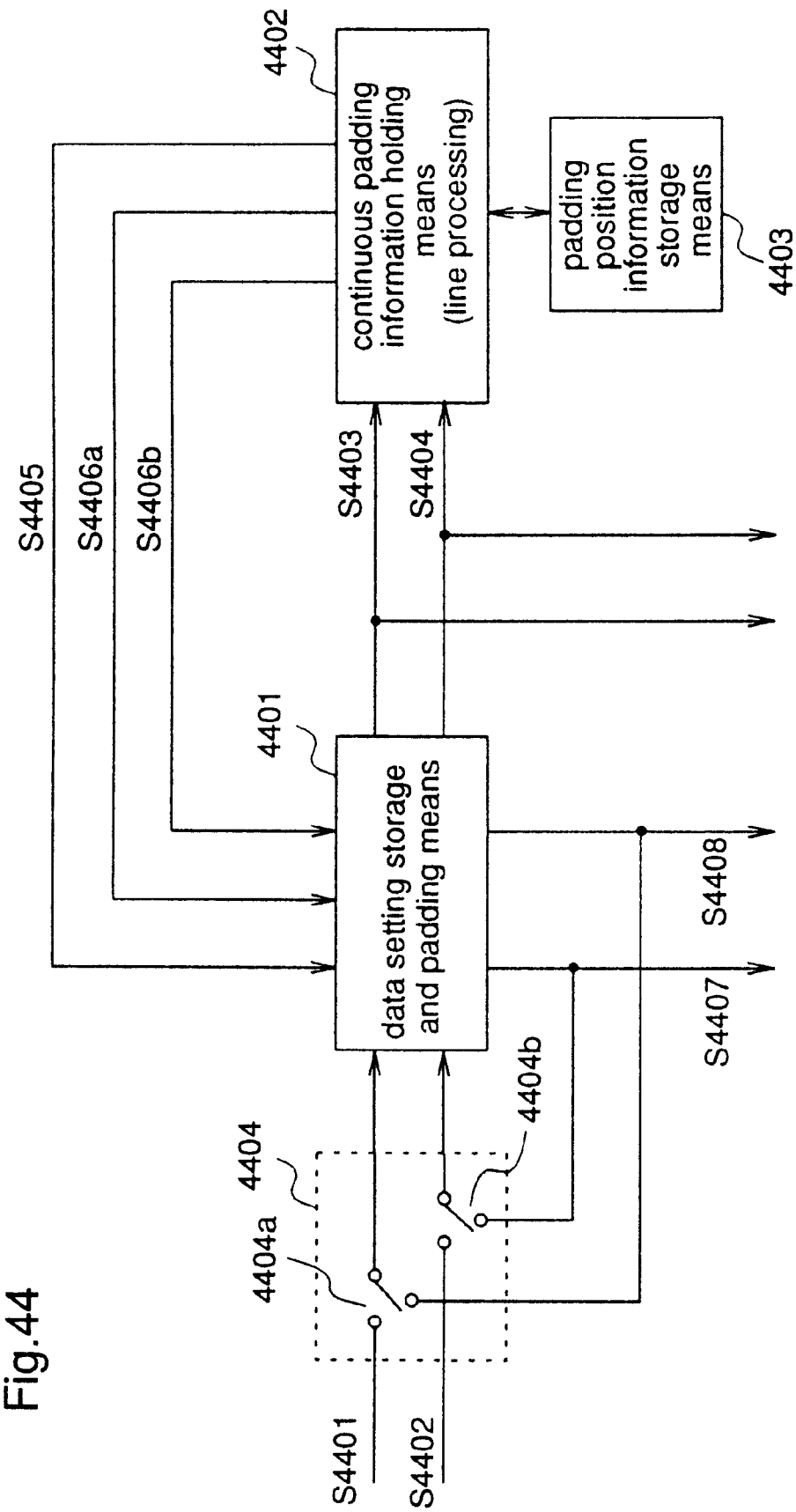
FIG. 44 is a block diagram showing the configuration of a data padding apparatus according to a sixteenth embodiment.

FIG. 44 is a block diagram showing a construction of the data padding apparatus of the sixteenth embodiment. Referring now to FIG. 44, the data padding apparatus of the sixteenth embodiment comprises data setting storage and padding means 4401, continuous padding information holding means (having capability of line processing on the basis of the padding position information) 4402, padding position information storage means 4403, and processing object switching means 4404.

The data setting storage and padding means 4401 is used for performing synchronous processing and continuous padding as in the third embodiment. The continuous padding information holding means 4402 is used for producing padding information comprising padding starting address and padding ending address as in the case of the third embodiment, and in the sixteenth embodiment, it has a capability of line processing o the basis of the padding position information, for producing padding information for each line on which data to be processed is present, on the basis of padding position information in a stage.

The padding position information storage means 4403 is used for storing positions where padding has been performed and positions where padding has not been performed in padding in a stage. The processing object switching means 4404 includes a data switch 4404a and a significance information switch 4404b, for switching input to the data setting storage and padding means 4401.

Through the data switch 4404a, one of input data and padded data is input to the means 4401, and through the significance information switch 4404b, one of the input significance information and padded data is input thereto.

FIG. 45 is a diagram showing padding position information and line processing of the sixteenth embodiment. Hereinafter, operation of the data padding apparatus of the sixteenth embodiment will be described with reference to FIGS. 44 and 45.

Referring to FIG. 45, in a) input data to be processed in the data padding apparatus of the sixteenth embodiment is shown. This input data is of two-dimensional structure, and continuous 8 pieces of component data in the horizontal direction is assumed to be processing unit data, which is termed "line" herein and lines L1, L2, . . . L8 are shown in the vertical direction. In the data padding apparatus of the sixteenth embodiment, in primary padding, horizontal padding is performed, and in secondary padding, vertical padding is performed, resulting in the result in the first example in FIG. 13 of the fourth embodiment.

Referring to FIG. 44, the switching means 4404 sets the built-in switch so that the input data S4401 and the input significance information S4402 are input to the means 4401.

In the sixteenth embodiment, in primary padding, horizontal padding is performed to generate the data after primary padding in b) in FIG. 45 as in the third embodiment, and the information in c) in FIG. 45 is generated as in the horizontal padding of the primary padding of the fourteenth embodiment. Then, the data b) in FIG. 45 in held in the built-in data storage means of the means 4401, and the information in c) in FIG. 45 is held in the padding position information storage means 4403.

Thereafter, the switching means 4404 sets the built-in switch so that the data after primary padding S4407 and the significance information after primary padding S4408 are input to the means 4401.

In secondary padding (vertical padding), the holding means 4402 generates padding data of one line by referring to the information on result of horizontal padding held in the storage means 4403 and on the basis of data of a line indicating "padded", and the generated padding data S4405, and padding information comprising padding starting address information S4406a and padding ending address information S4406b with which lines to be padded are specified, are output to the means 4401. Assume that the padding data S4405 is of one line, and the address information S4406a and S4406b specify continuous lines to be padded.

The means 4401 performs continuous padding to plural continuous lines specified by the padding information, using padding data of one line. As shown in d) in FIG. 45, to lines L1 and L2 to be padded, padding is performed using one line of padding data from a primary-padded line L3. Thereafter, to lines L7 and L8 to be padded, padding is performed using one line of padding data from a primary-padded line L6, whereby secondary padding is completed.

In the padding according to the sixteenth embodiment, in the primary padding (horizontal padding), the information on a result of horizontal padding is generated, and in the secondary padding (vertical padding), padding data is generated for each line and padding data is duplicated for each line on the basis of the information on a result of horizontal padding. As a result, high-speed processing is possible as compared with the apparatus of the fourth embodiment wherein the secondary padding is performed as in the primary padding.

Thus, in accordance with the sixteenth embodiment, the data padding apparatus of the sixteenth embodiment comprises the data setting storage and padding means 4401, the continuous padding information holding means (having capability of line processing on the basis of the padding position information) 4402, the padding position information storage means 4403, and the processing object switching means 4404, to generate and hold the padding position information in the primary padding, and to perform processing for each line on the basis of the padding information in the secondary padding, whereby secondary padding is carried out at a high rate.

In addition, in the data padding method of the sixteenth embodiment, the padding position information is generated and held in the primary padding, and processing is performed for each line on the basis of the padding position information in the secondary padding, whereby secondary padding is carried out at a high rate.

Furthermore, although the primary padding and the secondary padding are performed in the sixteenth embodiment, primary to N-th (N: natural number and number of stages) paddings can be performed. (For example, primary to thirdly paddings are performed to data of a three-dimensional structure). In this case, on the basis of padding position information in a stage, processing in a next stage is performed for each line, whereby higher processing is realized.

Furthermore, although in the sixteenth embodiment, continuous padding is performed according to the third embodiment, changing points of significance information may be detected according to the thirteenth embodiment, on assumption that the data padding apparatus of the sixteenth embodiment comprises the padding number counter and the padded data number counter, whereby efficiency in processing is increased. Also in the sixteenth embodiment, as in the thirteenth embodiment, in case of inputting synchronized data and significance information, efficiency in padding is increased.

Embodiment 17

In a data padding apparatus and a data padding method according to a seventeenth embodiment of the present invention, processing is performed for each line on the basis of significance information in the continuous padding as already described in the third embodiment.

Figure 46:
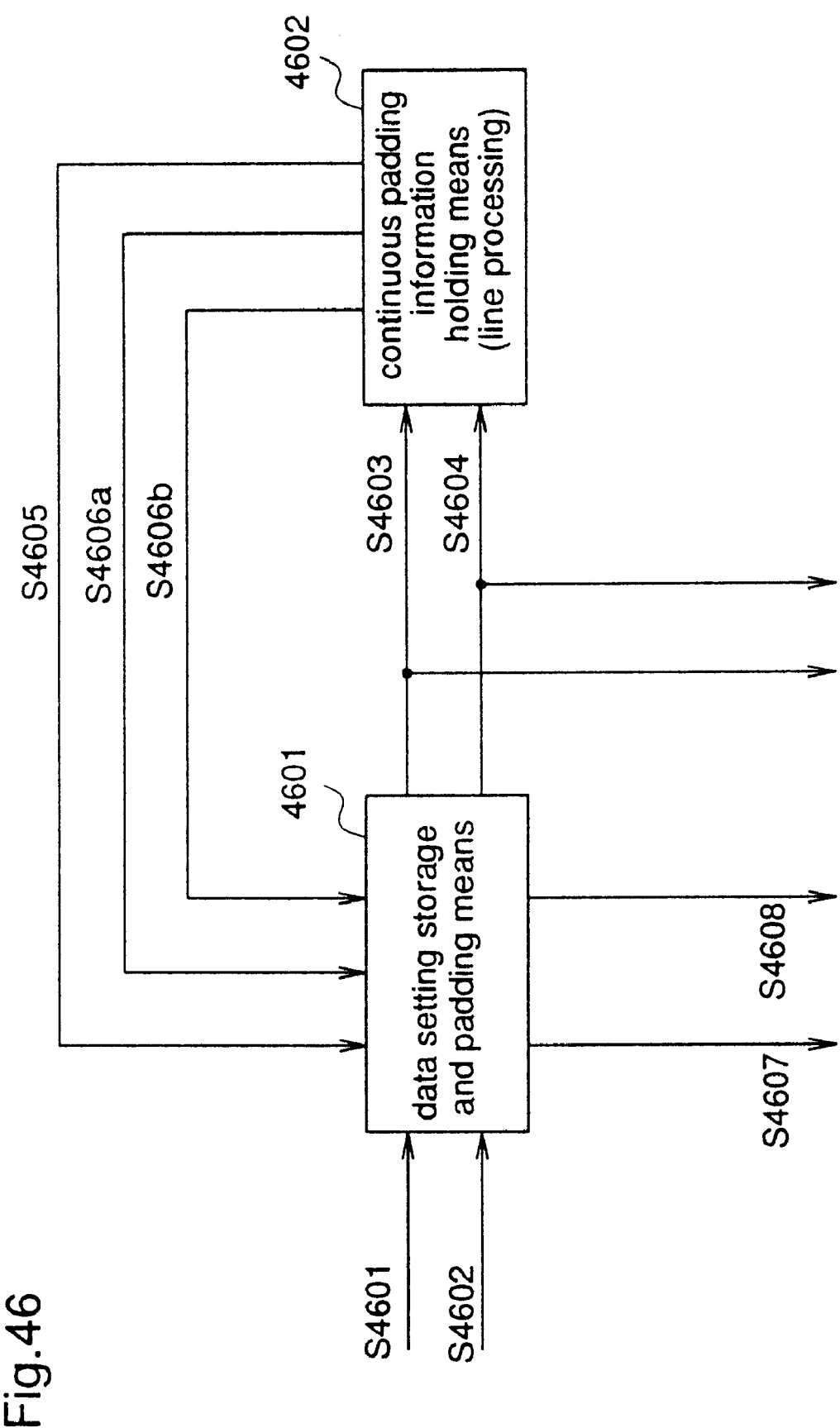
FIG. 46 is a block diagram showing the configuration of a data padding apparatus according to a seventeenth embodiment.

FIG. 46 is a block diagram showing a construction of the data padding apparatus of the seventeenth embodiment. Referring to FIG. 46, the data padding apparatus of the seventeenth embodiment, comprises data setting storage and padding means 4601 and continuous padding information holding means 4602 (leaving capability of line processing on the basis of significance information). The means 4601 is used for performing synchronous processing and continuous padding as in the third embodiment. The holding means 4602 is used for producing padding information comprising padding starting address information and padding ending address information by which continuous address range is specified as in the third embodiment, and in the seventeenth embodiment, it has capability of line processing and used for specifying an area to be padded on the basis of the significance information to generate padding information for each line comprising data.

Figure 47:
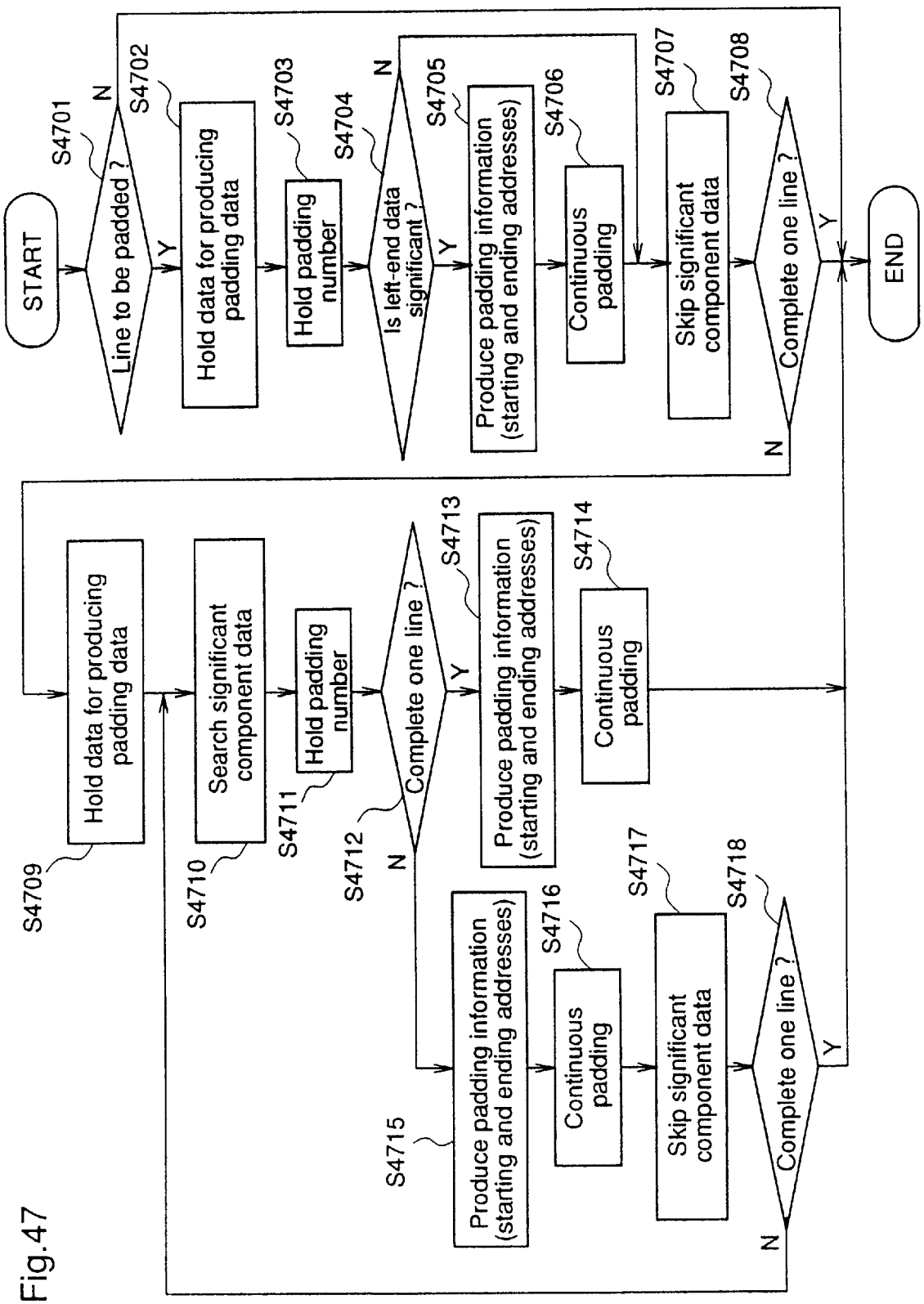
FIG. 47 is a flowchart showing the processing procedure of a data padding method according to the seventeenth embodiment.

FIG. 47 is a flowchart showing processing procedure by a data processing method of the seventeenth embodiment, and FIG. 48 is a diagram showing line processing of the seventeenth embodiment.

Operation of the data padding apparatus of the seventeenth embodiment is identical to that of the third embodiment except that the holding means 4602 generates padding information on the basis of decision of significance for each line. Hereinafter, line processing of the seventeenth embodiment will be described with reference to FIGS. 46 to 48.

Referring to FIG. 48, in a), processing unit data comprising 8 pieces of component data is shown. As in the prior art data padding apparatus, padded data in b) in FIG. 48 is generated in the first embodiment. As shown in figure, insignificant component data d1 and d2 are replaced with padding data p1 generated on the basis of significant component data d3, insignificant component data d4, d5, and d6 are replaced with padding data p2 generated on the basis of significant component data d3 and d7, and insignificant component data d8 is replaced with padding data p3 generated on the basis of significant component data d7. In the first embodiment, shown in flowchart in FIG. 5, it is decided whether the padding condition is met or not for each component data, and the padding condition is met, padding information is generated, and on the basis of the padding information padding is performed (see flow in FIG. 20).

The padding condition is met when there is insignificant component data between an end point and significant component data, or between significant component data and significant component data. From this fact, in padding in FIG. 48, processing A in which padding data is generated from component data on the right side of component data to be padded, processing B in which padding data is generated from component data on both sides thereof, and processing c in which padding data is generated from component data on the left side thereof, are performed. In case of processing unit data of one-dimensional structure, processing A is performed to an area of left-end component data to be processed, and processing c is performed to an area of right-end component data to be processed.

In the seventeenth embodiment, processing unit data of one-dimensional structure is handled as one line of data, to a specified area of which, processing A is performed, processing B is performed in loop, and then to a specified area of which, processing c is performed, whereby high-speed processing is realized.

Referring to FIG. 47, in step 4701, it is decided whether one line of data requires padding or not. When decided that component data of the line requires no padding, procedure in 47 is completed.

On the other hand, when decided that there is component data to be padded, steps 4702 to 4708, which correspond to processing A in FIG. 48, are performed. In step 4702, data for producing padding data for the processing A is held, and in step 4703, padding number indicating number of continuous insignificant data is held. In step 4704, it is decided whether component data located on left end of one line is insignificant, that is, requires padding or not. When decided it requires padding, in steps 4705 and 4706, continuous padding corresponding to processing A is performed, whereas when decided it requires no padding, steps 4705 and 4706 are skipped and step 4707 is performed.

In step 4707, after skipping significant component data of the following component data, it is decided whether one line is completed or not in step 4708. When decided it is completed, processing in FIG. 47 is completed. After processing A, when following component data is all significant, processing is completed herein.

On the other hand, when decided it is not completed in step 4708, in step 4709, data for producing padding data required for processing B or processing C is held, and then in step 4710 the following significant component data is searched. On the basis of result of search, in step 4711, padding number of continuous insignificant component data is held. In step 4712, it is decided whether one line is completed or not. When decided that one line is completed, after continuous padding corresponding to processing C in steps 4713 and 4714, processing in FIG. 47 is completed.

In step 4712, when decided it is not completed, in steps 4715 and 4716, continuous padding corresponding to processing B is performed. Then, in step 4717, significant component data is skipped, and then in step 4718 it is decided whether one line is completed or not. When decided that one line is completed, processing in FIG. 47 is completed, whereas when decided it is not completed, step 4710 is performed again, to repeat processing B or C.

Thus, in accordance with the seventeenth embodiment, the data padding apparatus of the seventeenth embodiment comprises the data setting storage and padding means 4601 and continuous padding information holding means 4602 (having capability of line processing on the basis of significance information), to perform padding on the basis of significance information for each line in the continuous padding of the third embodiment, whereby efficiency in processing is increased and high-speed processing is realized.

In addition, in the data padding method according to the seventeenth embodiment, an area to be padded is specified for each line, and processing is performed for each area, whereby efficiency in processing is increased and high-speed processing is realized.

Also in the seventeenth embodiment, as in the thirteenth embodiment, in case of inputting synchronized data and significance information, efficiency in padding is increased.

Embodiment 18

In a data padding apparatus and a data padding method according to an eighteenth embodiment, processing is performed for each line on the basis of significance information, and line processing is performed on the basis of padding position information of processing in a previous stage. A data padding apparatus according to an eighteenth embodiment has a construction identical to that of the sixteenth embodiment. This is described with reference to FIG. 44. The continuous padding holding means of the eighteenth embodiment has capability of line processing on the basis of significance and padding position information, and processing is performed for each line on the basis of the significance information as in the seventeenth embodiment, and padding position information in the primary padding is generated and held, and then line processing is performed in secondary padding as in the sixteenth embodiment.

Also in the eighteenth embodiment, padding in FIG. 45 is performed as in the sixteenth embodiment. Hereinafter, operation of the data padding apparatus of the eighteenth embodiment is described with reference FIGS. 44 and 45.

As in the sixteenth embodiment, data of two-dimensional structure in a) in FIG. 45 is input. Although in the eighteenth embodiment, data after primary padding in b) in FIG. 45 and the information in c) in FIG. 45, are generated as in the sixteenth embodiment, horizontal padding differs from that of the sixteenth embodiment. In the eighteenth embodiment, to the data of one line of two-dimensional data, padding is performed according to processing in FIG. 47 as in the seventeenth embodiment.

After the data in b) in FIG. 45 and the information in c) in FIG. 45 are generated, secondary padding is performed as in the sixteenth embodiment. Also in this case, the information can be handled as in the case of significance information, and therefore high-speed processing can be performed according to the procedure in FIG. 47.

Thus, in accordance with the eighteenth embodiment, the data padding apparatus of the eighteenth embodiment comprises the data setting storage and padding means 4401, continuous padding information holding means 4402 (having capability of line processing on the basis of significance information and padding position information), padding position information storage means 4403, and the processing object switching means 4404, to perform primary padding for each line as in the seventeenth embodiment, and to generate and hold padding position information in the primary padding and perform processing for each line on the basis of the padding position information in the secondary padding, as in the sixteenth embodiment, whereby high-speed padding is realized. Furthermore, although the primary padding and the secondary padding are performed in the eighteenth embodiment, primary to N-th (N: natural number and number of stages) paddings can be performed. (For example, primary to thirdly paddings are performed to data of three-dimensional structure). In this case, on the basis of padding position information in a stage, processing in a next stage is performed for each line, whereby high-speed processing is realized.

Furthermore, although in the eighteenth embodiment, continuous padding is performed according to the third embodiment, changing points of significance information may be detected according to the thirteenth embodiment, on assumption that the data padding apparatus of the sixteenth embodiment comprises the padding number counter and the padded data number counter, whereby efficiency in processing is increased. Also in the eighteenth embodiment, as in the thirteenth embodiment, in case of inputting synchronized data and significance information, efficiency in padding is increased. Furthermore, although in the eighteenth embodiment, line processing in the sixteenth and seventeenth embodiments is performed on the basis of the padding position information to realize high-speed processing, a method of high-speed processing (padding position information generated in a stage is used in padding in a next stage) is not limited thereto. In processing of the thirteenth embodiment in FIG. 31, and processing of the fourteenth embodiment in FIG. 38, high-speed decision on the basis of the padding position information is implemented, whereby efficiency in processing is increased. Furthermore, a data padding program by which these processing of the first to eighteenth embodiments is carried out, is recorded in a recording medium such as a floppy disc or CD-ROM, and the recorded program is executed in a computer system, to realize these processing.

What is claimed is:

1. A data padding apparatus performing padding processing in which, using input data which is input in a line of component data which is discrete digital data and input significance information which is input in a line of component significance information indicating the significance of each component data, insignificant component data included in the input data is replaced with padding data generated based on significant component data included in the input data, said apparatus comprising:

a storage and padding means for holding the input data and the input significance information and performing synchronization to the input data and the input significance information to generate and hold original data and synchronized significance information each having a same output order, and performing padding processing to the held original data and the held synchronized significance information to output padded data and padded significance information; and a padding information holding means for generating padding data and padding specifying information that specifies a part of the original data to be subjected to padding processing based on significant part of the original data, using the original data and the synchronized significance information generated by the synchronization, and outputting the padding data and the padding specifying information to the storage and padding means.

2. The data padding apparatus as defined in claim 1 wherein the padding information holding means generates, as the padding specifying information, padding address information that specifies a region in the storage and padding means where original data is held.

3. The data padding apparatus as defined in claim 1 wherein the padding information holding means is a holding means for significance information adaptive padding information that determines a padding method using the original data and the synchronized significance information which have been generated by the synchronization, and generates the padding data and the padding specifying information.

4. The data padding apparatus as defined in claim 1, wherein the storage and padding means is a data setting storage and padding means for performing padding processing to each continuous region of the held original data and the held synchronized significance information;

and wherein the padding information holding means is a holding means for continuous padding information for generating, as the padding specifying information, padding starting address information and padding ending address information that specify a continuous region of the original data held in the storage and padding means.

5. The data padding apparatus as defined in claim 4 wherein the holding means for continuous padding information is a holding means for continuous padding information referring to significance information changing point that generates padding data based on a significant part of the original data, detects a significance information changing point in the original data at which a significance thereof changes using the synchronized significance information, and generates the padding specifying information based on the detected significance information changing point.

6. The data padding apparatus as defined in claim 1 wherein the padding information holding means specifies plural regions of processing unit data for each processing unit data consisting of a predetermined number of pieces of component data which constitute the original data, and generates the padding information for each specified region.

7. The data padding apparatus as defined in claim 1 further comprising a processing object switching means for switching between a set of input data and input significance information and a set of padded data and padded significance information as an input to the storage and padding means.

8. The data padding apparatus as defined in claim 1 comprising N sets of storage and padding means and padding information holding means (N: natural number), said apparatus further comprising:
a division means for dividing to the input data and the input significance information to generate N pieces of division data and N pieces of division significance information, and outputting N sets of division data and division significance information to the N storage and padding means; and
a reconstruction means for reconstructing the N pieces of division data after padding and the N pieces of division significance information after padding, which data and information are generated by the N storage and padding means, to generate padded data and padded significance information.

9. The data padding apparatus as defined in claim 1 comprising N sets of storage and padding means and padding information holding means, said apparatus further comprising a synthesizing means for synthesizing N pieces of padded data and N pieces of padded significance information, the data and information being generated by the N pieces of storage and padding means, to generate synthesized padded data and synthesized padded significance information.

10. A data padding apparatus performing padding processing in which, using input data which is input in a line of component data which is discrete digital data and input significance information which is input in a line of component significance information indicating the significance of each component data, insignificant component data included in the input data is replaced with padding data generated based on significant component data, thereby performing primary to Nth (N: natural number) paddings, said program comprising:
a storage and padding means for holding the input data and the input significance information as original data and synchronized significance information which have the same output order, and performing padding to the held original data and the held synchronized significance information to output data after primary padding and significance information after primary padding, or performing padding to data after padding in a stage and significance information after padding in a stage to output data after padding in a next stage and significance information after padding in a next stage; and
a padding information holding means for generating padding data used in primary padding based on the held original data and the held synchronized significance information, generating padding specifying information which specifies the part of the original data to be padded in primary padding, and then holding the padding data and the padding specifying information as padding location information indicating the content of primary padding, or generating padding data used in a next stage based on the data after padding in a stage, the significance information after padding in a stage, and padding location information indicating the content of the padding in a stage and generating a padding specifying information which specifies the part of the data after padding in a stage to be subjected to padding in a next stage, and then holding the padding data and the padding specification information as padding position information indicating the content of padding in a next stage.

11. The data padding apparatus as defined in claim 10 wherein the padding information holding means specifies plural regions of processing unit data for each processing unit data consisting of the constant number of pieces of component data which constitute the original data, and generates padding information for each specified region.

12. A data padding method in which, using input data which is input in a line of component data which is discrete digital data, and input significance information which is input in a line of component significance information which indicates the significance of each component data, insignificant component data included in the input data is replaced with padding data which is generated based on significant component data, said method comprising:
a synchronization step for holding the input data and the input significance information, synchronizing the input data and the input significance information to generate original data and synchronized significance information which have the same output order, and holding the original data and the synchronized significance information;
a padding calculation step for generating padding data based on the significant parts of the original data and padding specifying information which specifies the parts of the original data to be subjected to padding, using the input data and the input significance information which are generated in the synchronization step; and
a padding step for subjecting the held original data and the held synchronized significance information to padding, using the padding data and the padding specifying information.

13. The data padding method as defined in claim 12 wherein in the padding calculation step, padding address information which specifies a region of the held original data is generated.

14. The data padding method as defined in claim 12 wherein the padding calculation step is a significance information adaptive padding calculation step for deciding a padding method using the original data and the synchronized significance information which are generated in the synchronization, and according to the decided padding method, generating the padding data and the padding specifying information.

15. The data padding method as defined in claim 12 further comprising an addressing step for generating padding starting address information and padding ending address information which specify a continuous region of the held original data, wherein the padding step is a continuous padding step for executing padding for the continuous region in the held original data and the held synchronized significance information.

16. The data padding method as defined in claim 15 wherein the padding calculation step is a significance information changing point reference padding calculation step for generating padding data based on the significant parts of the original data, detecting with the synchronized significance information a significance information changing point where the significance of the original data changes, and generating the padding specifying information based on the detected significance information changing point.

17. The data padding method as defined in claim 12 wherein in the padding calculation step, a plurality of regions of processing unit data are specified for each processing unit which consists of a predetermined number of pieces of component data constituting the original data, and the padding data and the padding specifying information are generated for each specified region.

18. The data padding method as defined in claim 12 further comprising a predetermined times completion deciding step for deciding whether padding in the padding step is executed a predetermined times or not.

19. The data padding method as defined in claim 12 wherein the synchronization step, the padding calculation step and the padding step are executed in parallel N times (N: natural number), said method further comprising:
   a division step for dividing the input data and the input significance information to generate N pieces of division data and N pieces of division significance information; and
   a reconstruction step for reconstructing N pieces of padded division data and N pieces of padded division significance information which are generated by repeating the padding step N times, to generate padded data and padded significance information.

20. The data padding method as defined in claim 12 wherein the synchronization step, the padding calculation step and the padding step are executed in parallel N times (N: natural number), said method further comprising:
   a synthesizing step for synthesizing N pieces of padded division data and N pieces of padded division significance information which are generated by repeating the padding step N times, to generate synthesized padded data and synthesized padded significance information.

21. A data padding method in which, using input data which is input in a line of component data as discrete digital data and input significance information which is input in a line of component significance information which indicates significance of each component data, insignificant component data included in the input data is replaced with padding data which is generated based on significant component data, thereby performing primary to N-th (N: natural number) paddings, said method comprising:
   an input holding step in which the input data and the input significance information are held as original data and synchronized significance information of the same output order;
   a primary padding step for generating padding data based on significant parts of the original data using the original data and the synchronized significance information, generating padding specifying information which specifies parts of the original data to be padded, performing padding to the held original data and the held synchronized significance information using the padding data and the padding specifying information to generate data after primary padding and significance information after primary padding, and generating and holding padding position information on the padding; and
   secondary to N-th padding steps for generating padding data and padding specifying information used in a stage using padded data, padded significance information, and the padding position information which have been generated in a padding step in a previous stage, and generating and holding padding position information on the padding in the stage when padding in a next stage is performed.

22. The data padding method as defined in claim 21 wherein in said primary padding step, plural regions of processing unit data are specified for each processing unit data comprising a prescribed number of pieces of component data of the original data, and the padding data and the padding specifying information are generated for each specified region.

23. A program recording medium for recording a data padding program in which, using input data which is input in a line of component data as discrete digital data and input significance information which is input in a line of component significance information which indicates significance of each component data, insignificant component data included in the input data is replaced with padding data which is generated based on significant component data, said program comprising:
   a synchronization step for holding the input data and the input significance information, synchronizing the input data and the input significance information to generate and hold original data and synchronized significance information of the same output order;
   a padding calculation step for generating padding data based on the significance parts of the original data and padding specifying information which specifies the parts of the original data to be subjected to padding, using the original data and the synchronized significance information which have been generated in the synchronization step; and
   a padding step for subjecting the held original data and the held synchronized significance information to padding, using the padding data and the padding specifying information.

24. A program recording medium for storing a data padding program in which, using input data which is input in a line of component data as discrete digital data and input significance information which is input in a line of component significance information which indicates significance of each component data, insignificant component data included in the input data is replaced with padding data which is generated based on significant component data, thereby performing primary to N-th (N: natural number) paddings, said program comprising:
   an input holding step in which the input data and the input significance information are held as original data and synchronized significance information of the same output order;
   a primary padding step for generating padding data based on significant parts of the original data using the original data and the synchronized significance information, generating padding specifying information which specifies parts of the original data to be padded, performing padding to the held original data and the held synchronized significance information using the padding data and the padding specifying information to generate data after primary padding and significance information after primary padding, and generating and holding padding position information on tho padding; and
   secondary to N-th padding steps for generating padding data and padding specifying information used in a stage using padded data, padded significance information, and the padding position information which have been generated in a padding step in a previous stage, and generating and holding padding position information on the padding in the stage when padding in a next stage is performed.

25. The program recording medium as defined in claim 24, wherein in said primary padding step of said data padding program, plural regions of processing unit data are specified for each processing unit data comprising a prescribed number of pieces of component data of the original data, and the padding data and the padding specifying information are generated for each specified region.

* * * * *